United States Patent
Desmurs et al.

(10) Patent No.: US 10,141,603 B2
(45) Date of Patent: *Nov. 27, 2018

(54) POLYMERS CONTAINING GRAFTED BIS(SULFONYL)IMIDE SODIUM OR LITHIUM SALTS, METHODS FOR PRODUCTION THEREOF AND USES OF SAME AS ELECTROLYTES FOR BATTERIES

(71) Applicants: CDP INNOVATION, Lyons (FR); CENTRE NATIONAL DE LA RECHERCHE SCIENTIFIQUE, Paris (FR); UNIVERSITE D'AIX MARSEILLE, Marseilles (FR)

(72) Inventors: Jean-Roger Desmurs, Cannes (FR); Elisabet Dunach Clinet, Villeuneuve Loubet (FR); Philippe Knauth, Marseilles (FR); Vincent Morizur, Lannilis (FR); Sandra Olivero, Nice (FR)

(73) Assignees: CPD INNOVATION, Lyons (FR); CENTRE NATIONAL DE LA RECHERCHE SCIENTIFIQUE, Paris (FR); UNIVERSITE D'AIX MARSEILLE, Marseilles (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/327,609
(22) PCT Filed: Jul. 20, 2015
(86) PCT No.: PCT/FR2015/000154
§ 371 (c)(1),
(2) Date: Jan. 19, 2017
(87) PCT Pub. No.: WO2016/012670
PCT Pub. Date: Jan. 28, 2016

(65) Prior Publication Data
US 2017/0179526 A1 Jun. 22, 2017

(30) Foreign Application Priority Data
Jul. 23, 2014 (FR) ..................................... 14 01710

(51) Int. Cl.
*H01M 10/0565* (2010.01)
*C08G 65/48* (2006.01)
(Continued)

(52) U.S. Cl.
CPC ......... *H01M 10/0565* (2013.01); *B01J 39/19* (2017.01); *C08G 65/4012* (2013.01);
(Continued)

(58) Field of Classification Search
CPC ........... H01M 10/0565; H01M 10/052; H01M 10/054; H01M 2300/0082; C08J 5/2256;
(Continued)

(56) References Cited

U.S. PATENT DOCUMENTS

| 5,438,082 A | 8/1995 | Helmer-Metzmann et al. |
| 6,090,895 A | 7/2000 | Mao et al. |

(Continued)

FOREIGN PATENT DOCUMENTS

| EP | 0 574 791 A2 | 12/1993 |
| FR | 2 853 320 A1 | 10/2004 |

(Continued)

OTHER PUBLICATIONS

International Search Report and Written Opinion dated Nov. 11, 2015 in PCT/FR2015/000153 filed Jul. 20, 2015, now co-pending U.S. Appl. No. 15/327,606, filed Jan. 19, 2017; with English partial translation and partial machine translation (18 pages).

(Continued)

*Primary Examiner* — Stewart A Fraser
(74) *Attorney, Agent, or Firm* — Westerman, Hattori, Daniels & Adrian, LLP

(57) ABSTRACT

The invention relates to novel polymers containing grafted sodium or lithium bis(sulfonyl)imides, to the methods for the production thereof, and to the uses of same as electrolytes in batteries.

19 Claims, 1 Drawing Sheet

(51) Int. Cl.
*C08L 71/00* (2006.01)
*H01M 10/052* (2010.01)
*H01B 1/12* (2006.01)
*C08G 65/40* (2006.01)
*B01J 39/19* (2017.01)
*C08G 75/23* (2006.01)
*C08J 5/22* (2006.01)

(52) U.S. Cl.
CPC ..... *C08G 65/4056* (2013.01); *C08G 65/4093* (2013.01); *C08G 65/48* (2013.01); *C08G 75/23* (2013.01); *C08J 5/2256* (2013.01); *C08L 71/00* (2013.01); *H01B 1/128* (2013.01); *H01M 10/052* (2013.01); *C08G 2650/40* (2013.01); *C08J 5/22* (2013.01); *C08J 2371/10* (2013.01); *C08J 2381/06* (2013.01); *H01M 2300/0082* (2013.01); *Y02T 10/7011* (2013.01)

(58) Field of Classification Search
CPC ... C08J 2381/06; C08J 2371/10; C08G 75/23; C08G 65/48; B01J 47/12; B01J 39/19
See application file for complete search history.

(56) References Cited

U.S. PATENT DOCUMENTS

| | | | |
|---|---|---|---|
| 2004/0191602 A1* | 9/2004 | Ishikawa | C08G 65/48 528/220 |
| 2006/0258758 A1* | 11/2006 | Onodera | C08L 71/123 521/27 |
| 2007/0128522 A1 | 6/2007 | Gambut-Garel et al. | |
| 2010/0196782 A1* | 8/2010 | Izuhara | C08G 65/4012 429/483 |
| 2012/0308899 A1 | 12/2012 | Tsai et al. | |
| 2014/0272600 A1 | 9/2014 | Bouchet et al. | |
| 2017/0170516 A1* | 6/2017 | Desmurs | H01M 10/0565 |

FOREIGN PATENT DOCUMENTS

| | | |
|---|---|---|
| FR | 2 979 630 A1 | 3/2013 |
| JP | 2002-324559 A | 11/2002 |
| WO | 99/61141 A1 | 12/1999 |

OTHER PUBLICATIONS

International Search Report and Written Opinion dated Nov. 11, 2015 issued in corresponding application No. PCT/FR2015/000154; w/ English partial translation and partial machine translation (19 pages).

Bouchet et al., "Single-ion BAB triblock copolymers as highly efficient electrolytes for lithium-metal batteries", Nature Materials, vol. 12, May 2013, pp. 452-457.

\* cited by examiner

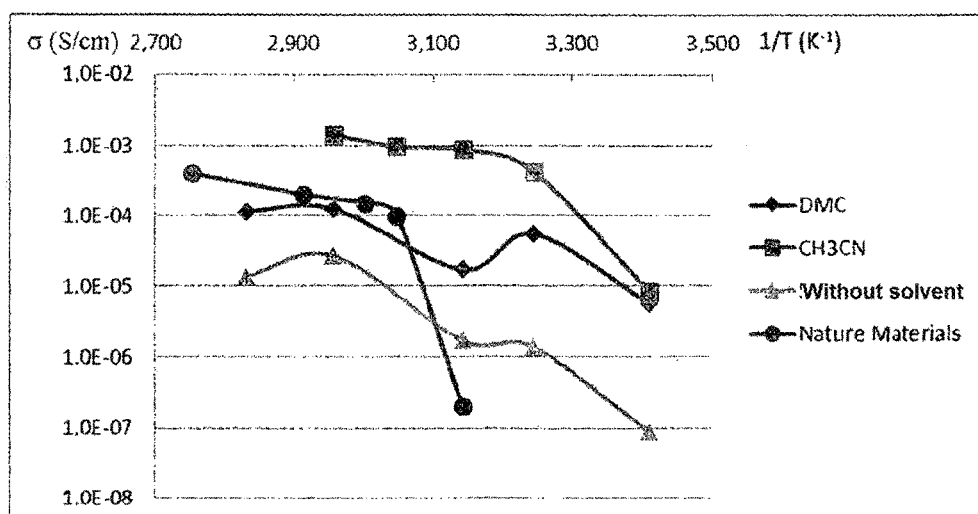

POLYMERS CONTAINING GRAFTED BIS(SULFONYL)IMIDE SODIUM OR LITHIUM SALTS, METHODS FOR PRODUCTION THEREOF AND USES OF SAME AS ELECTROLYTES FOR BATTERIES

BACKGROUND ART

This invention relates to novel polymers containing grafted bis(sulfonyl)amide lithium or sodium salts, methods of preparation thereof and uses thereof as electrolytes in lithium or sodium batteries.

More specifically, this invention relates to novel polymer electrolytes obtained from commercially available polymers as well as novel lithium polymer or sodium polymer-type batteries.

Lead batteries have been the most commonly used for many decades. However, lead technology has numerous disadvantages associated with the weight of the batteries, the toxicity of the lead as well as the use of a corrosive liquid. This has led to the development of alkaline batteries, the electrodes of which are based on nickel and cadmium (nickel-cadmium batteries), or, more recently, based on nickel and metal hydrides (nickel-hydride batteries), or based on silver oxide coupled with zinc, cadmium or iron. All of these technologies use a potassium hydroxide solution as the electrolyte and have as a major disadvantage a relatively low mass energy density with regard to needs associated with the development of portable equipment such as telephones and computers. Moreover, the weight of these batteries is a disadvantage in terms of their use in electric vehicles.

Manufacturers have therefore developed a new line based on lithium batteries using a negative electrode based on carbon, into which the lithium is inserted, and a metal oxide, in particular cobalt, with a high oxidation potential as a positive electrode. The principle of operation is as follows:

During electrochemical charging of the battery, the lithium ions pass through the electrolyte, which is an ion conductor and electronic insulator and is intercalated in the negative electrode material generally formed by graphite during discharging of the battery; that is to say that, during use, it is the reverse phenomenon that occurs. The lithium ions are deintercalated.

In the batteries, the ion conductor or electrolyte, which separates the electrodes, is a key element. On the one hand, its state, liquid, solid or gelled, affects the safety of the system, and, on the other hand, its conductivity determines the operating temperature range.

In lithium batteries, liquid electrolytes based on an organic solvent, such as dimethylenecarbonate or ethylenecarbonate, and a dissolved salt, such as lithium hexafluorophosphate $LiPF_6$ or lithium bis (trifluoromethanesulfonyl) imidide $(CF_3SO_2)_2NLi$, are commonly used. However, they do not have the optimal safety conditions associated with the handling of a corrosive and flammable liquid. Moreover, these systems have the disadvantage of being capable of forming dendrites during battery charging, which may cause a short circuit and destruction of the battery.

To overcome these major disadvantages, a new technology has been developed, based on solid lithium anode polymer electrolytes, resulting in the name "lithium polymer battery". Thus, patent FR 2853320 describes electrolytes obtained by polymerization of polyorganosiloxanes by a photoinitiator in the presence of an electrolyte salt. Aside from the fact that the anion is not immobilized and migrates into the electrolyte causing polarization phenomena at the electrodes, this technique requires iodonium catalysts, which are particularly toxic. Thus Chung-Bo Tsai, Yan-Ru Chen, Wen-Hsien Ho, Kuo-Feng Chiu, Shih-Hsuan Su describe, in the patent US 2012/0308899 A1, the sulfonation of PEEK into SPEEK and the preparation of the corresponding lithium salt. This simple technique does not make it possible to have sufficient delocalization of the negative charge on the sulfonate function and the lithium ion is too coordinated with the sulfonate function to reach very high conductivities. More recently, another approach was described by some authors who attempted to immobilize the anion by polymerization of monomers containing the lithium salt serving as the electrolyte. The patent FR 2979630 and the publication of D. Gigmes et al. in Nature Materials, 12, 452-457 (2013) describe the synthesis of block copolymers containing an electrolyte, the anion of which is bound to the polymer. The conductivities indicated are the best obtained so far for lithium polymer batteries. In the synthesis of this type of electrolytes, the starting monomers are not commercial and must be prepared in several steps. Moreover, the polymerization technique for preparing block polymers is costly compared to other polymerization techniques.

SUMMARY OF THE INVENTION

To overcome these disadvantages, the applicant preferred to go in the direction of existing polymers, which is less costly.

This invention relates to novel polymers of formulas I, II, III, IV, V, VI, VII, VIII, IX, X, XI, XII, XIII, XIV and XV used as electrolytes for batteries or conductive polymers (I)

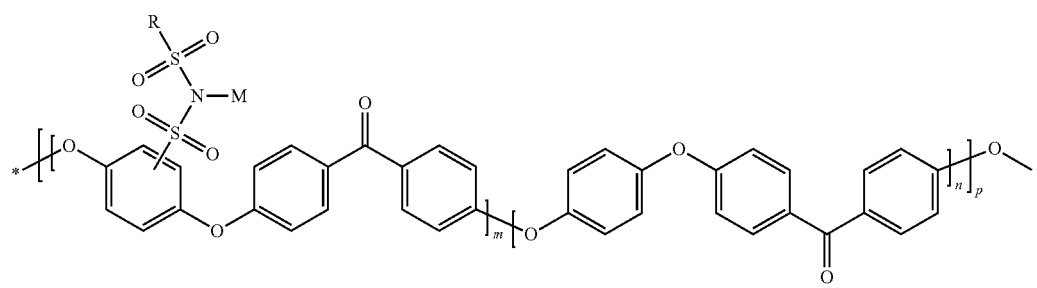

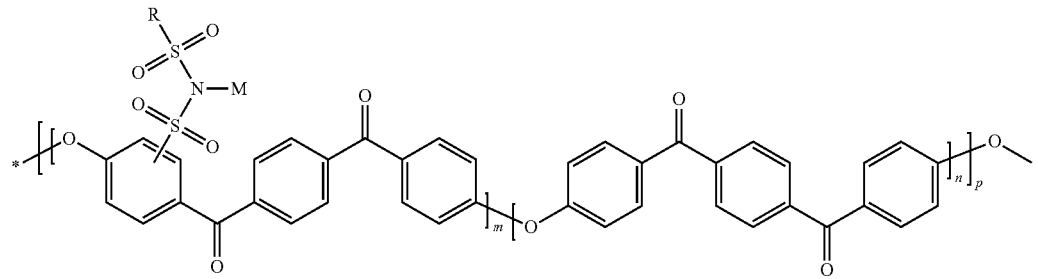
(II)
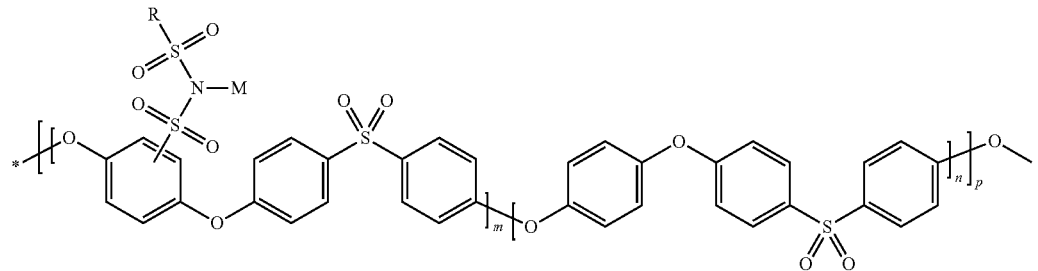
(III)
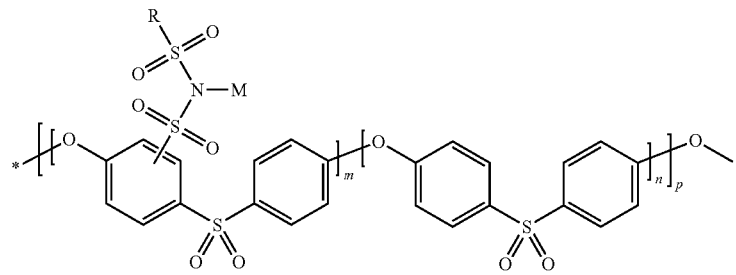
(IV)
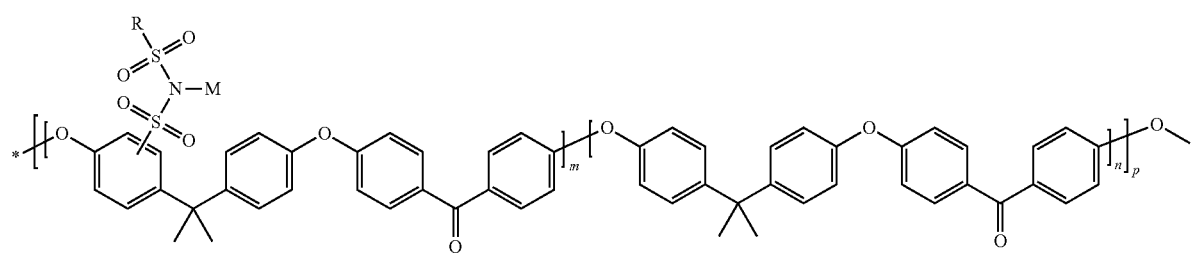
(V)
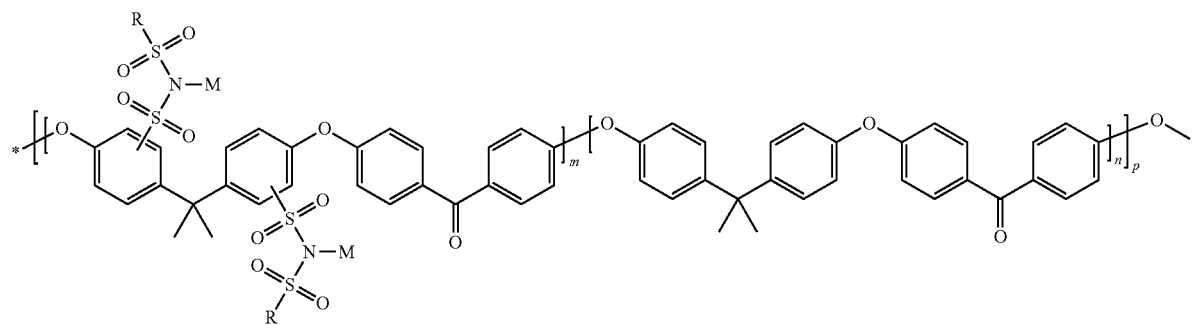
(VI)

-continued
(VII)
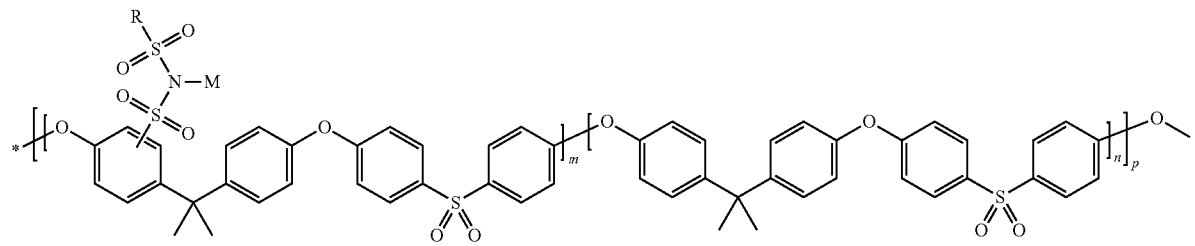
(VIII)
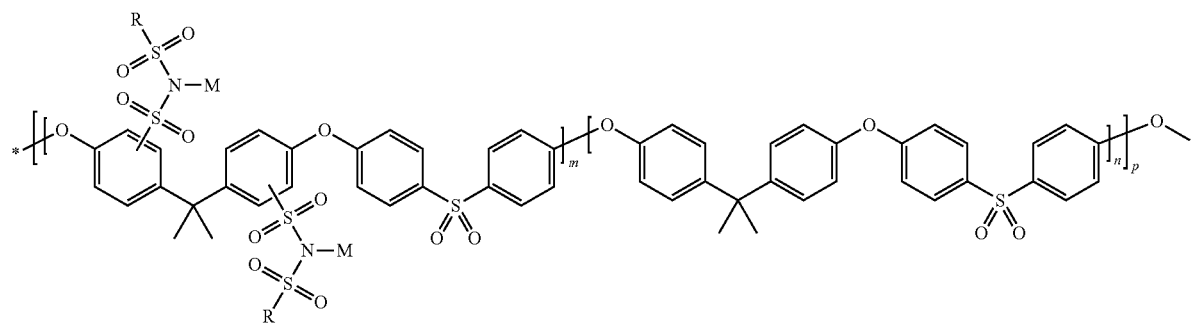
(IX)
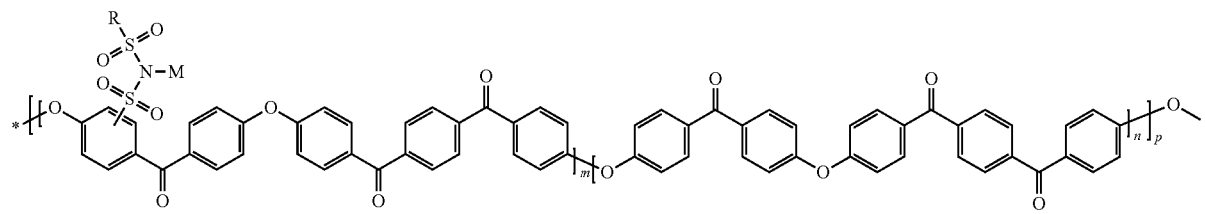
(X)
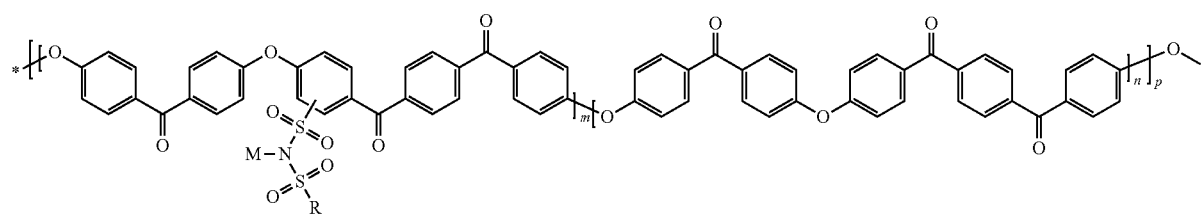
(XI)
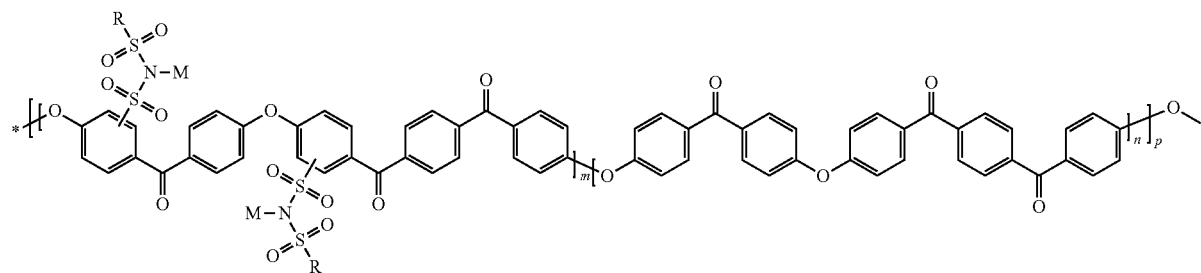

-continued

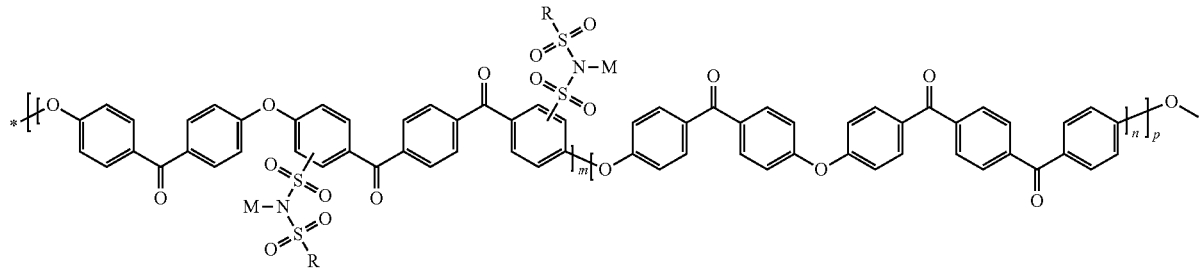

(XII)

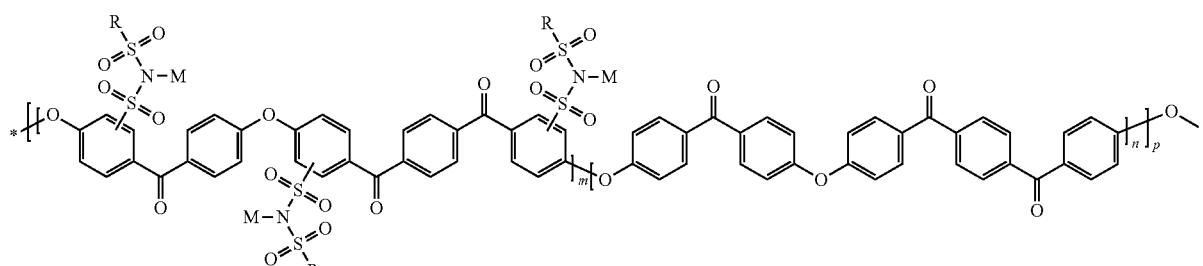

(XIII)

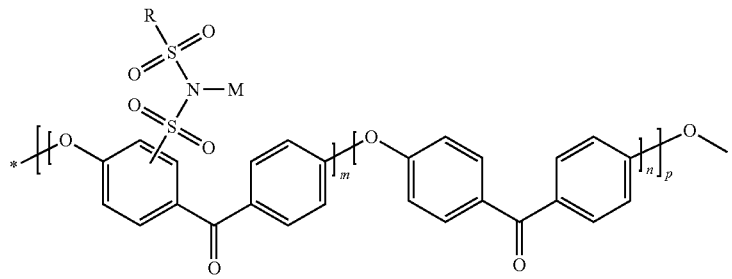

(XIV)

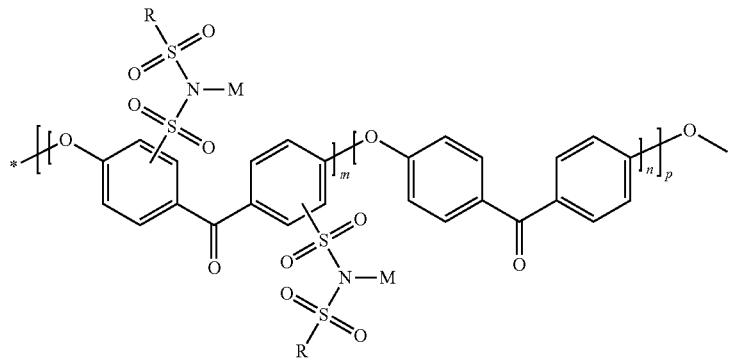

(XV)

wherein:
M represents a lithium or sodium atom
R represents a group or different groups chosen from:
- an alkyl or cycloalkyl group having 1 to 30 linear or branched carbon atoms optionally substituted by a cycloalkyl, aryl, perfluoroalkyl polyfluoroalkyl, mono or polyethoxylated motif;
- a perfluoro- or polyfluoroalkyl group optionally substituted by aromatic groups;
- an aryl or polyaryl group optionally substituted by alkyl, cycloalkyl, polyfluoro- or perfluoroalkyl chains, nitrile functions, alkyl or alkylsulfonyl functions, fluorine atoms;

m represents the percentage of polymer units having an oxoaryl or dioxoaryl motif having a grafted bis (sulfonyl)imidide salt. This percentage varies between 50 and 100%, preferably between 90 and 100%, n represents the percentage of polymer units having no oxoaryl or dioxoaryl motif functionalized by a bis (sulfonyl)imide motif. This percentage varies between 0 and 50%, and preferably between 0 and 10%, p represents the number of polymer units of the polymer; p varies from 40 to 300, preferably between 60 and 200.

Preferably, the polymers of formulas I, II, III, IV, V, VI, VII, VIII, IX, X, XI, XII, XIII, XIV and XV will be chosen, wherein:

M represents a lithium or sodium atom,

R represents a group different groups chosen from:
- an alkyl or cycloalkyl group having 1 to 10 linear or branched carbon atoms optionally substituted by a cycloalkyl, aryl, perfluoroalkyl, polyfluoroalkyl, mono or polyethoxylated motif;
- a perfluoro- or polyfluoroalkyl group optionally substituted by aromatic groups;
- an aryl or polyaryl group optionally substituted by alkyl, cycloalkyl, polyfluoro- or perfluoroalkyl motifs, nitrile functions, alkyl- or alkylsulfonyl functions, fluorine atoms;
- m represents the percentage of polymer units having an oxoaryl or a dioxoaryl motif functionalized by a bis(sulfonyl)imide motif. This percentage varies between 90 and 100%;
- n represents the percentage of polymer units having an oxoaryl or a dioxoaryl motif non-functionalized by a bis(sulfonyl)imide motif. This percentage varies between 0 and 10%;
- p represents the number of polymer units of the polymer; P varies from 40 to 300.

Very preferably, the polymers of formulas I, II, III, IV, V, VI, VII, VIII, IX, X, XI, XII, XIII, XIV and XV according to claim 1 will be chosen, wherein:

M represents a lithium or sodium atom;

R represents a group or different groups chosen from:
- an alkyl group with 1 to 10 carbon atoms such as the methyl, ethyl, propyl, butyl, pentyl, hexyl, cyclohexyl, ethylhexyl groups;
- a trifluoromethyl, pentafluoroethyl, nonafluorobutyl, 1,1,2,2-tetrafluoroethyl group;
- an aryl group of the phenyl, tolyl, naphthyl, trifluoromethylphenyl, bis(trifluoromethyl)phenyl, cyanophenyl, alkylsulfonylphenyl, arylsulfonylphenyl, methoxyphenyl, butoxyphenyl, pentafluorophenyl, alkylsulfonylphenyl, fluorophenyl type,
- m represents the percentage of polymer units having an oxoaryl or dioxoaryl motif functionalized by a bis(sulfonyl)imide motif. This percentage varies between 90 and 100%;
- n represents the percentage of polymer units having an oxoaryl or a dioxoaryl motif non-functionalized by a bis(sulfonyl)imide motif. This percentage varies between 0 and 10%;
- p represents the number of polymer units of the polymer; p varies from 60 to 200.

As an example, the R group is chosen from the methyl, ethyl, propyl, cyclopropyl, butyl, 1-decyl, 1-dodecyl, 1-hexanedecyl, 1-octyldecyl, (7,7-dimethyl-2-oxobicyclo[2.2.1]heptan-1-yl) methyl, ((1R)-7,7-dimethyl-2-oxobicyclo[2.2.1]heptan-1-yl) methyl, (1S)-(7,7-dimethyl-2-oxobicyclo[2.2.1]heptan-1-yl) methyl, cyclohexylmethyl, phenyl, tolyl, naphthyl, 4-trifluoromethylphenyl, 3,5-bis(trifluoromethyl)phenyl, 4-cyanophenyl, nonafluorobutyl, pentafluorophenyl, 2,3,5,6-tetrafluorophenyl, 4-fluorophenyl, 2,4-difluorophenyl, 3,5-difluorophenyl, 2,3,4,5,6-pentafluorophenyl, 4-cyanophenyl, 4-(trifluoromethyl)phenyl, 3-(trifluoromethyl)phenyl, 2-(trifluoromethyl)phenyl, 4-methylphenyl, 1-naphthyl, 2-naphthyl, 3,5-difluorobenzyl, 4-fluorobenzyl, 3-trifluoromethylbenzyl, 4-trifluoromethylbenzyl, 2,5-dimethylbenzyl, 2-phenylethyl, 4-methoxyphenyl, 4-n-butylphenyl, 4-t-butylphenyl, 4-butoxyphenyl, 2-fluoro-5-(trifluoromethyl)phenyl, 4-ethylphenyl groups;

The invention also relates to electrolytes formed by the aforementioned polymers, for batteries, as well as batteries comprising such electrolytes.

It should be noted that the aforementioned polymers according to the invention do not have sulfonic motifs —SO$_3$H. These motifs form acid functions of which the strength, too limited, binds the cations and, in particular, the lithium ions, too much. The bis(sulfonyl)imide motifs of the polymers according to the invention form acid functions of which the strength, greater than that of the sulfonic motifs, binds the cations and, in particular, the lithium ions, less significantly, thus facilitating their migration into the electrolyte.

According to a first variant, the polymers of formulas I, II, III, IV, V, VI, VII, VIII, IX, X, XI, XII, XIII, XIV and XV may be obtained:

1) by performing, in a first step, the chlorosulfonation of a polymer of formulas XVI, XVII, XVIII, XIX, XX, XXI, XXII and XXIII by a mixture of chlorosulfonic acid, thionyl chloride and a formamide according to an optimized process.

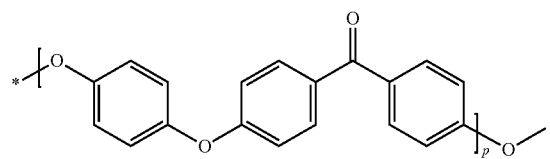

(XVI)

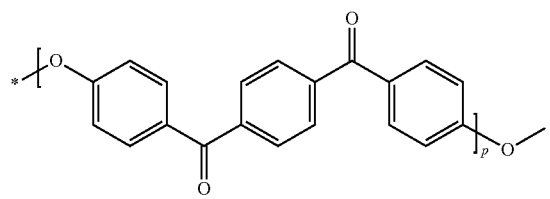

(XVII)

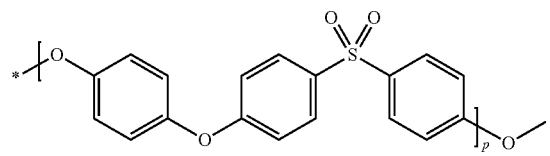

(XVIII)

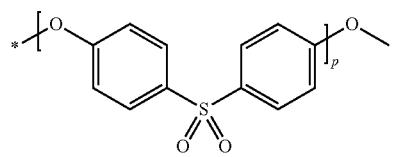

(XIX)

-continued
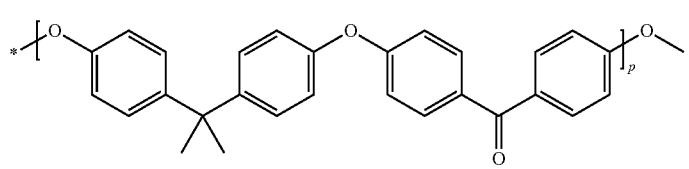
(XX)
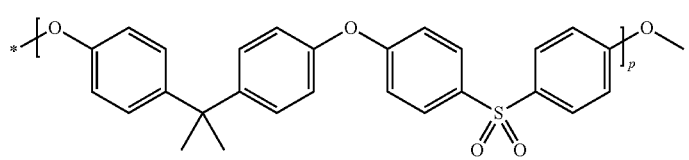
(XXI)
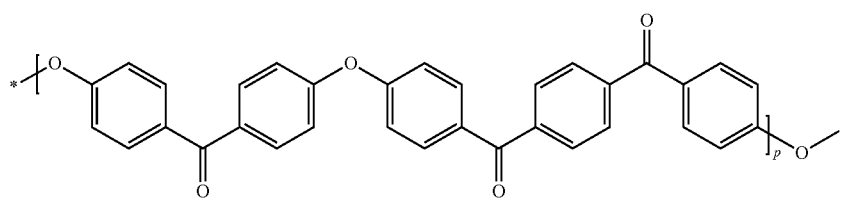
(XXII)
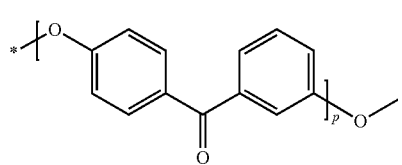
(XXIII)
wherein:
p represents the number of polymer units of the polymer;
 p varies from 40 to 300, preferably between 60 and 200.
To obtain the polymers of formulas XXIV, XXV, XXVI, XVII, XXVIII, XIX, XXX, XXXI, XXXII, XXXIII, XXXIV, XXXV, XXXVI, XXXVII and XXXVIII
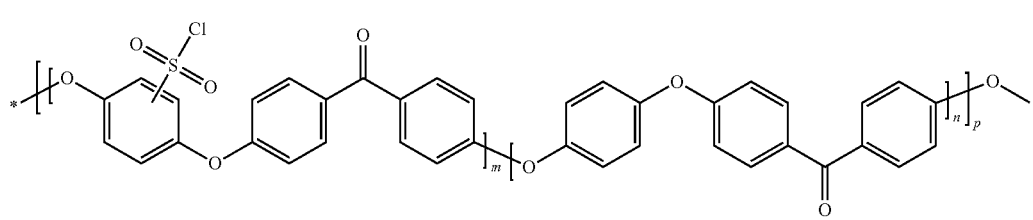
(XXIV)
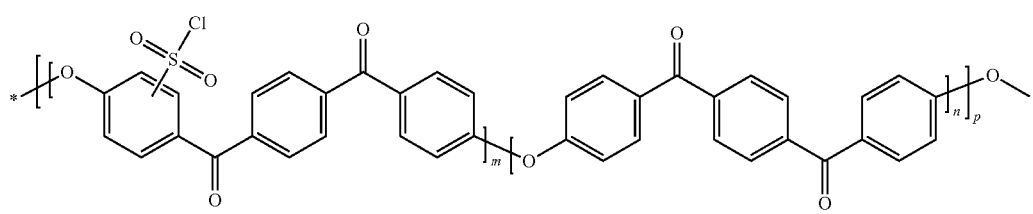
(XXV)
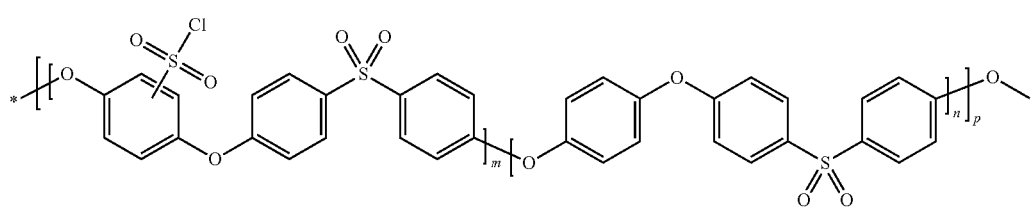
(XXVI)

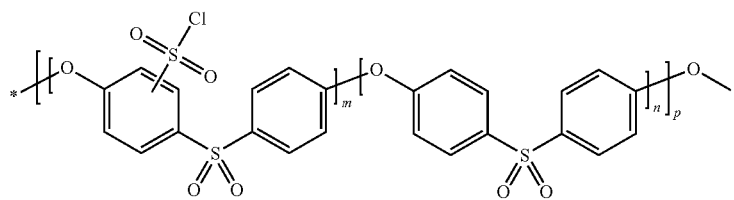
(XXVII)
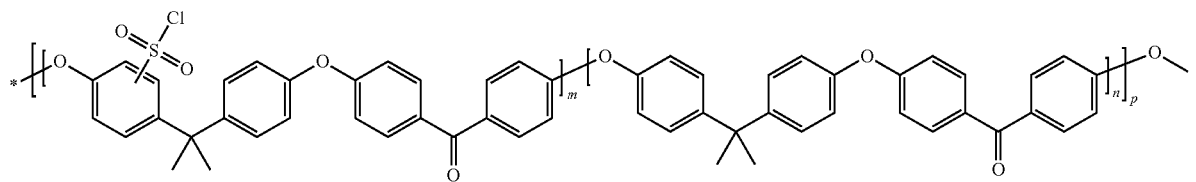
(XXVIII)
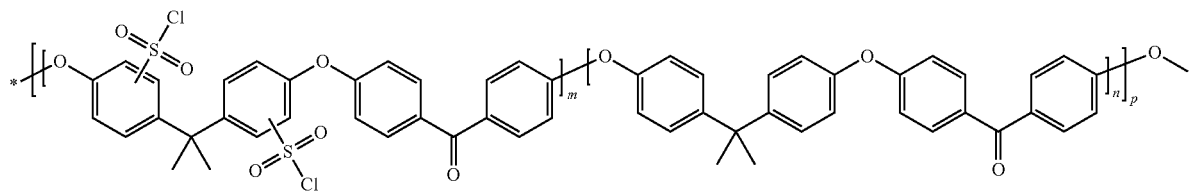
(XXIX)
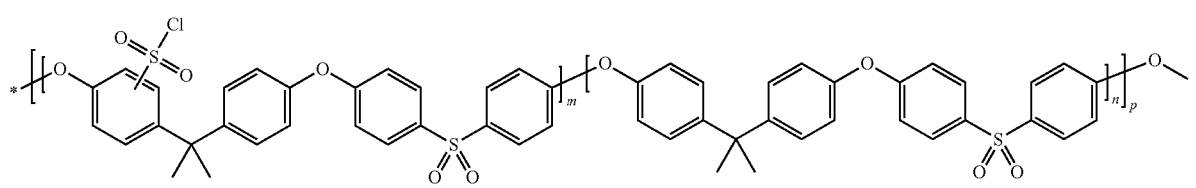
(XXX)
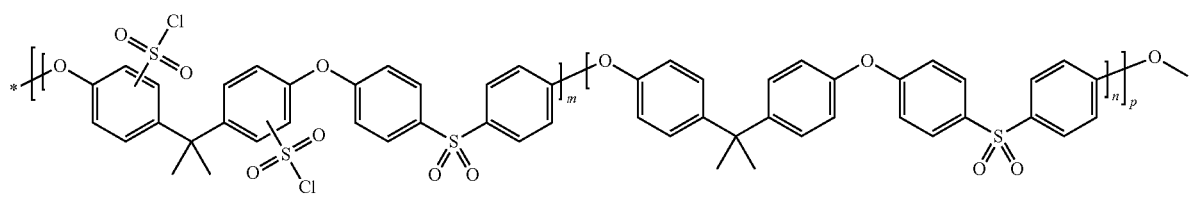
(XXXI)
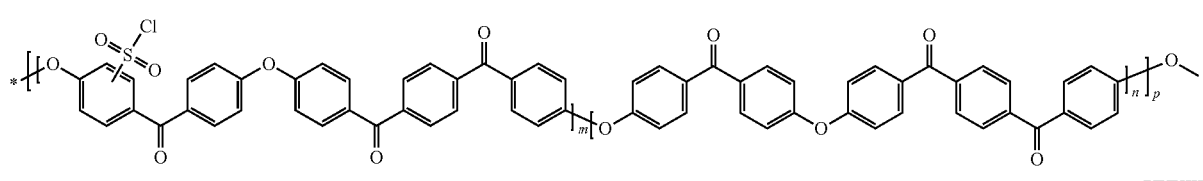
(XXXII)
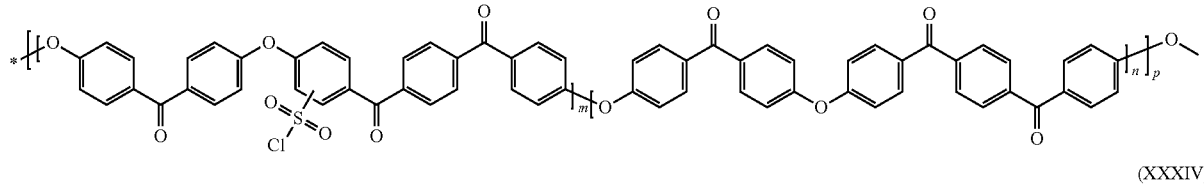
(XXXIII)
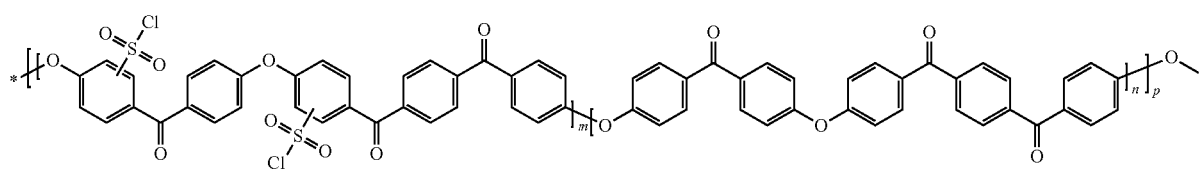
(XXXIV)

-continued (XXXV)
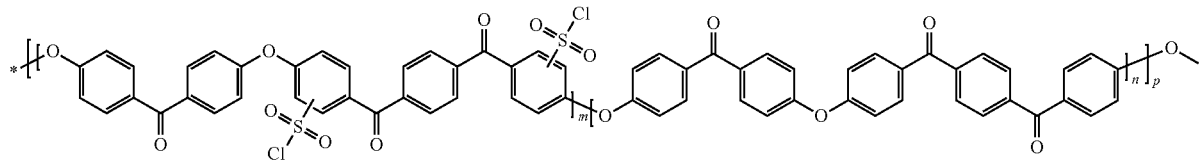

(XXXVI)
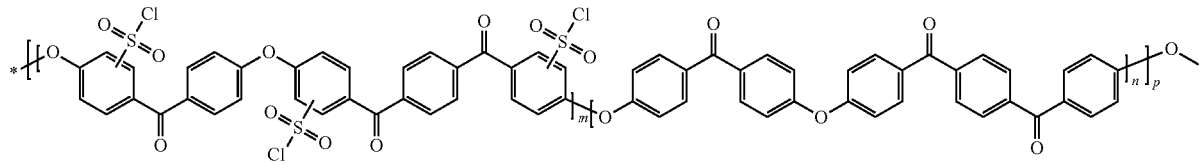

(XXXVII)
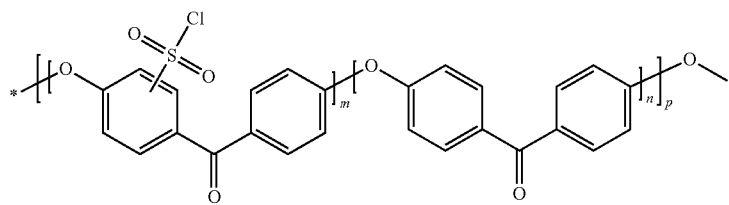

(XXXVIII)
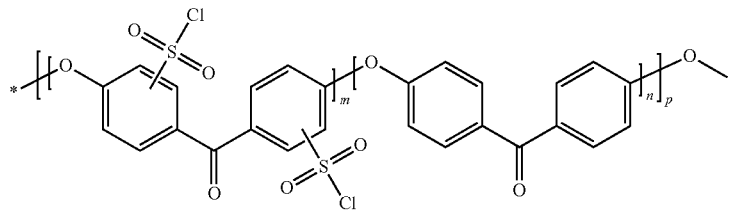

wherein:

m represents the percentage of polymer units having an oxoaryl or dioxoaryl motif functionalized by a chlorosulfonated group. This percentage varies between 50 and 100%, preferably between 90 and 100%, n represents the percentage of polymer units having a dioxoaryl motif non-functionalized by a chlorosulfonated group. This percentage varies between 0 and 50%, preferably between 0 and 10%, p represents the number of polymer units of the polymer; p varies from 40 to 300, preferably between 60 and 200.

The starting polymers are commercial products. The polymer of formula XVI is commercially known as poly(ether ether ketone) or PEEK, polymer XVII is commercially known as poly(ether ketone ketone) or PEKK (XVII)
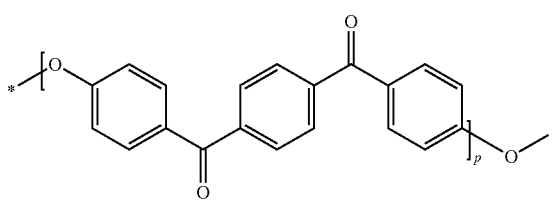

polymer XVIII is commercially known as poly(ether ether sulfone) or PEES (XVI)
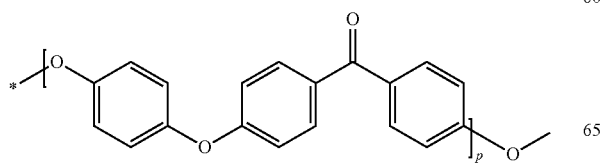

(XVIII)
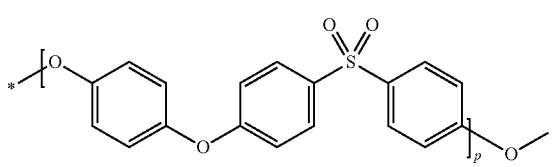

polymer XIX is commercially known as poly(ether sulfone) or PES

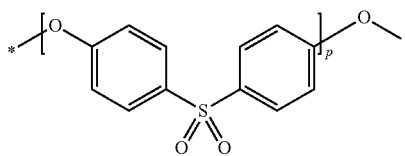
(XIX)

polymer XX belongs to the poly(arene ether ketone) family and is commercially known as poly(bisphenol A PAEK)

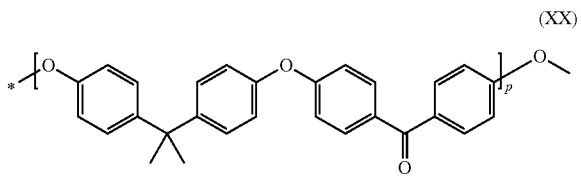
(XX)

polymer XXI belongs to the poly(arene ether sulfone) family and is commercially known as poly(bisphenol A PAES)

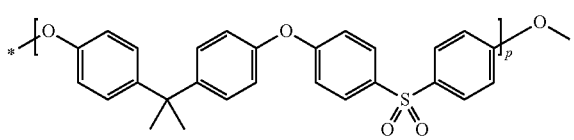
(XXI)

polymer XXII is commercially known as poly(ether ketone ether ketone ketone) or PEKEKK

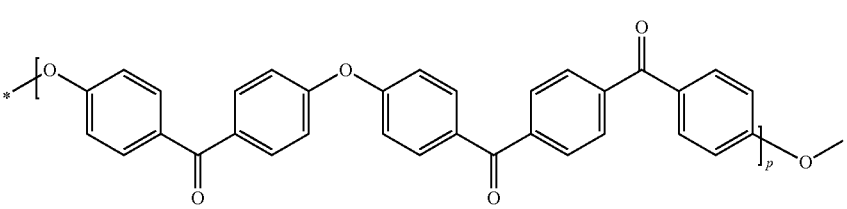
(XXII)

polymer XXIII is commercially known as poly(ether ketone) or PEK

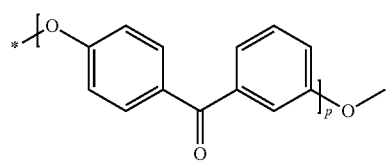
(XXIII)

This list of polymers is not exhaustive since there are many other polymers commercially available or not in the poly(aryl ether ketone), poly(aryl ether sulfone) families.

According to the invention, the preferred polymers, owing to their high availability, are PEEK, PEK, PES, PEKK and PEKEKK.

The chlorosulfonation is performed at a temperature of between 0 and 80° C. with 1 to 10 equivalents of chlorosulfonic acid, 1 to 30 equivalents of thionyl chloride, 1 to 10 equivalents of an amide, preferably N,N-dimethylformamide, with or without solvent. The solvents preferred according to the invention are THF, methyl THF, dichloromethane, dichloroethane. The chlorosulfonation of certain polymers may lead to mixtures of numerous isomers. This is particularly true for polymers XXII or PEKEKK. The chlorosulfonated polymers XXXII, XXXIII, XXXIV, XXXV and XXXVI are given as examples. Other isomers may be formed during chlorosulfonation.

2) In a second step, a reaction is produced on the polymers of formulas XXIV, XXV, XXVI, XVII, XXVIII, XIX, XXX, XXXI, XXXII, XXXIII, XXXIV, XXXV, XXXVI, XXXVII and XXXVIII with a sulfonamide of formula XXXIX in a solvent medium:

(XXXIX)

wherein:

R represents a group or different groups chosen from:
- an alkyl or cycloalkyl group having 1 to 30 linear or branched carbon atoms, optionally substituted by a cycloalkyl, aryl, perfluoroalkyl, polyfluoroalkyl, mono or polyethoxyl motif;
- a perfluoro- or polyfluoroalkyl group optionally substituted by aromatic groups;
- an aryl or polyaryl group optionally substituted by alkyl, cycloalkyl, polyfluoro- or perfluoroalkyl, motifs, by nitrile functions, by alkyl- or alkylsulfonyl functions, by fluorine atoms;

m represents the percentage of polymer units having an oxoaryl or dioxoaryl motif having a grafted bis(sulfonyl)imidide. This percentage varies between 50 and 100%, preferably between 90 and 100%, in the presence of a lithium or sodium base.

As a non-limiting example of amines capable of being used in the invention, we will cite methanesulfonamide, ethanesulfonamide, propanesulfonamide, butanesulfonamide, 1-decanesulfonamide, 1-dodecanesulfonamide, (7,7-dimethyl-2-oxobicyclo[2.2.1]heptan-1-yl) methanesulfonamide, ((1R)-7,7-dimethyl-2-oxobicyclo[2,2.1]heptan-1-yl) methanesulfonamide, (1S)-(7,7-dimethyl-2-oxobicyclo [2.2.1]heptan-1-yl)methane sulfonamide, cyclohexylmethanesulfonamide, benzene sulfonamide, toluene sulfonamide, naphthalenesulfonamides, trifluorobenzenesulfonamides, 3,5-bis(trifluoro)benzenesulfonamide, 2,5-bis(trifluoromethyl)benzenesulfonamide, 4-cyanobenzenesulfonamide 1,1,2,2,2-pentafluoroethanesulfonamide, nonafluorobutanesulfonamide, pentafluorobenzenesulfonamide, 2,3,5,6-tetrafluorobenzenesulfonamide, 4-fluorobenzenesulfonamide, 2,4-difluorobenzensulfonamide, 3,5-difluorobenzenesulfonamide, 2,3,4,5,6-pentafluorobenzenesulfonamide, 4-(trifluoromethyl)benzenesulfonamide, 3-(trifluoromethyl)benzenesulfonamide, 2-(trifluoromethyl)benzenesulfonamide, 4-methylbenzenesulfonamide, 1-naphthalenesulfonamide, 2-naphthalenesulfonamide, 3,5-difluorophenylmethanesulfonamide, 4-fluorophenylmethane sulfonamide, 3-trifluoromethylphenylmethanesulfonamide, 4-trifluoromethylphenylmethanesulfonamide, 2,5-dimethylphenylmethane sulfonamide, 2-phenylethanesulfonamide, 4-methoxybenzenesulfonamide, 4-n-butylbenzenesulfonamide, 4-t-butylbenzenesulfonamide, 4-butoxybenzenesulfonamide, 2-fluoro-5-(trifluoromethyl)benzenesulfonamide, and 4-ethylbenzenesulfonamide.

The lithium or sodium bases are preferably chosen from lithine, soda, lithium methylate, sodium methylate, lithium ethylate, sodium ethylate, lithium isopropylate, sodium isopropylate, lithium tertiobutylate, sodium tertiobutylate, lithium hydride, sodium hydride, n-butyllithium, n-butylsodium, s-butyllithium, lithium diisopropylamidide, tert-butyllithium, methyllithium, phenyllithium, phenylsodium, benzyllithium, benzylsodium, lithium dimsylate, sodium dimsylate, lithium carbonate, sodium carbonate, lithium acetate, sodium acetate. The preferred bases are those that do not form water during the reaction.

The solvents used for the condensation reaction of the amine of formula XXXIX with the chlorosulfonated polymers of formula XXIV, XXV, XXVI, XVII, XXVIII, XIX, XXX, XXXI, XXXII, XXXIII, XXXIV, XXXV, XXXVI, XXXVII and XXXVIII are polar aprotic solvents. The preferred solvents are THF, methyl THF, dioxane, dichloromethane and dichloroethane, dimethylsulfoxide.

According to a second variant, the polymers of formula I, II, III, IV, V, VI, VII, VIII, IX, X, XI, XII, XIII, XIV and XV may be obtained:

1) by performing, in a first step, the chlorosulfation of a polymer of formula XVI, XVII, XVII, XIX, XX, XXI, XXII and XXIII by a mixture of chlorosulfonic acid, thionyl chloride and a formamide according to an optimized process

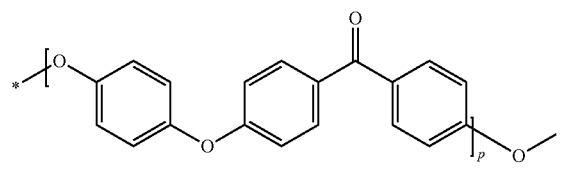

(XVI)

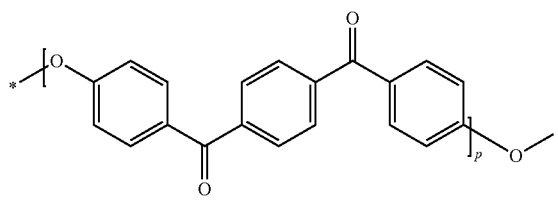

(XVII)

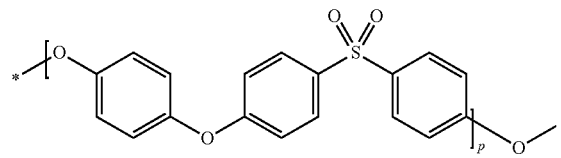

(XVIII)

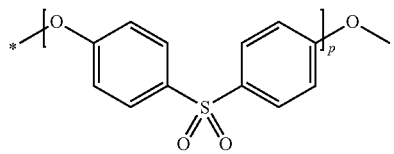

(XIX)

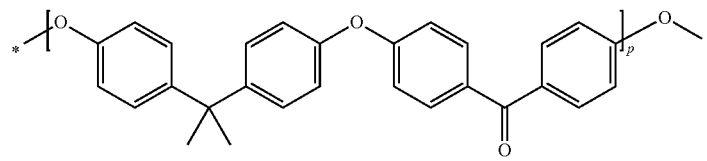

(XX)

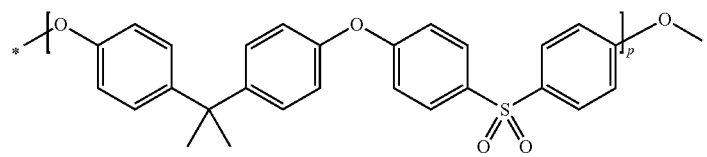

(XXI)

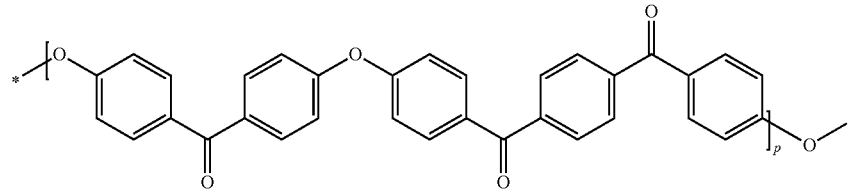

(XXII)

(XXIII)
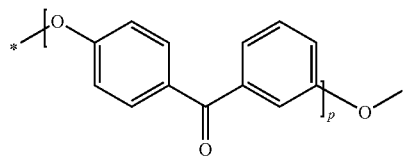
wherein:
p represents the number of polymer units of the polymer;
p varies from 40 to 300, preferably between 60 and 200,
to obtain the polymers of formulas XXIV, XXV, XXVI, XXVII, XXVIII, XXIX, XXX, XXXI, XXXII, XXXIII, XXXIV, XXXV, XXXVI, XXXVII and XXXVIII:
(XXIV)
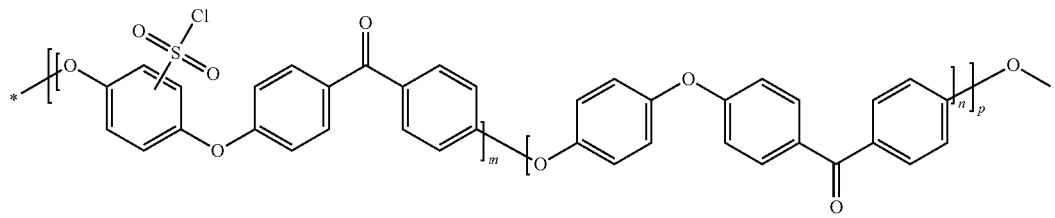
(XXV)
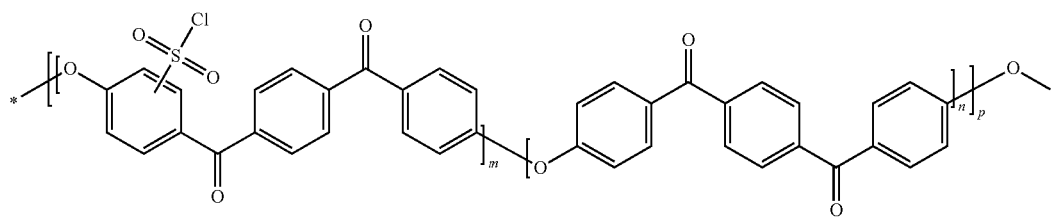
(XXVI)
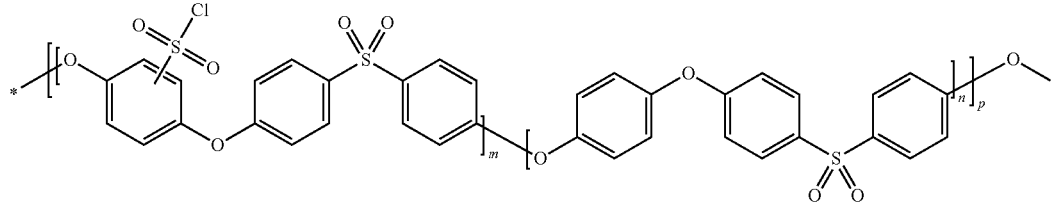
(XXVII)
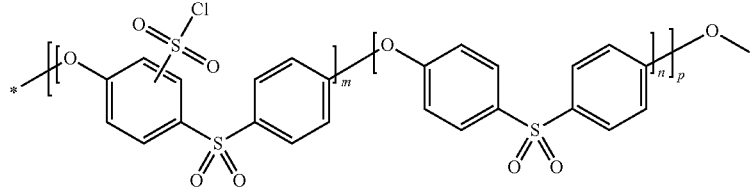
(XXVIII)
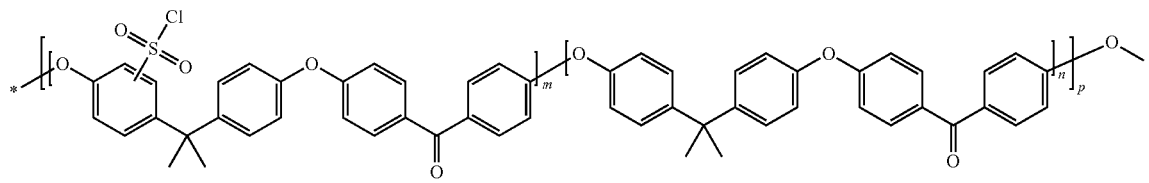
(XXIX)
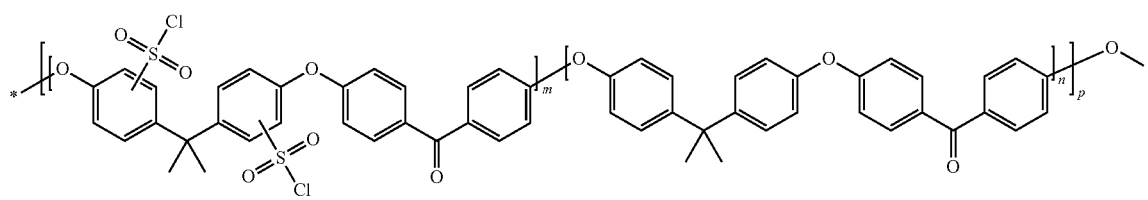

-continued
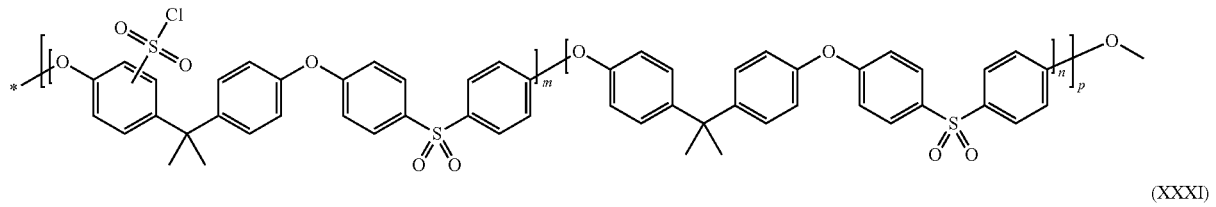
(XXX)
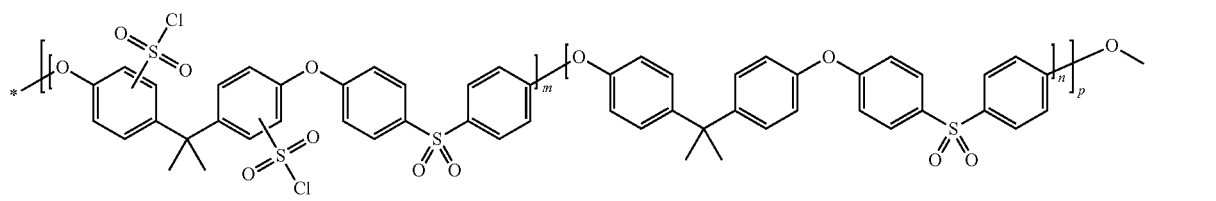
(XXXI)
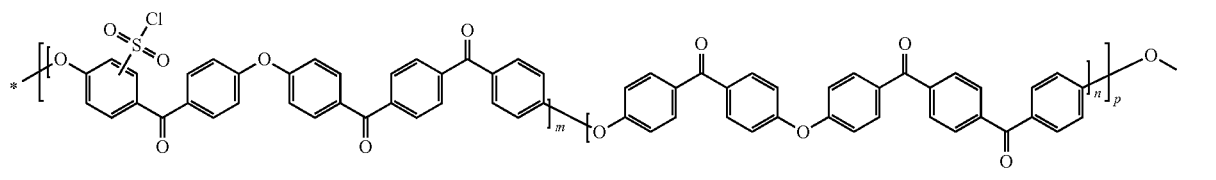
(XXXII)
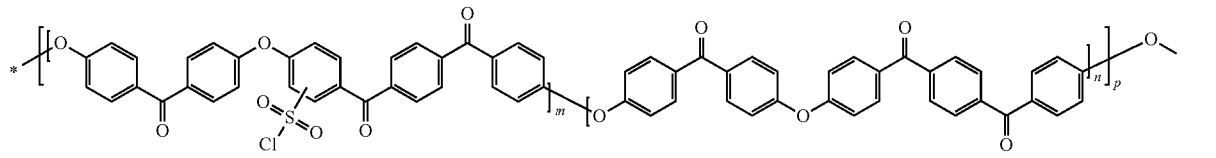
(XXXIII)
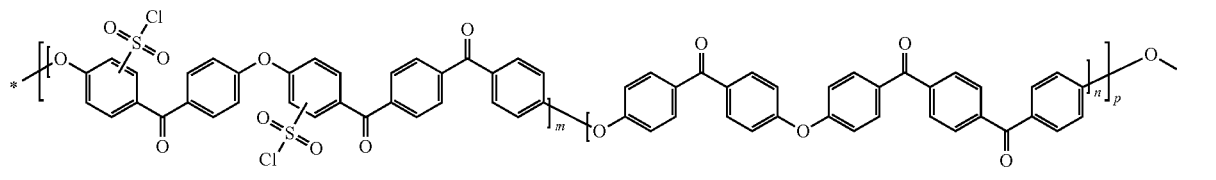
(XXXIV)
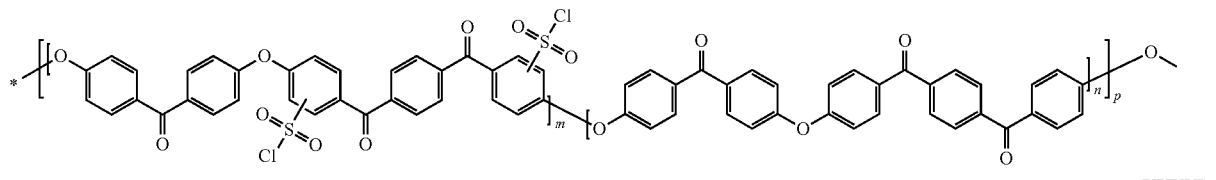
(XXXV)
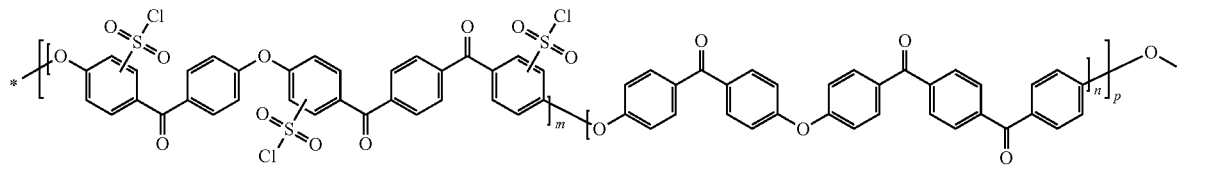
(XXXVI)
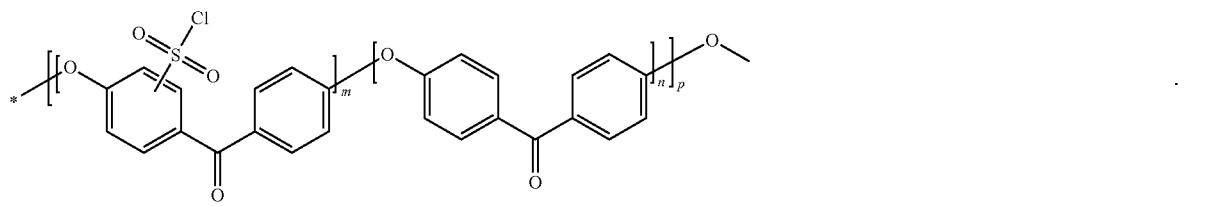
(XXXVII)

-continued

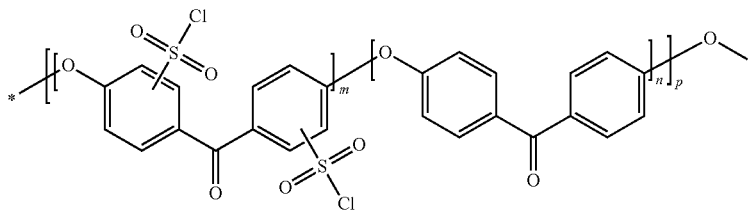
(XXXVIII)

wherein:
- m represents the percentage of polymer units having an oxoaryl or dioxoaryl motif functionalized by a chlorosulfonated group. This percentage varies between 50 and 100%, preferably between 90 and 100%,
- n represents the percentage of polymer units having a dioxoaryl motif non-functionalized by a chlorosulfonated group. This percentage varies between 0 and 50%, preferably between 0 and 10%,
- p represents the number of polymer units of the polymer; p varies from 40 to 300, preferably between 60 and 200.

The starting polymers are commercial products. The polymer of formula XVI is commercially known as poly(ether ether ketone) or PEEK,

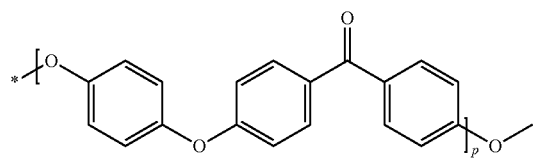
(XVI)

polymer XVII is commercially known as poly(ether ketone ketone) or PEKK

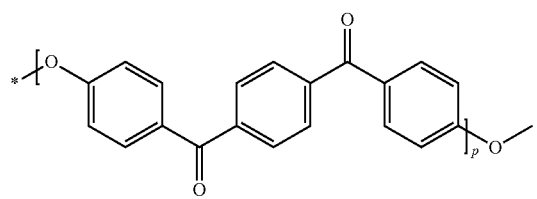
(XVII)

polymer XVIII is commercially known as poly(ether ether sulfone) or PEES

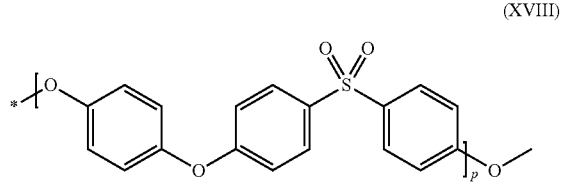
(XVIII)

polymer XIX is commercially known as poly(ether sulfone) or PES

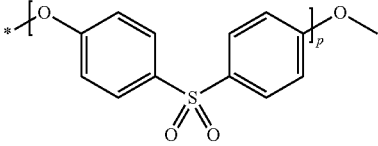
(XIX)

polymer XX belongs to the poly(arene ether ketone) family and is commercially known as poly(bisphenol A PAEK)

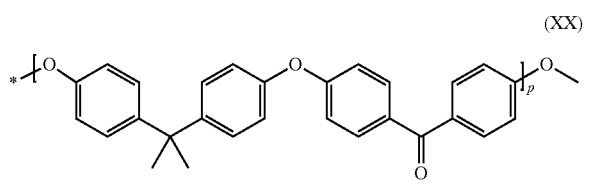
(XX)

polymer XXI belongs to the poly(arene ether sulfone) family and is commercially known as poly(bisphenol A PAES)

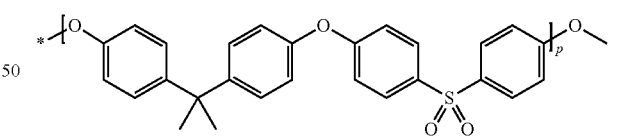
(XXI)

polymer XXII is commercially known as poly(ether ketone ether ketone ketone) or poly(ether ketone ether ketone ketone) or PEKEKK

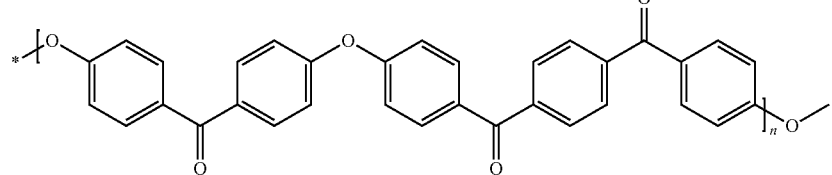
(XXII)

polymer XXIII is commercially known as poly(ether ketone) or poly(ether ketone) or PEK

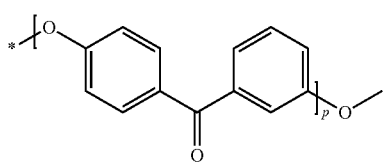
(XXIII)

This list of polymers is not exhaustive since there are many other polymers commercially available or not in the poly(aryl ether ketone), poly(aryl ether sulfone) families. According to the invention, the preferred polymers, owing to their high availability, are PEEK, PEK, PES, PEKK and PEKEKK.

The chlorosulfonation is performed at a temperature of between 0 and 80° C. With respect to the oxoaryl or dioxoaryl motifs to be chlorosulfonated, 1 to 10 chlorosulfonic acid equivalents 1 to 30 thionyl chloride equivalents, 1 to 10 equivalents of an amide, preferably N,N-dimethylformamide, with or without solvent are added. The solvents preferred according to the invention are THF, methyl THF, dichloromethane, dichloroethane. The chlorosulfonation of certain polymers may lead to mixtures of numerous isomers. This is particularly true for polymers XXII or PEKEKK. The chlorosulfonated polymers XXXI, XXXII, XXXIII, XXXIV, XXXV and XXXVI are given as examples. Other isomers may be formed during chlorosulfonation.

2) In a second step, a reaction is produced on the polymers of formulas XXIV, XXV, XXVI, XVII, XXVIII, XIX, XXX, XXXI, XXXII, XXXIII, XXXIV, XXXV, XXXVI, XXXVII and XXXVIII in solution with ammonia gas or an ammonia solution in order to obtain the polymers of formula XL, XLI, XLII, XLIII, XLIV, XLV, XLVI, XLVII, XLVIII, XLIX, L, LI, LII, LIII and LIV,

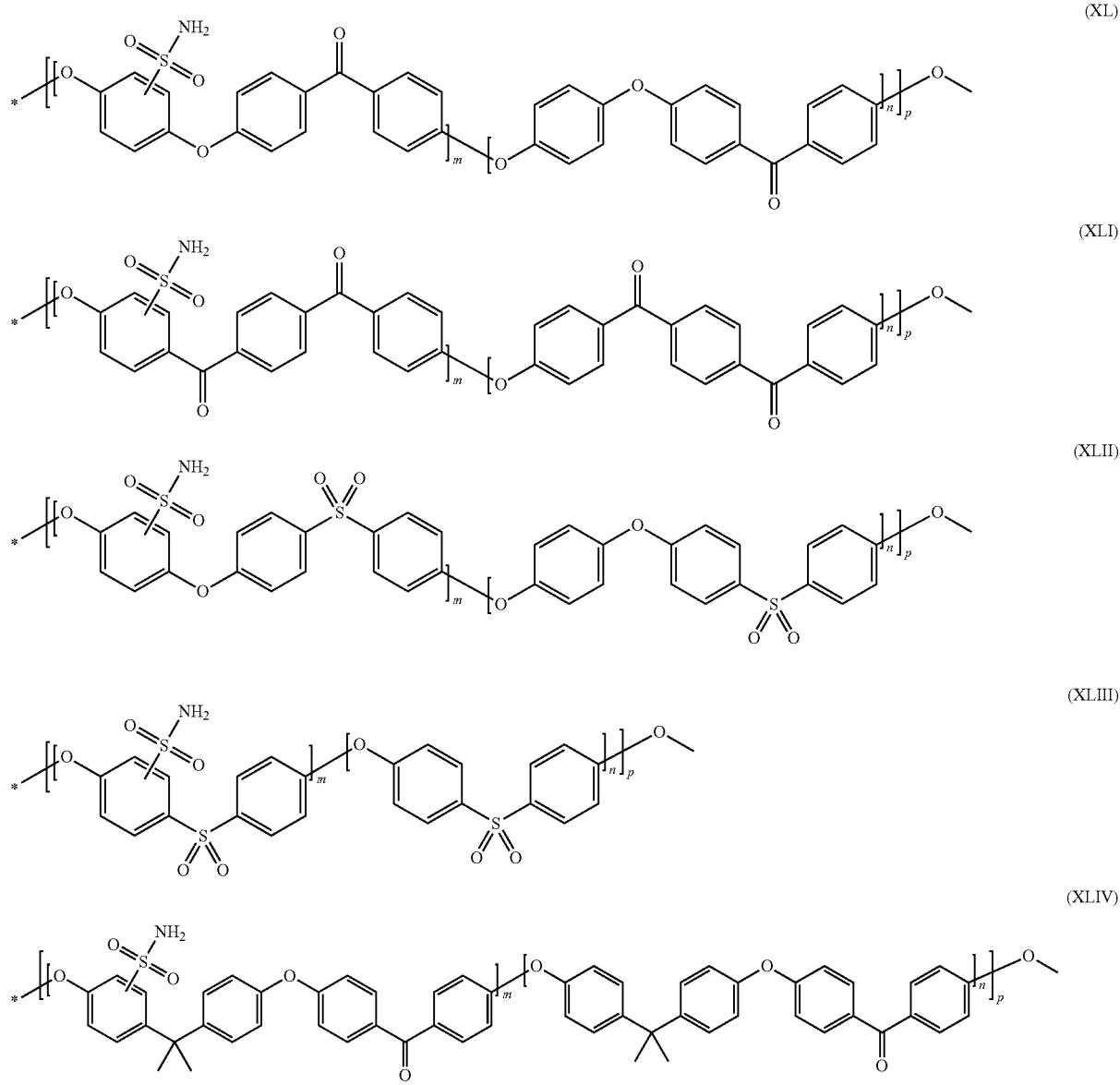

-continued
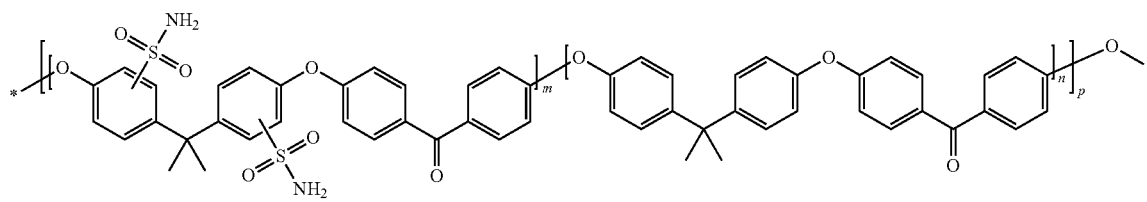
(XLV)
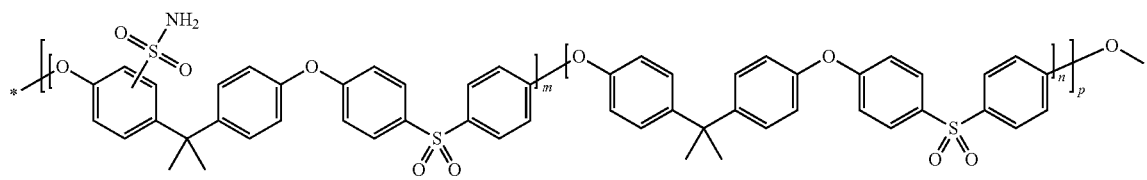
(XLVI)
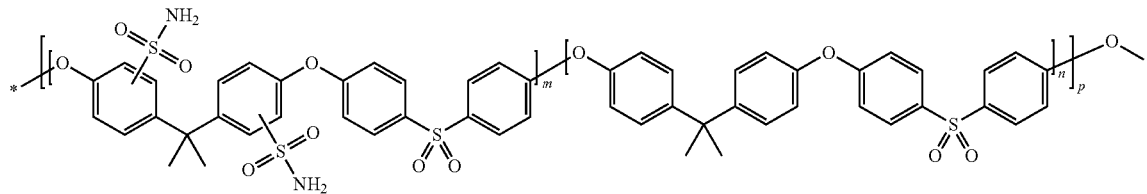
(XLVII)
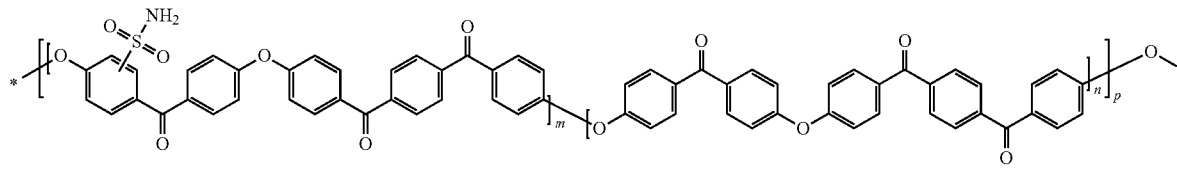
(XLVIII)
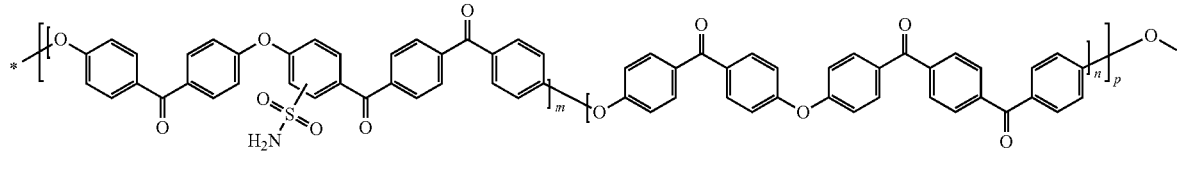
(XLIX)
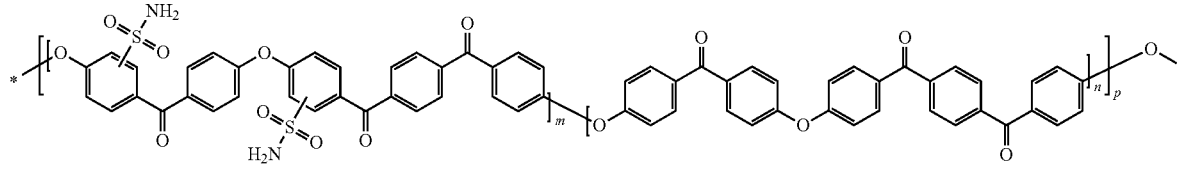
(L)
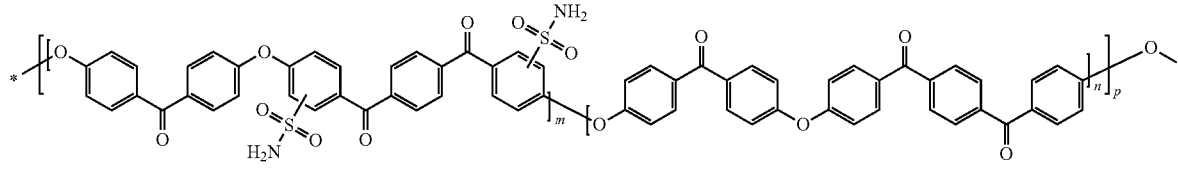
(LI)
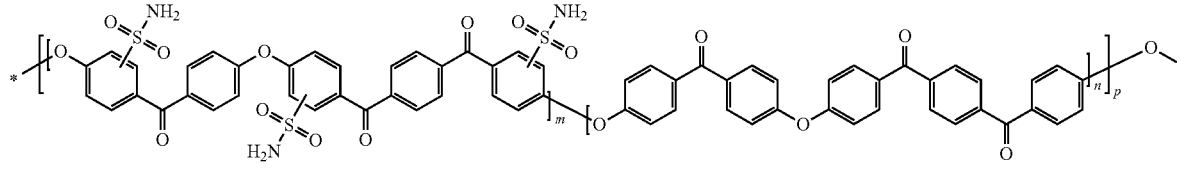
(LII)

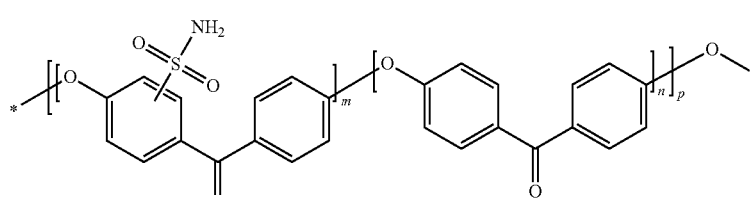

(LIII)

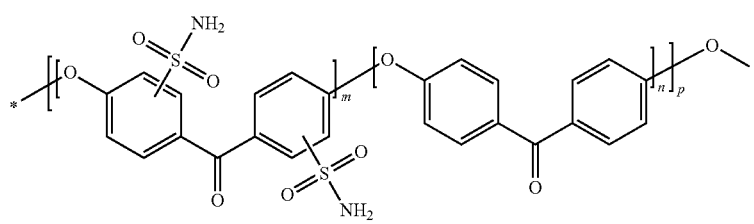

(LIV)

wherein:
m represents the percentage of polymer units having a functionalized oxoaryl or dioxoaryl motif having a sulfonamide function. This percentage varies between 50 and 100%,
n represents the percentage of polymer units having an oxoaryl or dioxoaryl motif non-functionalized by a sulfonamide function. This percentage varies between 0 and 50%,
p represents the number of polymer units of the polymer; p varies from 40 to 300, preferably between 60 and 200.

To perform this reaction with ammonia, the polymers are solubilized in a solvent such as an ether, a halogenoalkane or an aromatic compound. The ammonia is introduced in the form of gas or a solution in an ether-type solvent, a halogenoalkane, an aromatic compound. The preferred solvents are dichloromethane, 1,2-dichloroethane, THF, methyl THF, diisopropyl ether, diethyl ether, anisole, methanol, dioxane, isopropanol. The amination of the polymers with the ammonia is performed at a temperature of between −20° C. and 60° C. With respect to the number of the chlorosulfonyl function of the polymer of formula XXIV, XXV, XXVI, XVII, XXVIII, XIX, XXX, XXXI, XXXII, XXXIII, XXXIV, XXXV, XXXVI, XXXVII and XXXVIII, 2 to 12 equivalents of ammonia, preferably 2 to 5 equivalents of ammonia are introduced. The tests are performed at a temperature of between −20° C. and 60° C., preferably between 0 and 30° C.

The polymers of formulas XL, XLI, XLII, XLIII, XLIV, XLV, XLVI, XLVII, XLVIII, XLIX, L, LI, LII, LIII and LIV are novel intermediates.

3) In a third step, a reaction is produced on the polymers of formula XL, XLI, XLII, XLIII, XLIV, XLV, XLVI, XLVII, XLVIII, XLIX, L, LI, LII, LIII and LIV with a sulfonyl halogenide of formula LV,

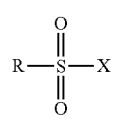

(LV)

wherein:
X represents a fluorine or chlorine or bromine atom or a trifluoromethanesulfonyl or alkylsulfonyl or arylsulfonyl group;

R represents a group or different groups chosen from:
an alkyl or cycloalkyl group having 1 to 30 linear or branched carbon atoms, optionally substituted by a cycloalkyl, aryl, perfluoroalkyl, polyfluoroalkyl, mono or polyethoxyl motif;
a perfluoro- or polyfluoroalkyl group optionally substituted by aromatic groups;
an aryl or polyaryl group optionally substituted by alkyl, cycloalkyl, polyfluoro- or perfluoroalkyl, motifs, by nitrile functions, by alkyl- or alkylsulfonyl functions, by fluorine atoms;
in the presence of a lithium or sodium base at a temperature of between 0 and 80° C., preferably between 20 and 60° C. in a solvent medium.

Preferably, the following will be chosen as the R group of the sulfonyl halogenide (LV): an alkyl group having 1 to 10 linear or branched carbon atoms optionally substituted by a cycloalkyl or aryl motif; a cycloalkyl group; a perfluoro- or polyfluoroalkyl group optionally substituted by aromatic groups; an aryl or polyaryl group optionally substituted by alkyl, cycloalkyl, polyfloro- or perfluoroalkyl chains, alkoxy, nitrile functions, alkylsulfonyl functions, or one or more fluorine atoms.

Very preferably, the halogenide is chosen from the methyl, ethyl, propyl, cyclopropyl, butyl, 1-decyl, 1-dodecyl, 1-hexanedecyl, 1-octyldecyl, (7,7-dimethyl-2-oxobicyclo[2.2.1]heptan-1-yl)methyl, ((1R)-7,7-dimethyl-2-oxobicyclo[2.2.1]heptan-1-yl)methyl, (1S)-(7,7-dimethyl-2-oxobicyclo[2.2.1]heptan-1-yl)methyl, cyclohexylmethyl, trifluoromethyl, phenyl, tolyl, naphthyl, 4-trifluoromethylphenyl, 3,5-bis (trifluoromethyl)phenyl, trifluorophenyl, 4-cyanophenyl, 1,1,2,2,2-pentafluoroethanyle, nonafluorobutyl, pentaflurophenyl, 2,3,5,6-tetrafluorophenyl, 4-fluorophenyl, 2,4-difluorophenyl, 3,5-difluorophenyl, 2, 3,4,5, 6-pentafluorophenyl, 4-(trifluoromethyl)phenyl, 3-(trifluoromethyl)phenyl, 2-(trifluoromethyl)phenyl, 4-methylphenyl, 1-naphthyl, 2-naphthyl, 3,5-difluorobenzyl, 4-fluorobenzyle, 3-trifluoromethylbenzyl, 4-trifluoromethylbenzyl, 2,5-dimethylbenzyl, 2-phenylethyl, 4-methoxyphenyl, 4-n-butylphenyl, 4-t-butylphenyl, 4-butoxyphenyl, 2-fluoro-5-(trifluoromethyl)phenyl, 4-ethylphenyl chlorides, bromides and fluorides.

The lithium or sodium bases are preferably chosen from lithine, soda, lithium methylate, sodium methylate, lithium ethylate, sodium ethylate, lithium isopropylate, sodium isopropylate, lithium tertiobutylate, sodium tertiobutylate, lithium hydride, sodium hydride, n-butyllithium, n-butylsodium, s-butyllithium, lithium diisopropylamidure, tert-butyllithium, methyllithium, phenyllithium, phenylsodium, benzyllithium, benzylsodium, lithium dimsylate, sodium dimsylate, lithium carbonate, sodium carbonate, lithium acetate and sodium acetate. The preferred bases are those that do not form water during the reaction.

The preferred solvents are dichloromethane, 1,2-dichloroethane, THF, methyl THF, diisopropyl ether, DMSO, methanol, dioxane, isopropanol.

As non-limiting examples of sulfonylation agents capable of being used in the invention, we will cite 4-biphenylsulfonyl chloride, 4-chlorobenzenesulfonyl chloride, methanesulfonyl chloride, ethanesulfonyl chloride, 3-fluorobenzenesulfonyl chloride, 4-fluorosulfonyl chloride, 4-butylbenzenesulfonyl chloride, 2-naphthalenesulfonyl chloride, trifluoromethanesulfonyl chloride, 2,3,5,6-tetrafluorobenzenesulfonyl chloride, 4-fluorobenzenesulfonyl chloride, 3,5-difluorobenzenesulfonyl chloride, 2,3,4,5,6-pentafluorobenzenesulfonyl chloride, 4-cyanobenzenesulfonyl chloride, 4-nitrobenzenesulfonyl chloride, 4-(trifluoromethyl)benzenesulfonyl chloride, 3-(trifluoromethyl)benzenesulfonyl chloride, 2-(trifluoromethyl)benzenesulfonyl chloride, trifluoromethanesulfonyl fluoride, pentaethanesulfonyl fluoride, nonafluorobutanesulfonyl fluoride, methanesulfonyl bromide, triflic anhydride, methanesulfonic anhydride, and 4-methylbenzenesulfonyl bromide.

All of the reactions are preferably performed with anhydrous solvents, preferably freshly distilled and in an inert and anhydrous atmosphere. By anhydrous atmosphere, we mean an atmosphere under a nitrogen or argon current.

The method developed by the applicant implements inexpensive products and results in electrolytes compatible with the market expectations, and in which the performance is equal or superior to the best products.

Surprisingly and unexpectedly, it was noted that the polymers of formula I, II, III, IV, V, VI, VII, VIII, IX, X, XI, XII, XIII, XIV and XV were particularly filmogenic, which is a clear advantage for the intended use. They may be used to form films having a thickness of between 10 μm and 200 μm, which have good mechanical resistance. In practice, these films may be handled by an operator without being torn. It should be noted that polymers I, II, III, IV, V, VI, VII, VIII, IX, X, XI, XII, XIII, XIV and XV are not cross-linked in the films obtained. These polymers according to the invention are in fact rigid enough to obtain mechanically resistant films without cross-linking. The films are prepared in anhydrous solvents, preferably DMSO.

Thus films of the polymers of formula I, II, III, IV, V, VI, VII, VIII, IX, X, XI, XII, XIII, XIV and XV may easily be obtained by evaporation of a polymer solution deposited on a surface of a material such as glass, Teflon, or plastic. The evaporation is performed at a temperature of between 20 and 80° C. The evaporation of the solvent is performed by heating, by inert gas sweeping and/or by applying reduced pressure.

The films of polymers of formulas I, II, III, IV, V, VI, VII, VIII, IX, X, XI, XII, XIII, XIV and XV are very good electrolytes. The conductivities obtained are between $10^{-8}$ and $2 \times 10^{-3}$ S/cm in a solvent medium and without solvent. The films of polymers of formulas I, II, III, IV, V, VI, VII, VIII, IX, X, XI, XII, III, XIV and XV are characterized by a very wide range of uses at temperatures ranging from 20 to 100° C. It should be noted that the polymers according to the invention do not have polyoxyethyleneglycol motifs. However, it is known that these motifs are a favorable factor for the conductivity of lithium ions, and it was not obvious that, with polymers not containing polyoxyethyleneglycol motifs, or, necessarily, fluorine, such high conductivities as can be obtained.

BRIEF DESCRIPTION OF THE DRAWINGS

FIG. 1 shows the change in conductivity of the polymer described in example 7 below as a function of the temperature and in comparison with a polymer electrolyte described in the literature.

DETAILED DESCRIPTION OF PARTICULAR EMBODIMENTS

The examples below are presented as non-limiting illustrations of the subject matter of the present invention.

Example 1—Chlorosulfonation of PEEK. Preparation of Polymer XXIV

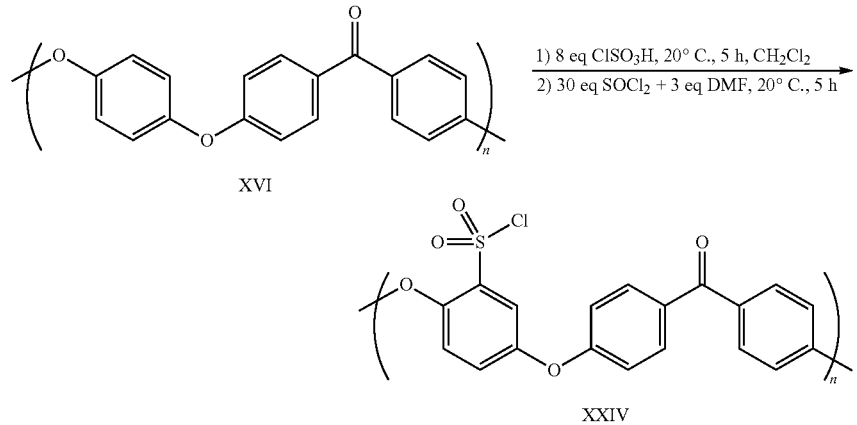

In a nitrogen atmosphere, in a cylindrical glass reactor, 1.0 g of PEEK (XVI) is directly weighed, then 160 mL of distilled dichloromethane are added so as to have a PEEK (XVI) molar concentration of 0.022 M. All of the solvents used during these syntheses were distilled, stored and collected in a nitrogen atmosphere.

The chlorosulfonic acid (3.24 g, 8 equivalents with respect to the number of polymer units of the PEEK (XVI)) is introduced by means of a syringe (1.85 mL), taking care to work under a nitrogen flow. The reaction mixture is agitated at 20° C. for 5 h. At the end of the reaction, the formation of an orange viscous compound is observed. The supernatant is removed while taking care to work under a nitrogen flow.

Then, thionyl chloride (12.29 g, 30 equivalents with respect to the number of polymer units of the PEEK (XVI)) is introduced by means of a syringe (7.50 mL), taking care to work under a nitrogen flow. Then, N,N-dimethylformamide (0.76 g, 3 equivalents with respect to the number of polymer units of the PEEK (XVI)) is added by means of a syringe (0.81 mL) taking care to work under a nitrogen flow. The reaction mixture is again agitated at 20° C. for 5 h, then 40 mL of distilled THF are added. At the end of the reaction, an orange solution is observed.

The orange solution is precipitated in propan-2-ol (250 mL), and a white precipitate forms. The solid is filtered, then washed with 2 times 50 mL of propan-2-ol and 2 times 50 mL of acetonitrile, then dried for one night under vacuum (1.10$^{-2}$ mbar).

The $^1$H NMR spectrum produced in DMSO-D6 ($^1$H NMR (200 MHz) δ 7.92-7.69 (m, 4H), 7.50 (d, J=2.7 Hz, 1H), 7.36-6.83 (m, 6H)) confirms the expected structure. The integration of the peak at 7.50 ppm in $^1$H NMR allows us to know the chlorosulfonation rate of the PEEK (XVI). The chlorosulfonation rate of the dioxoaryl motifs is 100%.

The PEEKSO$_2$Cl (XXIV) polymer weight yield is 98% with respect to the PEEK (XVI) used.

Example 2-6 Preparation of Polymer XXIV with Different Functionalization Rate

According to the protocol described in example 1, the following polymers were prepared:

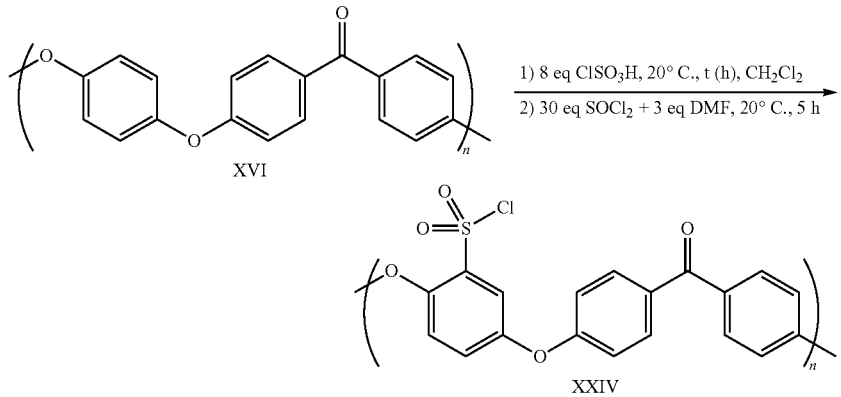

The differences with respect to the protocol described in example 1 are:
the starting PEEK (XVI) product mass
the reaction time of the first step

| Examples | $m_{PEEK}$ (g) | t (h) | Functionalization rate (%) | Mass yield (%) |
|---|---|---|---|---|
| 2 | 1 | 3 | 72 | 91 |
| 3 | 2 | 4 | 81 | 93 |
| 4 | 2 | 5 | 93 | 97 |
| 5 | 5 | 15 | 96 | 96 |
| 6 | 10 | 15 | 99 | 96 |

Example 7—Chlorosulfonation of PEES. Preparation of Polymer XXVI

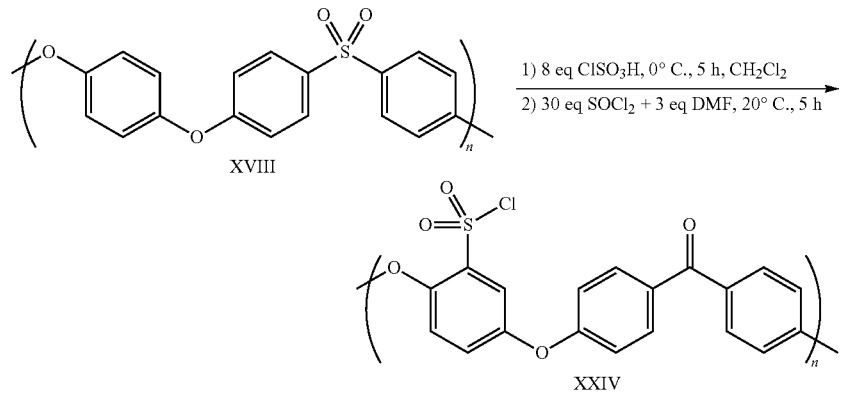

In a nitrogen atmosphere, in a cylindrical glass reactor, 1.0 g of PEES (XVIII) is directly weighed, then 160 mL of distilled dichloromethane are added so as to have a PEES (XVIII) molar concentration of 0.019 M. All of the solvents used during these syntheses were distilled, stored and collected in a nitrogen atmosphere.

The chlorosulfonic acid (2.88 g, 8 equivalents with respect to the number of polymer units of the PEES (XVIII)) is introduced by means of a syringe (1.64 mL), taking care to work under a nitrogen flow. The reaction mixture is agitated at 0° C. for 5 h. At the end of the reaction, the formation of a brown viscous compound is observed. The supernatant is removed while taking care to work under a nitrogen flow.

Then, thionyl chloride (10.93 g, 30 equivalents with respect to the number of polymer units of the PEES (XVIII)) is introduced by means of a syringe (6.6 mL), taking care to work under a nitrogen flow. Then, N,N-dimethylformamide (0.76 g, 3 equivalents with respect to the number of polymer units of the PEES (XVIII)) is added by means of a syringe (0.68 mL) taking care to work under a nitrogen flow. The reaction mixture is again agitated at 20° C. for 5 h, then 15 mL of distilled $Ch_2Cl_2$ are added. At the end of the reaction, a brown solution is observed.

The brown solution is precipitated in propan-2-ol (250 mL), and a white precipitate forms. The solid is filtered, then washed with 2 times 50 mL of propan-2-ol and 2 times 50 mL of acetonitrile, then dried for one night under vacuum ($1.10^{-2}$ mbar).

The $^1$H NMR spectrum produced in DMSO-D6 CH NMR (200 MHz) δ 7.91 (ddd, J=18.6, 8.8, 2.9 Hz, 4H), 7.44 (s, 1H), 7.18 (d, J=7.2 Hz, 4H), 6.99 (d, J=7.3 Hz, 2H) confirms the expected structure.

The integration of the peak at 7.44 ppm in $^1$H NMR allows us to know the chlorosulfonation rate of the PEES (XVIII). The chlorosulfonation rate of the dioxoaryl motifs is 100%.

The PEESSO$_2$Cl XXVI polymer weight yield is 93% with respect to the PEES (XVIII) used.

Example 8—Chlorosulfonation of PES. Preparation of polymer XXVII

C., the PES (XIX) is solubilized. All of the solvents used during these syntheses were distilled, stored and collected in a nitrogen atmosphere.

The chlorosulfonic acid (0.527 g, 2.1 equivalents with respect to the number of polymer units of the PES (XIX)) is introduced by means of a syringe (0.30 mL), taking care to work under a nitrogen flow. The reaction mixture is agitated at 42° C. for 18 h. At the end of the reaction, the formation of a yellow viscous compound is observed. The supernatant is removed while taking care to work under a nitrogen flow.

Then, thionyl chloride (2.03 g, 8 equivalents with respect to the number of polymer units of the PES (XIX)) is introduced by means of a syringe (1.24 mL), taking care to work under a nitrogen flow. Then, N,N-dimethylformamide (0.47 g, 3 equivalents with respect to the number of polymer units of the PES (XIX)) is added by means of a syringe (0.50 mL) taking care to work under a nitrogen flow. The reaction mixture is again agitated at 20° C. for 5 h, then 15 mL of distilled $CH_2Cl_2$ are added. At the end of the reaction, a yellow solution is observed.

The yellow solution is precipitated in propan-2-ol (80 mL), and a white precipitate forms. The solid is filtered, then washed with 2 times 20 mL of propan-2-ol and 3 times 20 mL of acetonitrile, then dried for one night under vacuum ($1.10^{-2}$ mbar).

The $^1$H NMR spectrum produced in DMSO-D6 ($^1$H NMR (200 MHz) δ 8.29 (s, 1H), 7.92 (s, 3H), 7.19 (s, 3H)) confirms the expected structure. The integration of the peak at 8.29 ppm in $^1$H NMR allows us to know the chlorosulfonation rate of the PES (XIX). The chlorosulfonation rate of the oxoaryl motifs is 100%.

The PESSO$_2$Cl (XXVII) polymer weight yield is 98% with respect to the PES (XIX) used.

Example 9—Preparation of Polymer XL: PEEKSO$_2$NH$_2$

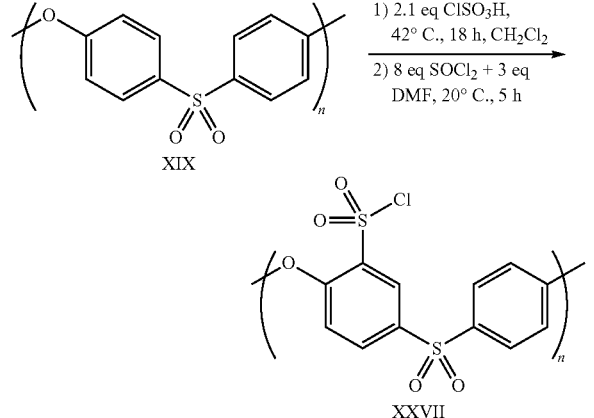

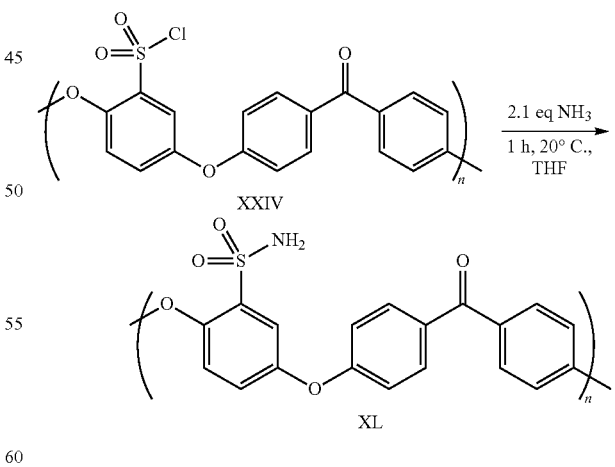

In a nitrogen atmosphere, in a cylindrical glass reactor, 0.5 g of PES (XIX) is directly weighed, then 80 mL of distilled dichloromethane are added so as to have a PES (XIX) molar concentration of 0.027 M; after 1 hour under agitation at 20°

In a nitrogen atmosphere, a solution of 0.300 g of PEEKSO$_2$Cl (XXIV) prepared according to example 1 is prepared in 10 mL of distilled tetrahydrofuran so as to have a PEEKSO$_2$Cl (XXIV) molar concentration of 0.078 M.

All of the solvents used in these syntheses were distilled, stored and collected in a nitrogen atmosphere.

This solution is slowly added to an ammonia solution (4.2 mL [C]=0.5 M in THF, 2.1 equivalents with respect to the PEEKSO₂Cl (XXIV) in 10 mL of tetrahydrofuran at 0° C., then return to 20° C. The reaction mixture is agitated at 20° C. for 1 hour. At the end of the reaction, the formation of a white precipitate is observed.

The reaction mixture is filtered and the solid is washed with 2 times 10 mL of tetrahydrofuran. The solvent of the filtrate is evaporated with a rotary evaporator, then the product obtained is dried for one night under vacuum ($1.10^{-2}$ mbar).

The $^1$H NMR spectrum produced in DMSO-D6 ($^1$H NMR (200 MHz) δ 8.07-7.90 (m, 4H), 7.65-7.29 (m, 11H) and 7.29-7.13 (m, 4H) confirms the expected structure.

The PEEKSO₂NH₂ (XL) weight yield is 96% with respect to the PEEKSO₂Cl (XXIV) polymer used.

Example 10—Preparation of Polymer XLII: PEESSO₂NH₂

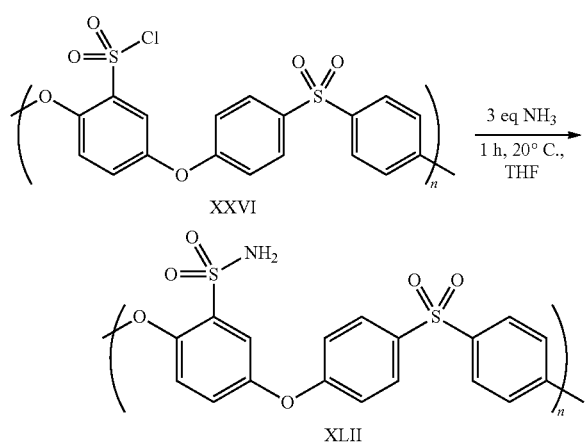

In a nitrogen atmosphere, a solution of 0.300 g of PEESSO₂Cl (XXVI) prepared according to example 7 is prepared in 17 mL of distilled tetrahydrofuran and 3 mL of N,N-dimethylformamide so as to have a PEESSO₂Cl (XXVI) molar concentration of 0.035 M. All of the solvents used in these syntheses were distilled, stored and collected in a nitrogen atmosphere.

This solution is slowly added to an ammonia solution (8.7 mL [C]=0.5 M in THF, 3 equivalents with respect to the PEESSO₂Cl (XXVI) in 10 mL of tetrahydrofuran at 0° C., then return to 20° C. The reaction mixture is agitated at 20° C. for 1 hour. At the end of the reaction, the formation of a white precipitate is observed.

The reaction mixture is filtered and the solid is washed with 2 times 10 mL of acetonitrile, then the product obtained is dried for one night under vacuum ($1.10^{-2}$ mbar).

The $^1$H NMR spectrum produced in DMSO-D6 ($^1$H NMR (200 MHz) δ 7.98 (dd, J=8.7, 4.2 Hz, 4H), 7.63-7.30 (m, 5H) and 7.21 (dd, J=8.4, 4.7 Hz, 4H) confirms the expected structure.

The PEESSO₂NH₂ (XLII) polymer weight yield is 92% with respect to the PEESSO₂Cl (XXVI) polymer used.

Example 11—Preparation of Polymer XLIII: PESSO₂NH₂

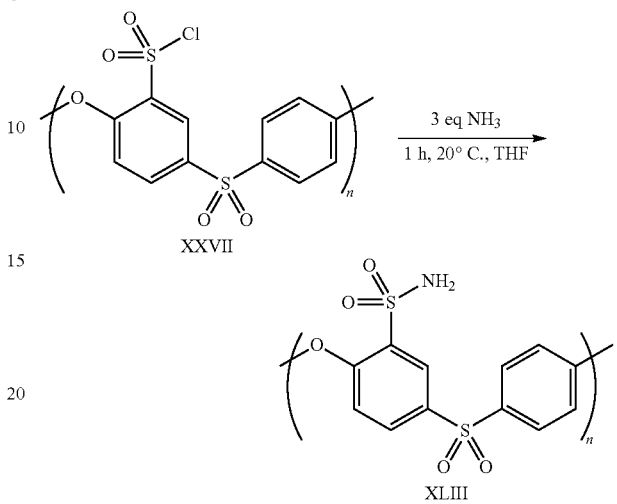

In a nitrogen atmosphere, a solution of 0.300 g of PESSO₂Cl (XXVII) prepared according to example 8 is prepared in 10 mL of distilled tetrahydrofuran so as to have a PESSO₂Cl (XXVII) molar concentration of 0.091 M. All of the solvents used in these syntheses were distilled, stored and collected in a nitrogen atmosphere.

This solution is slowly added to an ammonia solution (10 mL [C]=0.5 M in THF, 3 equivalents with respect to the PESSO₂Cl (XXVII) in 10 mL of tetrahydrofuran at 0° C., then return to 20° C. The reaction mixture is agitated at 20° C. for 1 hour. At the end of the reaction, the formation of a white precipitate is observed.

The reaction mixture is filtered and the solid is washed with 2 times 10 mL of tetrahydrofuran. The solvent of the filtrate is evaporated with a rotary evaporator, then the product obtained is dried for one night under vacuum ($1.10^{-2}$ mbar).

The $^1$H NMR spectrum produced in DMSO-D6 CH NMR (200 MHz) δ 7.79 (s, 3H) 7.58 (s, 1H), 7.50-7.35 (m, 1H), 7.33-7.02 (m, 4H) confirms the expected structure.

The PESSO₂NH₂ (XLIII) weight yield is 98% with respect to the PESSO₂Cl (XXVII) polymer used.

Example 12—Preparation of Polymer Ia with R=CH₃ and M=Li

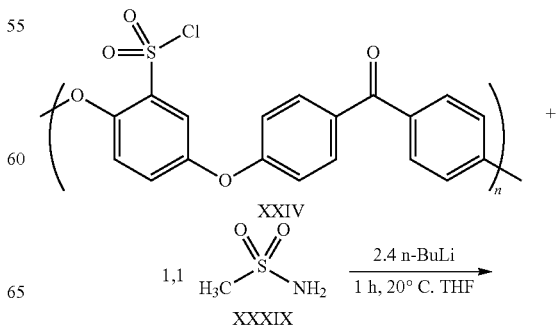

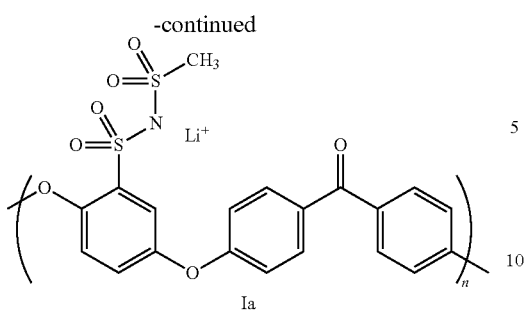

Ia

In a nitrogen atmosphere, a solution of 0.200 g of PEEKSO$_2$Cl (XXIV) prepared according to example 1 is prepared in 10 mL of distilled tetrahydrofuran so as to have a PEEKSO$_2$Cl (XXIV) molar concentration of 0.052 M. All of the solvents used in these syntheses were distilled, stored and collected in a nitrogen atmosphere.

In a nitrogen atmosphere, in a cylindrical glass reactor, the following are added in succession: 0.054 g of methanesulfonamide (CH$_3$SO$_2$NH$_2$ (XXXIX), 1.1 equivalents with respect to the SO$_2$Cl motif number), 10 mL of distilled tetrahydrofuran so as to have a CH$_3$SO$_2$NH$_2$ (XXXIX) molar concentration of 0.057 M and 0.62 mL of n-BuLi ([C]=2 M in hexane, 2.4 equivalents with respect to the PEEKSO$_2$Cl (XXIV)) by means of a syringe, taking care to work under a nitrogen flow. The reaction mixture is agitated at 20° C. for 15 minutes. Then, the PEEKSO$_2$Cl (XXIV) solution previously prepared is added by means of a syringe, taking care to work under a nitrogen flow. The reaction is continued at 20° C. for 1 hour. At the end of the reaction, a white precipitate is observed.

The solvent is evaporated. The solid obtained is washed with 3 times 10 mL of tetrahydrofuran, then the product obtained is dried for one night under vacuum (1.10$^{-2}$ mbar).

The $^1$H NMR spectrum produced in DMSO-D6 ($^1$H NMR (200 MHz) δ 7.97-7.64 (m, 4H), 7.50 (s, 1H), 7.34-6.91 (m, 6H), 2.46 (s, 4H) confirms the expected structure.

The NMR'H spectrum shows that there is a methylsulfonamide group with respect to the dioxoaryl motif at 2.46 ppm.

The PEEKSO$_2$N$^-$(Li$^+$)SO$_2$CH$_3$ (Ia) is 97% with respect to the PEEKSO$_2$Cl (XXIV) used.

Examples 13 to 16–Preparation of Polymers Ib-Ie with Different Sulfonamides

According to the protocol described in example 12, the following polymers were prepared:

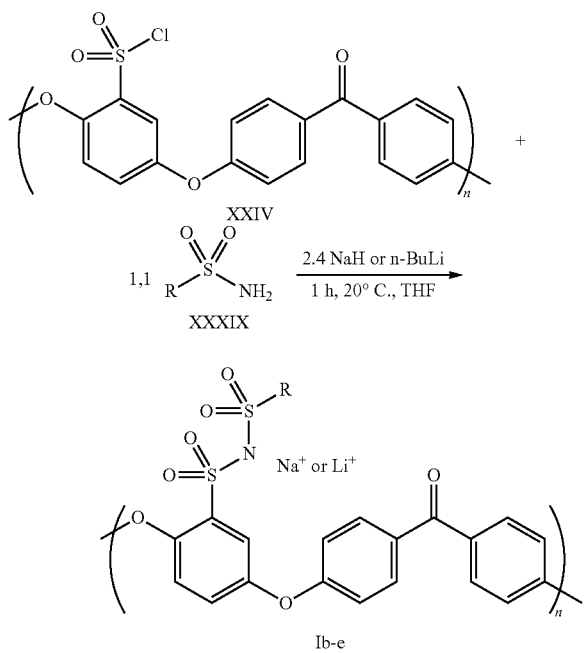

| Example | Sulfonamides | Bases | Yield (%) | Products |
|---|---|---|---|---|
| 13 | H$_2$N–S(=O)$_2$–CH$_3$ | NaH | 98 | Ib |
| 14 | H$_2$N–S(=O)$_2$–CF$_3$ | n-BuLi | 97 | Ic |

-continued

| Example | Sulfonamides | Bases | Yield (%) | Products |
|---|---|---|---|---|
| 15 | [structure: H$_2$N-SO$_2$-C$_6$H$_4$-CF$_3$] | n-BuLi | 97 | Id |
| 16 | [structure: H$_2$N-SO$_2$-C$_6$H$_3$(CF$_3$)$_2$] | n-BuLi | 94 | Ie |

Example 17=Preparation of Polymer if: Bi-Functionalized (Method 1)

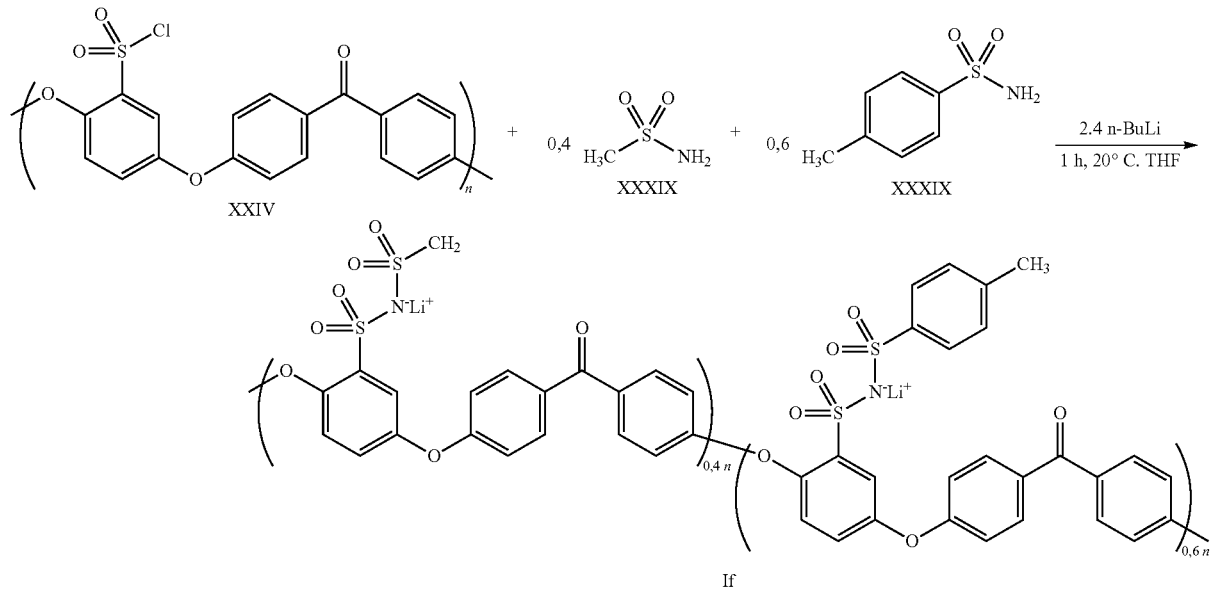

In a nitrogen atmosphere, a solution of 0.200 g of PEEKSO$_2$Cl (XXIV) prepared according to example 1 is prepared in 10 mL of distilled tetrahydrofuran so as to have a PEEKSO$_2$Cl (XXIV) molar concentration of 0.052 M. All of the solvents used in these syntheses were distilled, stored and collected in a nitrogen atmosphere.

In a nitrogen atmosphere, in a cylindrical glass reactor, the following are added in succession: 0.0197 g of methanesulfonamide (CH$_3$SO$_2$NH$_2$ (XXXIX), 0.4 equivalents with respect to the SO$_2$Cl motif number), 0.0531 g of p-toluenesulfonamide (CH$_3$PhSO$_2$NH$_2$ (XXXIX), 0.6 equivalents with respect to the SO$_2$Cl motif number), 10 mL of distilled tetrahydrofuran and 0.62 mL of n-BuLi ([C]=2 M in hexane, 2.4 equivalents with respect to the PEEKSO$_2$Cl (XXIV)) by means of a syringe, taking care to work under a nitrogen flow. The reaction mixture is agitated at 20° C. for 15 minutes. Then, the PEEKSO$_2$Cl (XXIV) solution previously prepared is added by means of a syringe, taking care to work under a nitrogen flow. The reaction is continued at 20° C. for 30 minutes. At the end of the reaction, a white precipitate is observed.

The solvent is evaporated. The solid obtained is washed with 3 times 10 mL of tetrahydrofuran and 2 times 20 mL of CH$_3$CN, then the product obtained is dried for one night under vacuum (1.10$^{-2}$ mbar).

The $^1$H NMR spectrum produced in DMSO-D6 ($^1$H NMR (200 MHz) δ 7.91-7.66 (m, 4H), 7.57-7.41 (m, 2H), 7.31-6.92 (m, 7H), 2.43 (s, 0.75H), 2.27 (s, 1.5H) allows us to derive the following structure:

If

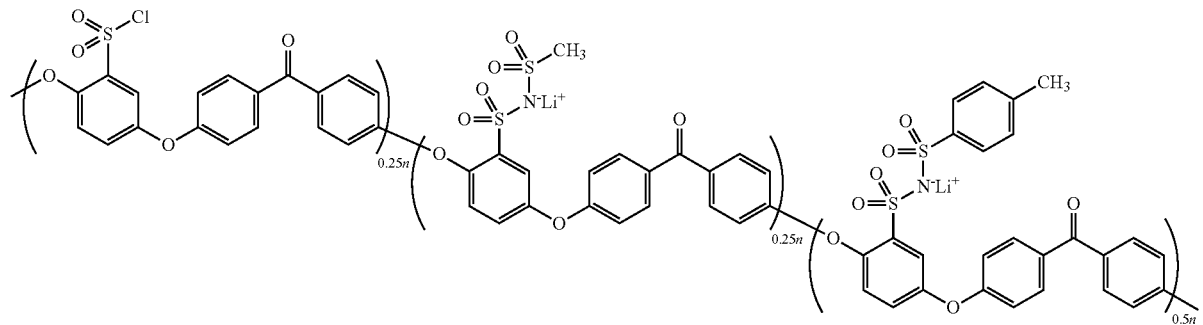

The PEEK (SO$_2$Cl)$_{0.25n}$ (SO$_2$N$^-$ (Li$^+$) SO$_2$CH$_3$)$_{0.25n}$ (SO$_2$N (Li$^+$) SO$_2$PhCH$_3$)$_{0.5n}$ (If) weight yield is 91% with respect to the PEEKSO$_2$Cl (XXIV) used.

Example 18=Preparation of Polymer Ig:
Bi-Functionalized (Method 2)

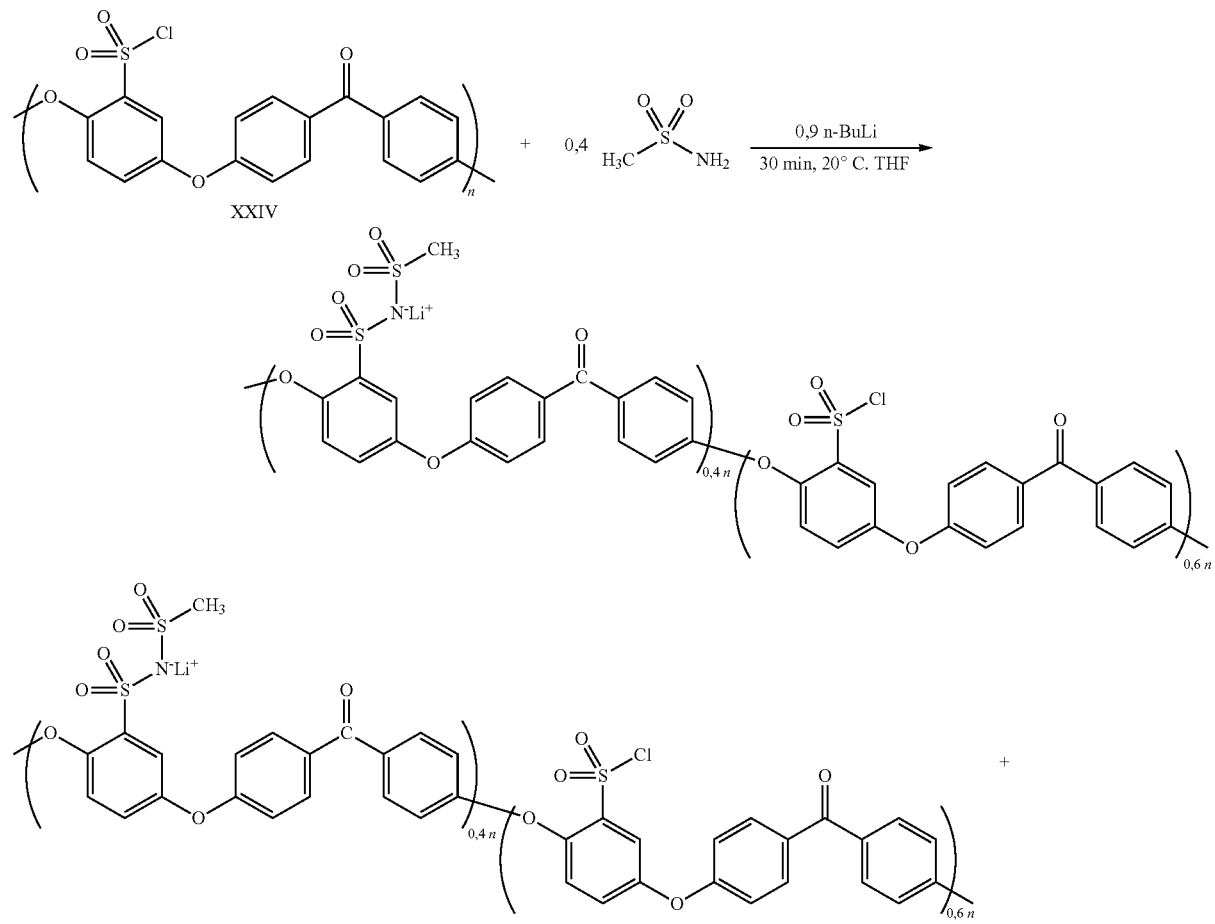

-continued

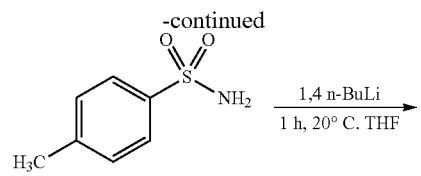

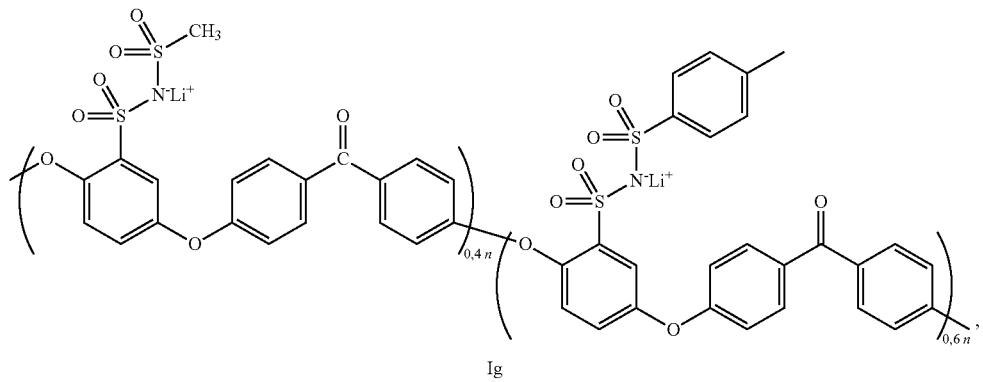

Ig

In a nitrogen atmosphere, a solution of 0.200 g of PEEKSO₂Cl (XXIV) prepared according to example 1 is prepared in 10 mL of distilled tetrahydrofuran so as to have a PEEKSO₂Cl (XXIV) molar concentration of 0.052 M. All of the solvents used in these syntheses were distilled, stored and collected in a nitrogen atmosphere.

In a nitrogen atmosphere, in a cylindrical glass reactor, the following are added in succession: 0.0197 g of methanesulfonamide (CH₃SO₂NH₂ (XXXIX), 0.4 equivalents with respect to the SO₂Cl motif number), and 10 mL of distilled tetrahydrofuran and 0.26 mL of n-BuLi ([C]=2 M in hexane, 0.9 equivalents with respect to the PEEKSO₂Cl (XXIV)) by means of a syringe, taking care to work under a nitrogen flow. The reaction mixture is agitated at 20° C. for 15 minutes. Then, the PEEKSO₂Cl (XXIV) solution previously prepared is added by means of a syringe, taking care to work under a nitrogen flow. The reaction is continued at 20° C. for 30 minutes.

Then, the following are added in succession: 0.0187 g of p-toluenesulfonamide (CH₃PhSO₂NH₂ (XXXIX), 0.6 equivalents with respect to the SO₂Cl motif number) and 0.36 mL of n-BuLi ([C]=2 M in hexane, 1.4 equivalents with respect to the PEEKSO₂Cl (XXIV)) by means of a syringe, taking care to work under a nitrogen flow. The reaction mixture is agitated at 20° C. for 15 minutes. Then, the PEEKSO₂Cl (XXIV) solution previously prepared is added by means of a syringe, taking care to work under a nitrogen flow. The reaction is continued at 20° C. for 1 hour. At the end of the reaction, a white precipitate is observed.

The solvent is evaporated. The solid obtained is washed with 3 times 10 mL of tetrahydrofuran, then the product obtained is dried for one night under vacuum ($1.10^{-2}$ mbar).

The ¹H NMR spectrum produced in DMSO-D6 (¹H NMR (200 MHz) δ 7.91-7.69 (m, 4H), 7.60-7.43 (m, 2.2H), 7.31-6.95 (m, 7.2H), 2.44 (s, 1.2H), 2.27 (s, 1.8H) confirms the expected structure:

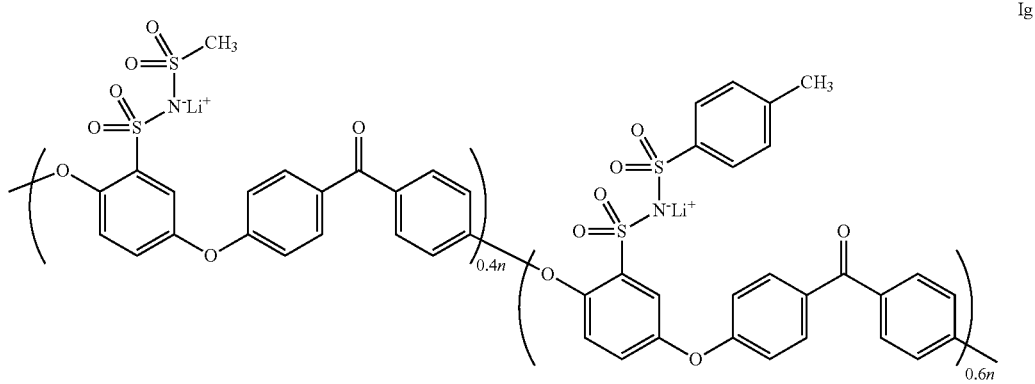

Ig

The PEEK $(SO_2N^-(Li^+)\ SO_2CH_3)_{0.4n}(SO_2N^-(Li^+)\ SO_2PhCH_3)_{0.6n}$ (Ig) weight yield is 89% with respect to the PEEKSO$_2$Cl (XXIV) used.

Example 19=Preparation of Polymer IIIa with R=CH$_3$ and M=Li

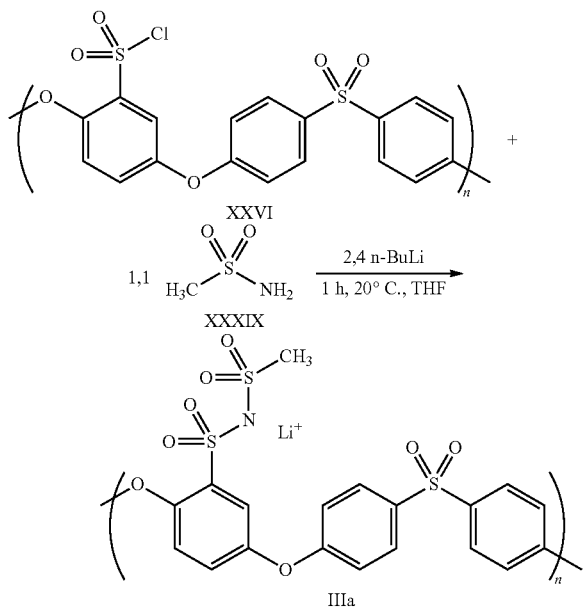

In a nitrogen atmosphere, a solution of 0.200 g of PEESSO$_2$Cl (XXVI) prepared according to example 7 is prepared in 9 mL of distilled tetrahydrofuran and 1 mL of distilled N,N-dimethylformamide so as to have a PEESSO$_2$Cl (XXVI) molar concentration of 0.052 M. All of the solvents used in these syntheses were distilled, stored and collected in a nitrogen atmosphere.

In a nitrogen atmosphere, in a cylindrical glass reactor, the following are added in succession: 0.045 g of methanesulfonamide (CH$_3$SO$_2$NH$_2$ (XXXIX), 1.1 equivalents with respect to the SO$_2$Cl motif number), 10 mL of distilled tetrahydrofuran so as to have a CH$_3$SO$_2$NH$_2$ (XXXIX) molar concentration of 0.0472 M and 0.57 mL of n-BuLi ([C]=2 M in hexane, 2.4 equivalents with respect to the PEESSO$_2$Cl (XXVI)) by means of a syringe, taking care to work under a nitrogen flow. The reaction mixture is agitated at 20° C. for 15 minutes. Then, the PEESSO$_2$Cl (XXVI) solution previously prepared is added by means of a syringe, taking care to work under a nitrogen flow. The reaction is continued at 20° C. for 1 hour. At the end of the reaction, a white precipitate is observed.

The solvent is evaporated. The solid obtained is washed with 3 times 10 mL of tetrahydrofuran, then dried for one night under vacuum (1.10$^{-2}$ mbar).

The $^1$H NMR spectrum produced in DMSO-D6 ($^1$H NMR (200 MHz) δ 8.05-7.78 (m, 4H), 7.44 (s, 1H), 7.33-6.90 (m, 6H), 2.44 (s, 3H) confirms the expected structure. The $^1$H NMR spectrum shows that there is a methylsulfonamide group with respect to the dioxoaryl motif at 2.44 ppm.

The PEESSO$_2$N$^-$(Li$^+$)SO$_2$CH$_3$ (IIIA) weight yield is 87% with respect to the PEESSO$_2$Cl (XXVI) used.

Examples 20–Preparation of Polymers IIIa-b with Different Sulfonamides

According to the protocol described in example 19, the following polymers were prepared:

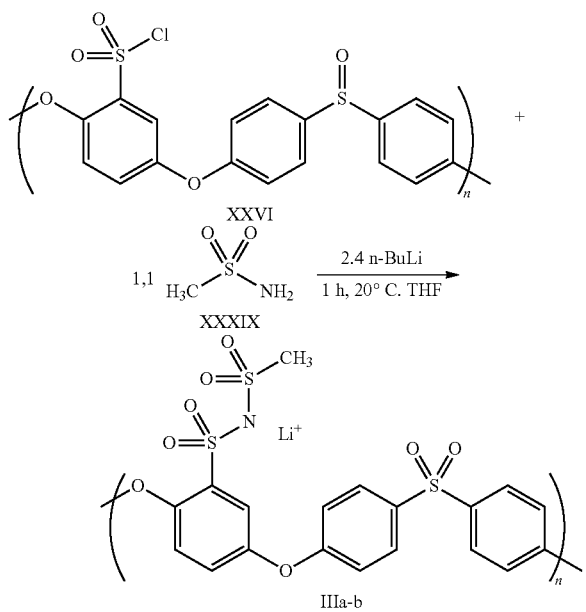

| Example | Sulfonamides | Bases | Yield (%) | Products |
|---|---|---|---|---|
| 14 | H$_2$N-S(=O)$_2$-CH$_3$ | n-BuLi | 97 | IIIa |

| Example | Sulfonamides | Bases | Yield (%) | Products |
|---|---|---|---|---|
| 15 | H₂N-S(O)(O)-CF₃ | n-BuLi | 98 | IIIb |

Example 21—Preparation of Polymers IV with R=CF₃ and M=Li

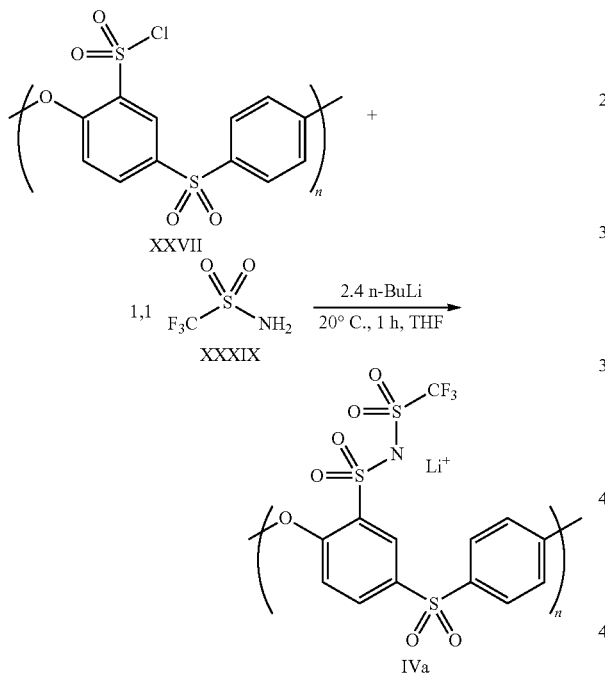

In a nitrogen atmosphere, a solution of 0.200 g of PEESSO₂Cl (XXVII) prepared according to example 8 is prepared in 10 mL of distilled tetrahydrofuran so as to have a PESSO₂Cl (XXVII) molar concentration of 0.060 M. All of the solvents used in these syntheses were distilled, stored and collected in a nitrogen atmosphere.

In a nitrogen atmosphere, in a cylindrical glass reactor, the following are added in succession: 0.099 g of methanesulfonamide (CH₃SO₂NH₂ (XXXIX), 1.1 equivalents with respect to the SO₂Cl motif number), 10 mL of distilled tetrahydrofuran so as to have a CH₃SO₂NH₂ (XXXIX) molar concentration of 0.0666 M and 0.72 mL of n-BuLi ([C]=2 M in hexane, 2.4 equivalents with respect to the PESSO₂Cl (XXVII)) by means of a syringe, taking care to work under a nitrogen flow. The reaction mixture is agitated at 20° C. for 15 minutes. Then, the PESSO₂Cl (XXVII) solution previously prepared is added by means of a syringe, taking care to work under a nitrogen flow. The reaction is continued at 20° C. for 1 hour. At the end of the reaction, a white precipitate is observed.

The solvent is evaporated. The solid obtained is washed with 3 times 10 mL of tetrahydrofuran, then dried for one night under vacuum ($1.10^{-2}$ mbar).

The $^1$H and $^{19}$F NMR spectra produced in DMSO-D6 ($^1$H NMR (200 MHz) δ 8.40-8.22 (m, 1H), 8.11-7.83 (m, 3H), 7.40-7.01 (m, 3H). $^{19}$F NMR (188 MHz) 5-77.81 (s) confirm the expected structure.

The $^{19}$F NMR spectrum shows a single peak corresponding to the polymeric trifluoromethylsulfonamide.

The PESSO₂N⁻(Li⁺)SO₂CH₃ (IVa) weight yield is 83% with respect to the PESSO₂Cl (XXVII) used.

Examples 22 to 24–Preparation of Polymers IVb-d with Different Sulfonamides

According to the protocol described in example 21, the following polymers were prepared:

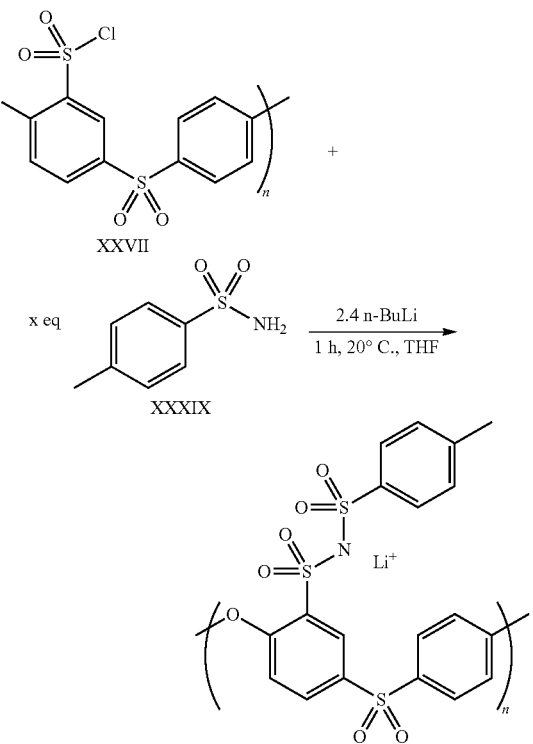

| Example | x eq | Yield (%) | Products |
|---|---|---|---|
| 22 | 1 eq | 95 | IVb |
| 23 | 0.6 eq | 96 | IVc |
| 24 | 0.2 eq | 93 | IVd |

Examples 25–Alternative Preparation of Polymer Ia with R=CH$_3$ and M=Li

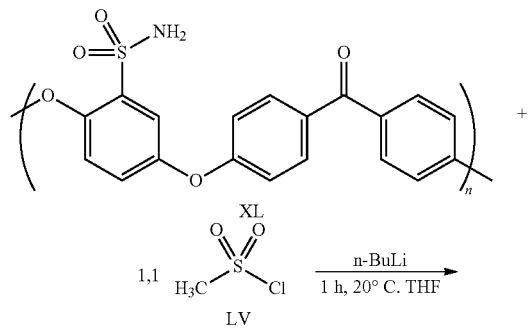

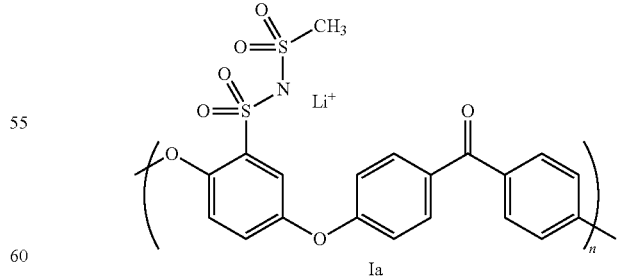

In a nitrogen atmosphere, a solution of 0.200 g of PEEKSO$_2$NH$_2$ (XL) prepared according to example 9 is prepared in 10 mL of distilled tetrahydrofuran so as to have a PEEKSO$_2$NH$_2$ (XL) molar concentration of 0.057 M. All of the solvents used in these syntheses were distilled, stored and collected in a nitrogen atmosphere. After solubilization of the PEEKSO$_2$NH$_2$, 0.68 mL of n-BuLi ([C]=2 M in hexane, 2.4 equivalents with respect to the PEEKSO$_2$NH$_2$ (XL)) are added by means of a syringe, taking care to work under a nitrogen flow. After 15 minutes at room temperature, 0.0783 g of methanesulfonyl chloride (CH$_3$SO$_2$Cl (LV), 1.2 equivalents with respect to the SO$_2$NH$_2$ motif number) are added. The reaction is continued at 20° C. for 1 hour. At the end of the reaction, a white precipitate is observed.

The solvent is evaporated. The solid obtained is washed with 3 times 10 mL of tetrahydrofuran, then the product obtained is dried for one night under vacuum (1.10$^{-2}$ mbar).

The $^1$H NMR spectrum produced in DMSO-D6 ($^1$H NMR (200 MHz) δ 7.97-7.64 (m, 4H), 7.50 (s, 1H), 7.34-6.91 (m, 6H), 2.46 (s, 3H) confirms the expected structure.

The $^1$H NMR spectrum shows that there is a methylsulfonamide group with respect to the dioxoaryl motif at 2.46 ppm.

The PEEKSO$_2$N$^-$(Li$^+$)SO$_2$CH$_3$ (Ia) weight yield is 35% with respect to the PEEKSO$_2$NH$_2$ (XL) used.

Examples 26-28–Preparation of Polymer Films

In a nitrogen atmosphere, in a cylindrical glass reactor, 100 mg of polymer I, III or IV are directly weighed, then 3 mL of distilled dimethylsulfoxide are added. All of the solvents used during these syntheses were distilled, stored and collected in a nitrogen atmosphere. After complete solubilization of the polymer, the solution is placed in a petri dish having a diameter of 5 cm. The petri dish is deposited on a heating plate at 50° C. After one night, the solvent is totally evaporated and a cylindrical film having a diameter of 5 cm and a thickness on the order of 100 μm is obtained. This film is a transparent film with sufficient mechanical resistance to be extracted from the petri dish by means of a clamp and handled by an operator without tearing.

Examples 29–Conductivity Measurements

The ionic conductivities of the polymers prepared in examples 12-16 were determined by impedance spectroscopy. The results obtained with the polymer described in example 7 are reported in FIG. 1 of the drawings, which shows the change in conductivity of the polymer described in example 7 as a function of the temperature and in comparison with a polymer electrolyte described in the literature (Nature Materials), these results being compared with the results obtained in the publication of D. Gigmes et al. in Nature Materials, 12, 452-457 (2013).

It may be noted that, at low temperature (<45°), the conductivities are superior to the conductivities published in patent FR 2979630 and the publication of D. Gigmes et al. in Nature Materials, 12, 452-457 (2013), even without the addition of solvent. Moreover, the conductivities obtained in the presence of a plasticizing solvent, such as acetonitrile or dimethylcarbonate (DMC), are on the same order of amplitude of, or even superior to, the results described in patent FR 2979630 and the publication of D. Gigmes et al. in Nature Materials, 12, 452-457 (2013) for the entire temperature range studied.

The invention claimed is:

1. A polymer of the polyaryl ether ketone family or a polyether sulfone polymer containing a grafted bis(sulfonyl) imide lithium or sodium salt selected from the group consisting of bis(sulfonyl)imide lithium or sodium salts satisfying formulas I, II, III, IV, V, VI, VII, VIII, IX, X, XI, XII, XIII, XIV and XV

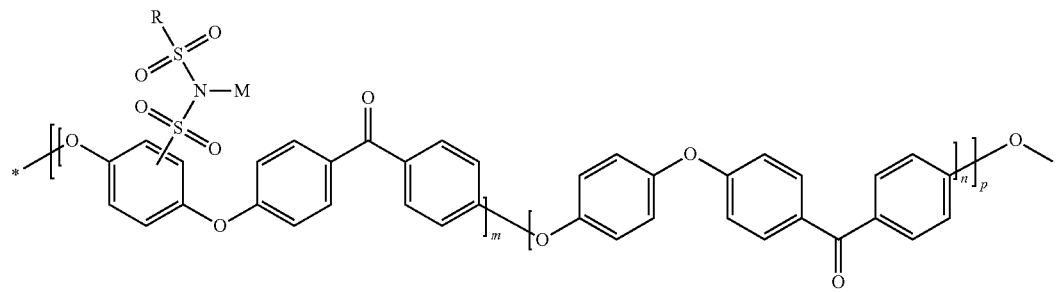

(I)

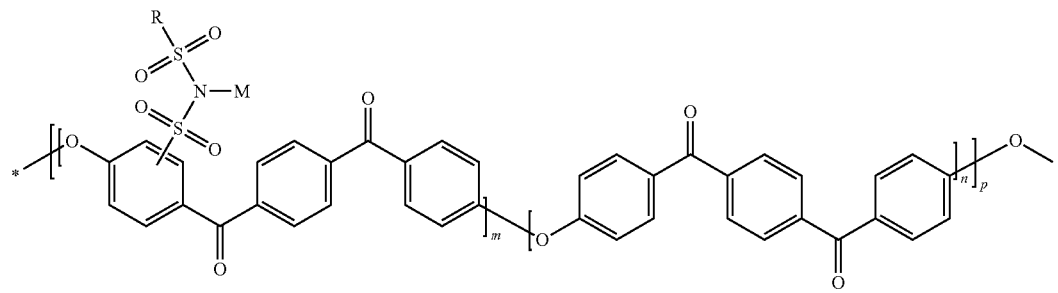

(II)

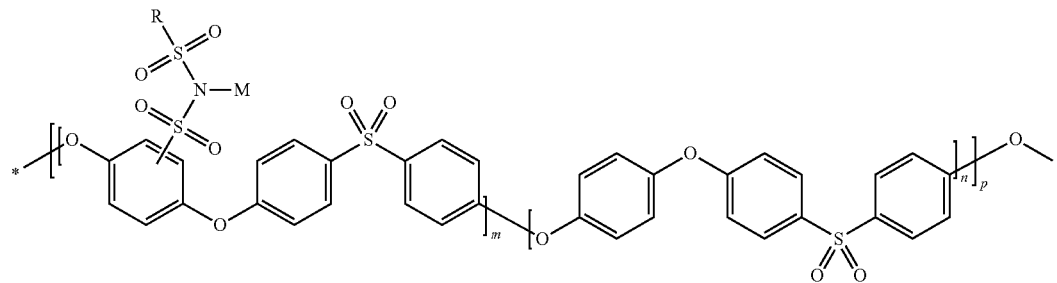

(III)

-continued
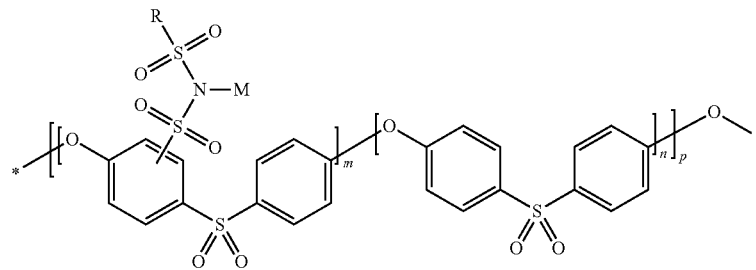
(IV)
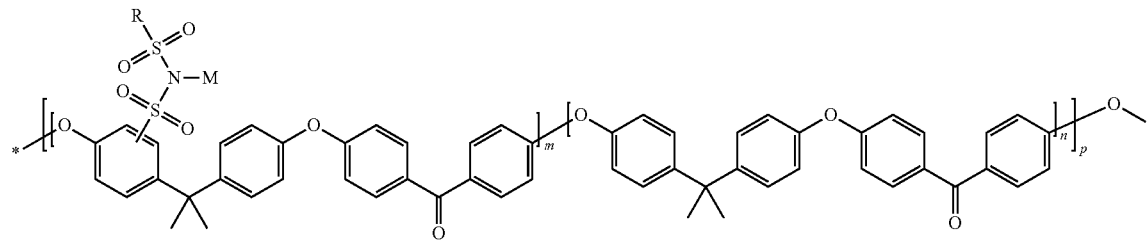
(V)
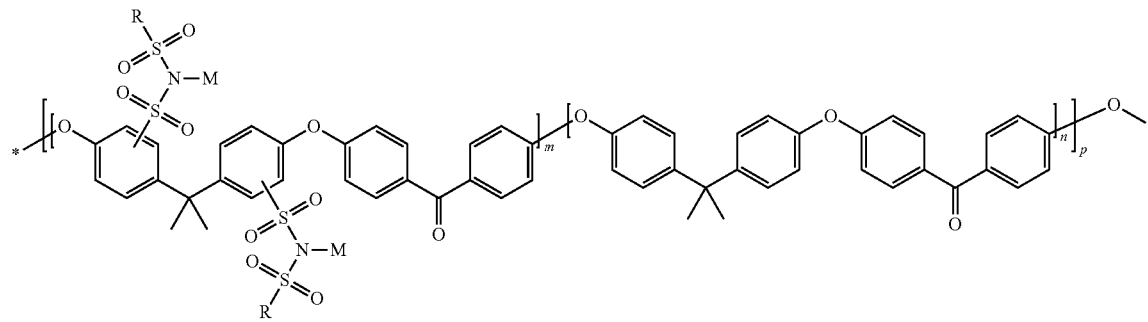
(VI)
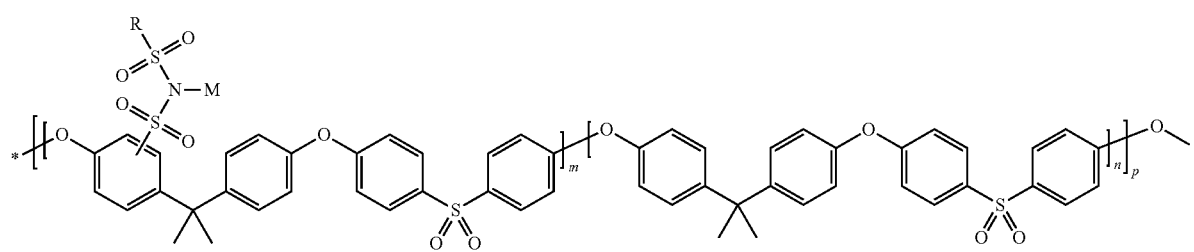
(VII)
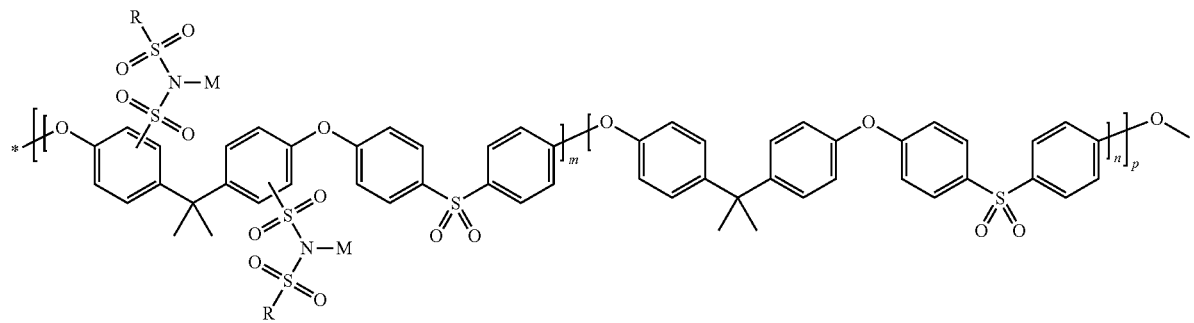
(VIII)

-continued
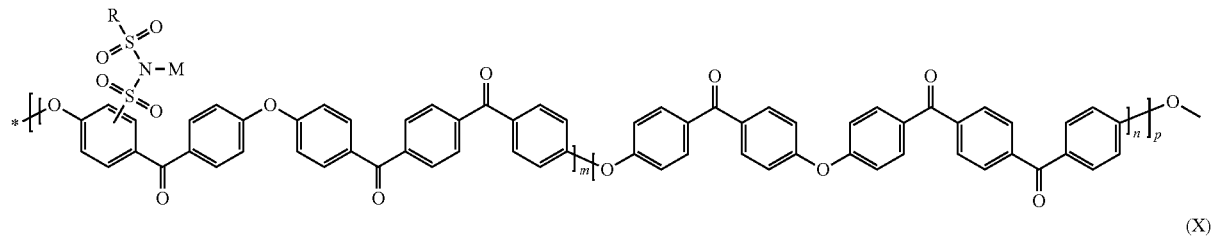
(IX)
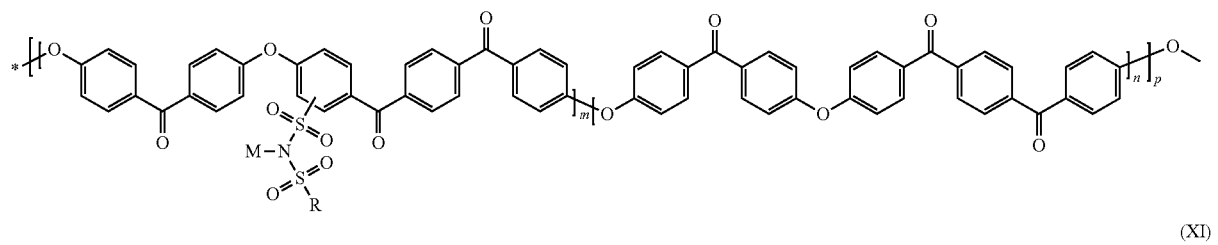
(X)
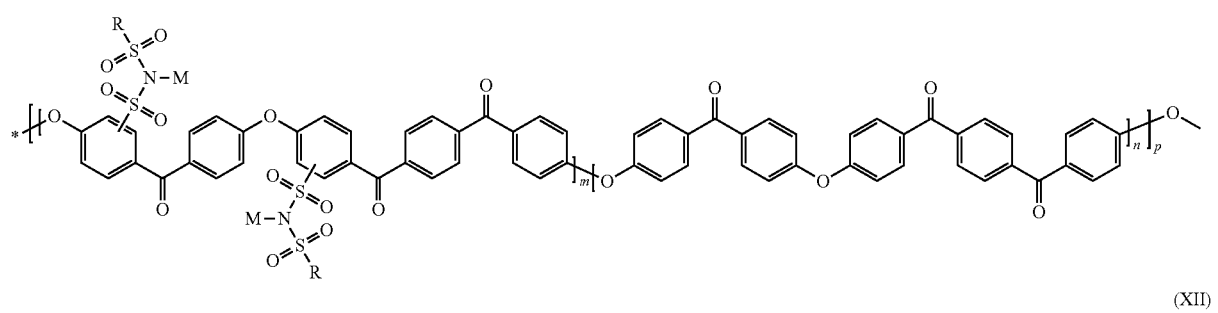
(XI)
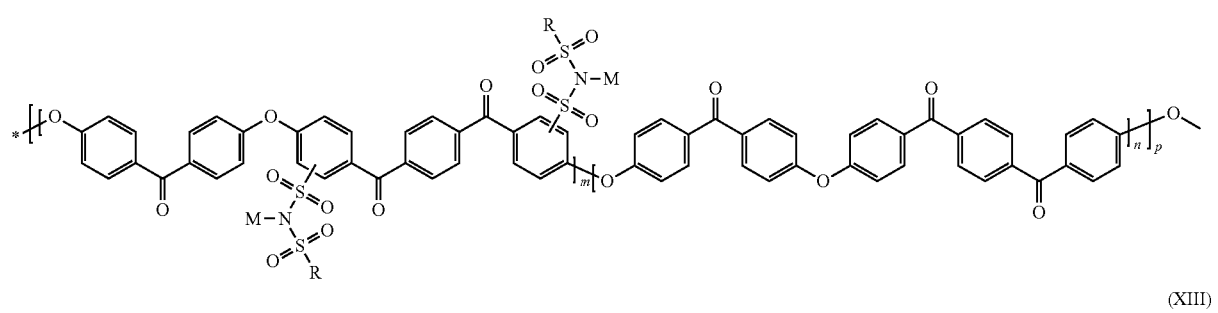
(XII)
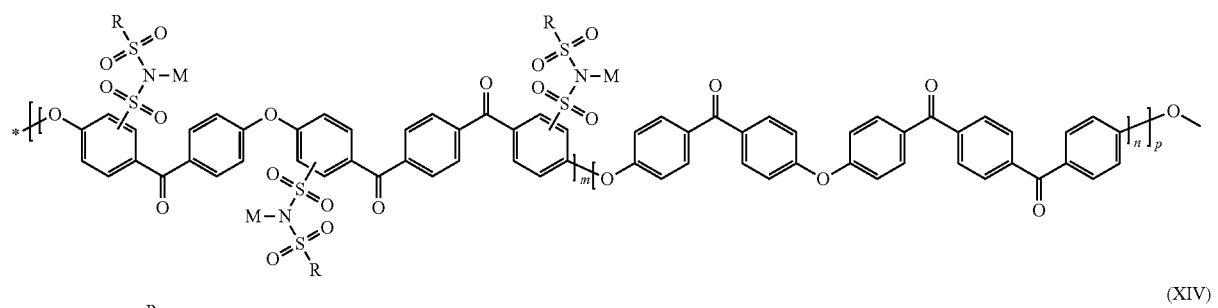
(XIII)
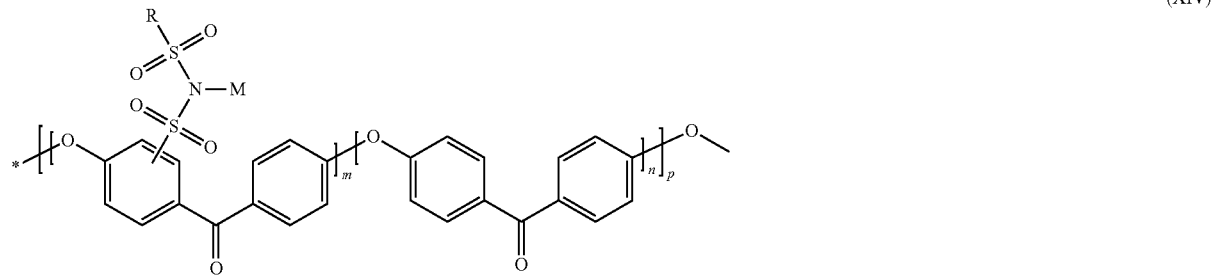
(XIV)

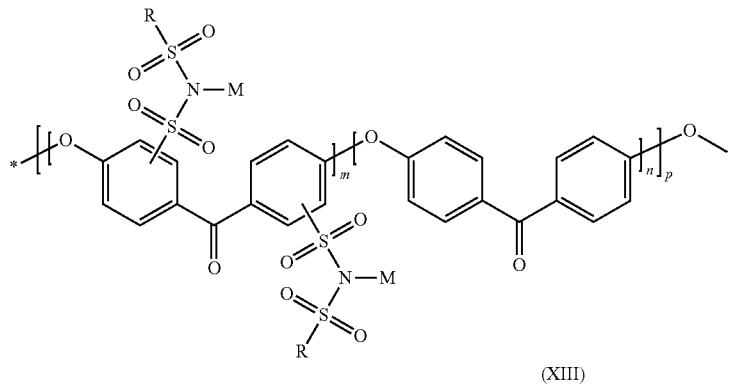

(XIII)

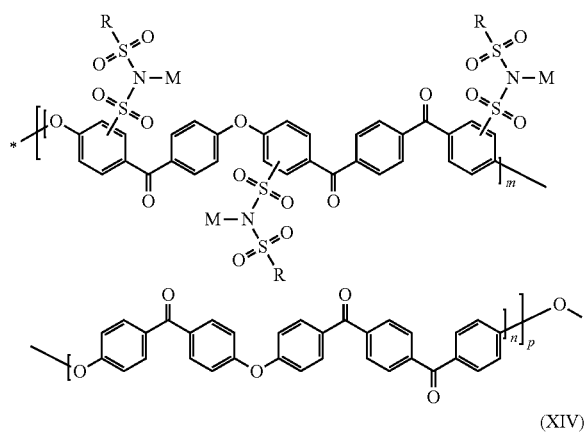

(XIV)

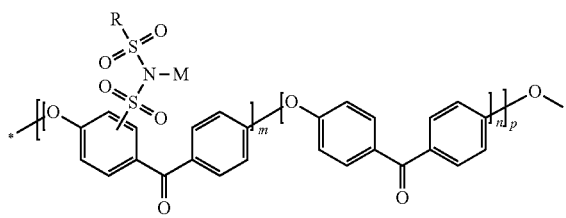

(XV)

wherein:
M represents a lithium or sodium atom
R represents a group or different groups chosen from:
  an alkyl or cycloalkyl group having 1 to 30 linear or branched carbon atoms optionally substituted by a cycloalkyl, aryl, perfluoroalkyl polyfluoroalkyl, mono or polyethoxylated motif;
  a perfluoro- or polyfluoroalkyl group optionally substituted by aromatic groups;
  an aryl or polyaryl group optionally substituted by alkyl, cycloalkyl, polyfluoro- or perfluoroalkyl chains, nitrile functions, alkyl or alkylsulfonyl functions, fluorine atoms;
m represents the percentage of polymer units having an oxoaryl or dioxoaryl motif having a grafted bis(sulfonyl)imide salt, this percentage varying between 50 and 100%,
n represents the percentage of polymer units having no oxoaryl or dioxoaryl motif functionalized by a bis(sulfonyl)imide motif, this percentage varying between 0 and 50%,
p represents the number of polymer units of the polymer; p varying from 40 to 300.

2. The polymer according to claim 1, wherein:
M represents a lithium or sodium atom;
R represents one or more different groups chosen from:
  an alkyl group with 1 to 10 carbon atoms;
  a trifluoromethyl, pentafluoroethyl, nonafluorobutyl, 1,1,2,2-tetrafluoroethyl group;
  an aryl group of the phenyl, tolyl, naphthyl, trifluoromethylphenyl, bis(trifluoromethyl)phenyl, cyanophenyl, alkylsulfonylphenyl, arylsulfonylphenyl, methoxyphenyl, butoxyphenyl, pentafluorophenyl, alkylsulfonylphenyl, fluorophenyl type,
m represents the percentage of polymer units having an oxoaryl or dioxoaryl motif functionalized by a bis(sulfonyl)imide motif, this percentage varying between 90 and 100%;
n represents the percentage of polymer units having an oxoaryl or a dioxoaryl motif non-functionalized by a bis(sulfonyl)imide motif, this percentage varying between 0 and 10%;
p represents the number of polymer units of the polymer; p varying from 60 to 200.

3. The polymer according to claim 2, wherein R is selected from the group consisting of methyl, ethyl, propyl, butyl, pentyl, hexyl, cyclohexyl, and ethylhexyl groups.

4. The polymer according to claim 1, wherein:

M represents a lithium or sodium atom,

R is a methyl, ethyl, propyl, cyclopropyl, butyl, 1-decyl, 1-dodecyl, 1-hexanedecyl, 1-octyldecyl, (7,7-dimethyl-2-oxobicyclo[2.2.1]heptan-1-yl)methyl, ((1R)-7,7-dimethyl-2-oxobicyclo[2.2.1]heptan-1-yl)methyl, (1S)-(7,7-dimethyl-2-oxobicyclo[2.2.1]heptan-1-yl)methyl, cyclohexylmethyl, trifluoromethyl, phenyl, tolyl, naphthyl, 4-trifluoromethylphenyl, 3,5-bis(trifluoromethyl)phenyl, 4-cyanophenyl, 1,1,2,2,2-pentafluoroethanyl, nonafluorobutyl, pentafluorophenyl, 2,3,5,6-tetrafluorophenyl, 4-fluorophenyl, 2,4-difluorophenyl, 3,5-difluorophenyl, 2,3,4,5,6-pentafluorophenyl, 4-cyanophenyl, 4-(trifluoromethyl)phenyl, 3-(trifluoromethyl)phenyl, 2-(trifluoromethyl)phenyl, 4-methylphenyl, 1-naphthyl, 2-naphthyl, 3,5-difluorobenzyl, 4-fluorobenzyl, 3-trifluoromethylbenzyl, 4-trifluoromethylbenzyl, 2,5-dimethylbenzyl, 2-phenylethyl, 4-methoxyphenyl, 4-n-butylphenyl, 4-t-butylphenyl, 4-butoxyphenyl, 2-fluoro-5-(trifluoromethyl)phenyl, or 4-ethylphenyl group;

m represents the percentage of polymer units having a dioxoaryl motif functionalized by a bis(sulfonyl)imide, this percentage varying between 90 and 100%;

n represents the percentage of polymer units having a dioxoaryl motif non-functionalized by a bis(sulfonyl)imide, this percentage varying between 0 and 10%;

p represents the number of polymer units of the polymer, p varying from 60 to 200.

5. A method for synthesis of a polymer according to claim 1, comprising:

in a first step, performing the chlorosulfonation of a polymer selected from the group consisting of polymers of formulas XVI, XVII, XVIII, XIX, XX, XXI, XXII, XXIII by a mixture of chlorosulfonic acid, thionyl chloride and a formamide

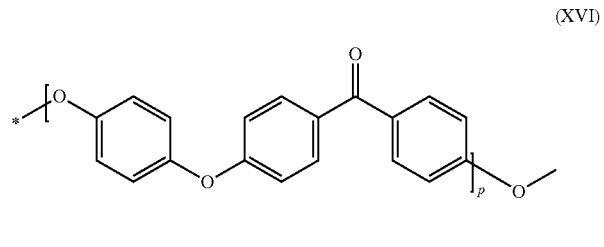

(XVI)

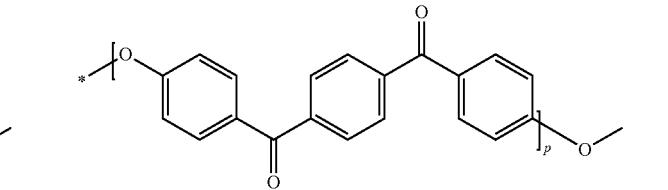

(XVII)

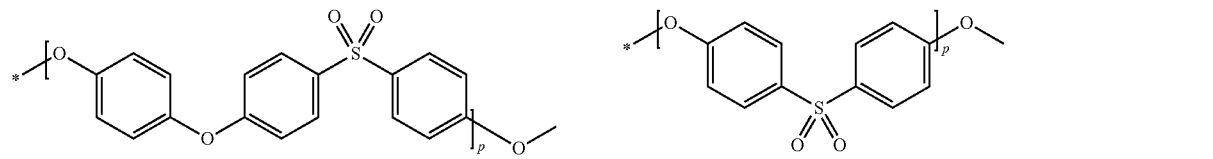

(XVIII)

(XIX)

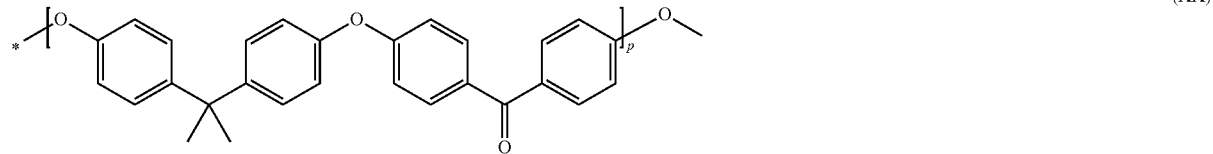

(XX)

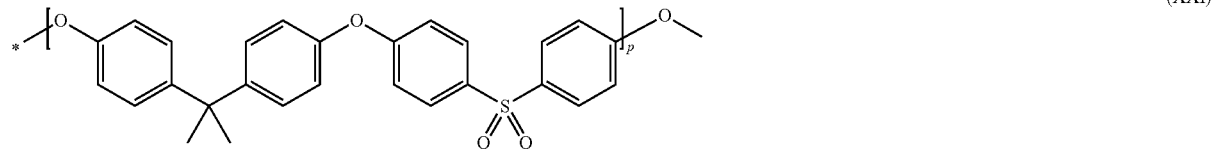

(XXI)

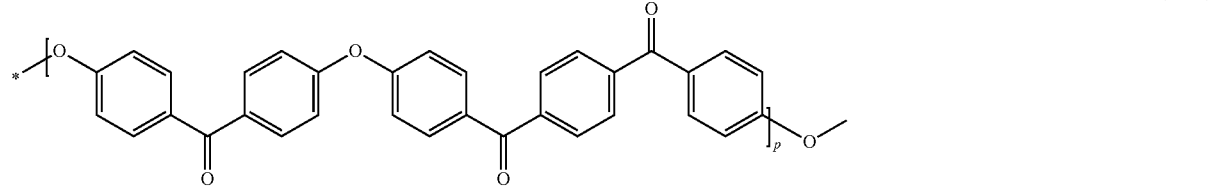

(XXII)

(XXIII)

wherein:
 p represents the number of polymer units of the polymer, p varying from 40 to 300, in order to obtain the polymer selected from the group consisting of polymers of formulas XXIV, XXV, XXVI, XVII, XXVIII, XIX, XXX, XXXI, XXXII, XXXIII, XXXIV, XXXV, XXXVI, XXXVII and XXXVIII
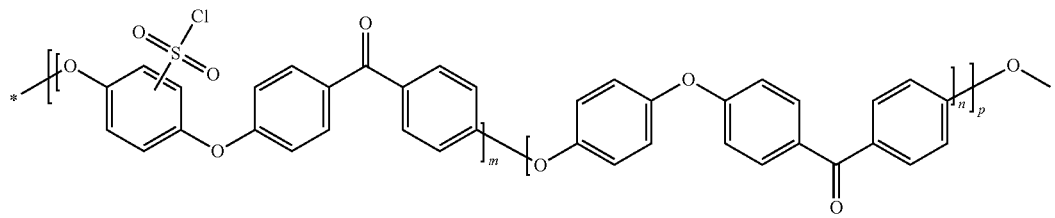
(XXIV)
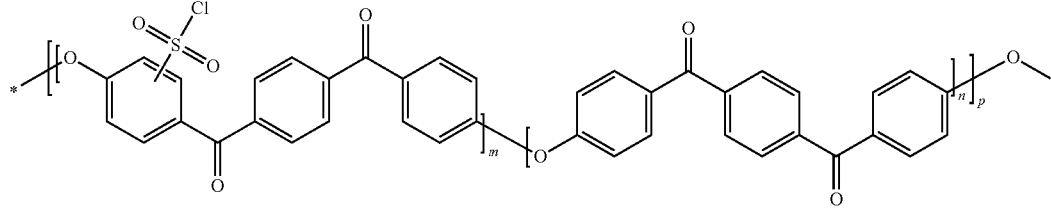
(XXV)
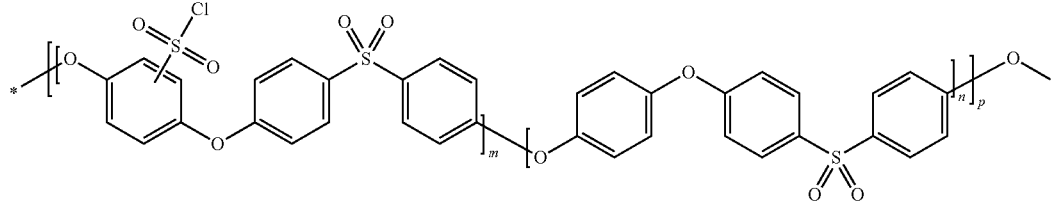
(XXVI)
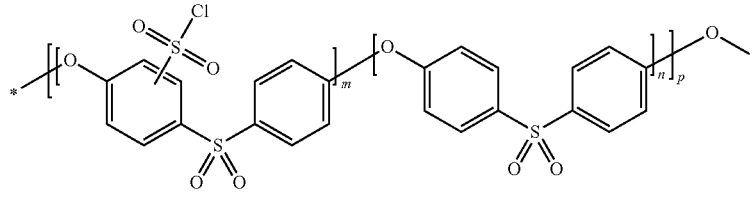
(XXVII)
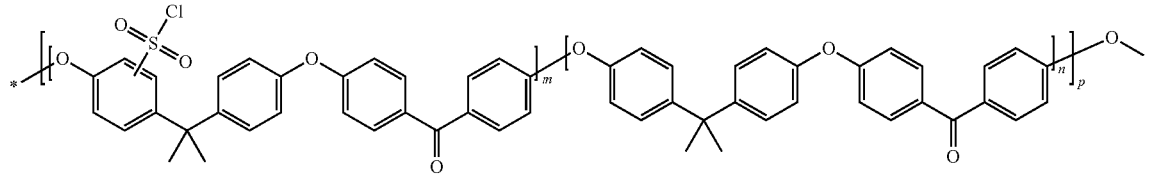
(XXVIII)
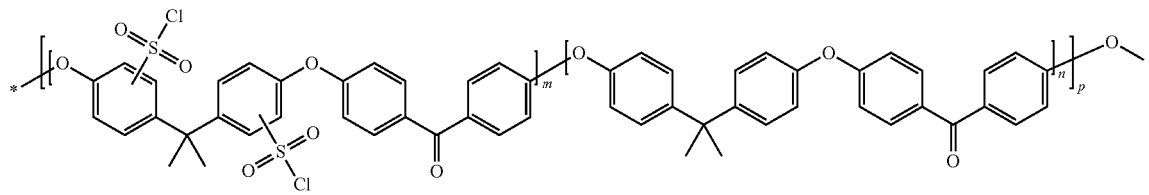
(XXIX)
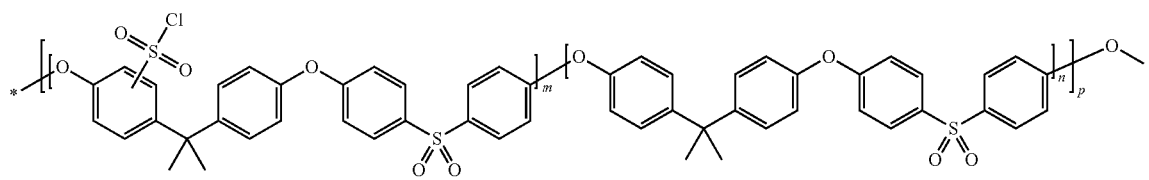
(XXX)

-continued
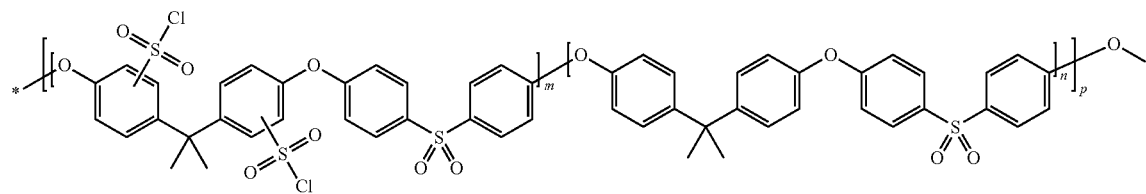
(XXXI)
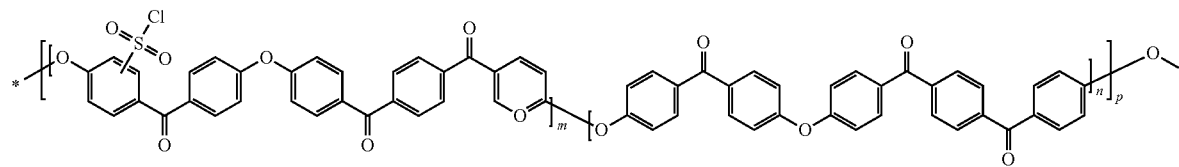
(XXXII)
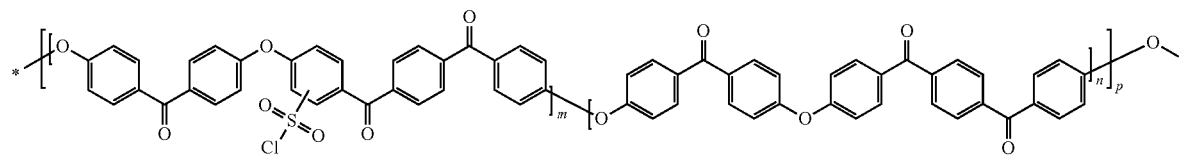
(XXXIII)
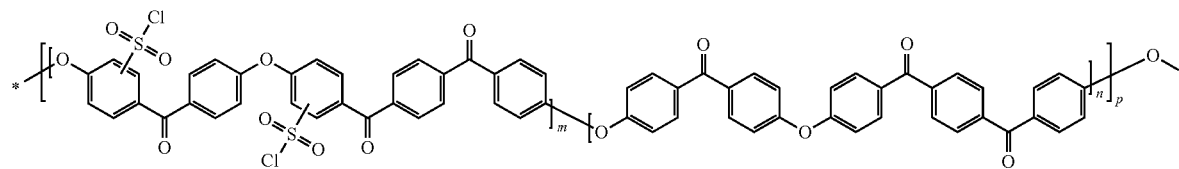
(XXXIV)
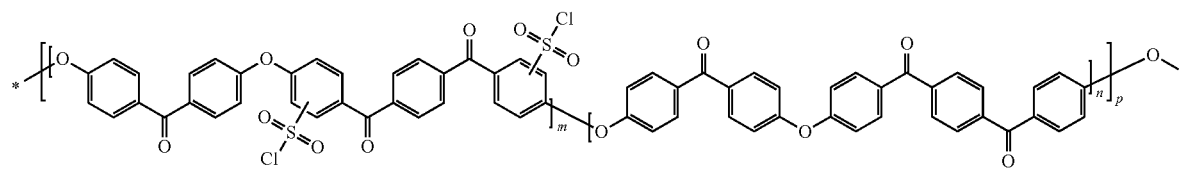
(XXXV)
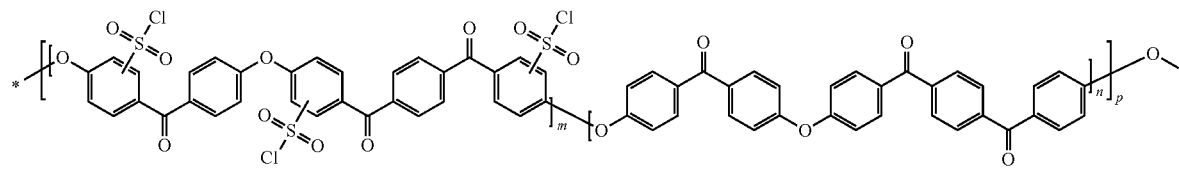
(XXXVI)
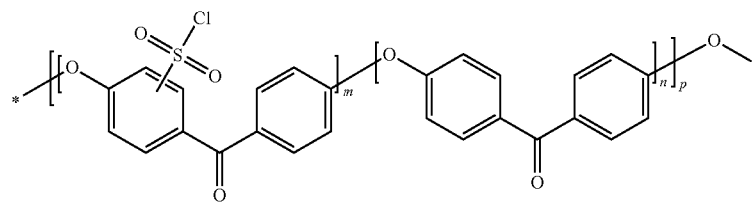
(XXXVII)

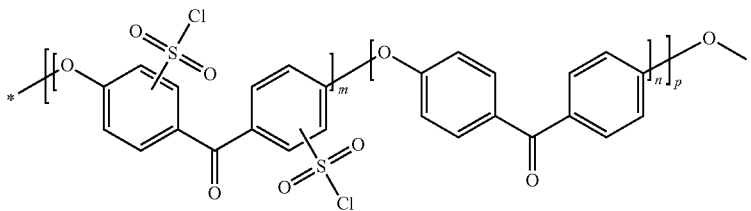

(XXXVIII)

wherein:
   m represents the percentage of polymer units having an oxoaryl or dioxoaryl motif functionalized by a chlorosulfonated group, this percentage varying between 50 and 100%,
   n represents the percentage of polymer units having a dioxoaryl motif non-functionalized by a chlorosulfonated group, this percentage varying between 0 and 50%,
   p represents the number of polymer units of the polymer, p varying from 40 to 300,
in a second step, producing a reaction on the polymer selected from the group consisting of polymers of formulas XXIV, XXV, XXVI, XVII, XXVIII, XIX, XXX, XXXI, XXXII, XXXIII, XXXIV, XXXV, XXXVI, XXXVII and XXXVIII with a sulfonamide of formula XXXIX in a solvent medium

(XXXIX)

wherein
   R represents a group or different groups chosen from:
      an alkyl or cycloalkyl group having 1 to 30 linear or branched carbon atoms, optionally substituted by a cycloalkyl, aryl, perfluoroalkyl, polyfluoroalkyl, mono or polyethoxyl motif;
      a perfluoro- or polyfluoroalkyl group optionally substituted by aromatic groups;
      an aryl or polyaryl group optionally substituted by alkyl, cycloalkyl, polyfluoro- or perfluoroalkyl, motifs, by nitrile functions, by alkyl- or alkylsulfonyl functions, by fluorine atoms;
   m represents the percentage of polymer units having an oxoaryl or dioxoaryl motif having a grafted bis (sulfonyl)imide, this percentage varying between 50 and 100%, in the presence of a lithium or sodium base.

6. The method according to claim 5, wherein the R group of the XXXIX sulfonamide is chosen from the methyl, ethyl, propyl, cyclopropyl, butyl, 1-decyl, 1-dodecyl, 1-hexanedecyl, 1-octyldecyl, (7,7-dimethyl-2-oxobicyclo[2.2.1]heptan-1-yl)methyl, (1R)-7,7-dimethyl-2-oxobicyclo[2.2.1]heptan-1-yl)methyl, (1S)-(7,7-dimethyl-2-oxobicyclo[2.2.1]heptan-1-yl)methyl, cyclohexylmethyl, phenyl, tolyl, naphthyl, 4-trifluoromethylphenyl, 3,5-bis (trifluoromethyl)phenyl, 2,5-bis (trifluoromethyl)phenyl, 4-cyanophenyl, 1,1,2,2,2-pentafluoroethanyl, nonafluorobutyl, pentafluorophenyl, 2,3,5,6-tetrafluorophenyl, 4-fluorophenyl, 2,4-difluorophenyl, 3,5-difluorophenyl, 2,3,4,5,6-pentafluorophenyl, 4-cyanophenyl, 3 (trifluoromethyl)phenyl, 2-(trifluoromethyl) phenyl, 4-methylphenyl, 1-naphthyl, 2-naphthyl, 3,5-difluorobenzyl, 4-fluorobenzyl, 3-trifluoromethylbenzyl, 4-trifluoromethylbenzyl, 2,5-dimethylbenzyl, 2-phenylethyl, 4-methoxyphenyl, 4-n-butylphenyl, 4-t-butylphenyl, 4-butoxyphenyl, 2-fluoro-5-(trifluoromethyl)phenyl, or 4-ethylphenyl groups.

7. The method according to claim 5, wherein the chlorosulfonation is performed at a temperature of between 0 and 80° C. by a mixture of 1 to 10 equivalents of chlorosulfonic acid, 1 to 30 equivalents of thionyl chloride in the presence of 1 to 10 equivalents of an amide.

8. The method according to claim 5, wherein the base is chosen from lithine, soda, lithium methylate, sodium methylate, lithium ethylate, sodium ethylate, lithium isopropylate, sodium isopropylate, lithium tertiobutylate, sodium tertiobutylate, lithium hydride, sodium hydride, n-butyllithium, n-butylsodium, s-butyllithium, lithium diisopropylamidure, tert-butyllithium, methyllithium, phenyllithium, phenylsodium, benzyllithium, benzylsodium, lithium dimsylate, sodium dimsylate.

9. The method according to claim 5, wherein the chlorosulfonation is performed in the presence of N,N-dimethylformamide.

10. The method according to claim 5, wherein the reaction is performed in a solvent or a mixture of solvents.

11. The method according to claim 5, wherein the amination reaction of the polymer selected from the group consisting of polymers of formulas XXIV, XXV, XXVI, XVII, XXVIII, XIX, XXX, XXXI, XXXII, XXXIII, XXXIV, XXXV, XXXVI, XXXVII and XXXVIII with the sulfonamide of formula XXXIX is performed at a temperature of between −20° C. and 60° C.

12. A method for synthesis of the polymer according to claim 1, wherein:
   in a first step, performing the chlorosulfonation of a polymer selected from the group consisting of polymers of formulas XVI, XVII, XVIII, XIX, XX, XXI, XXII and XXIII,

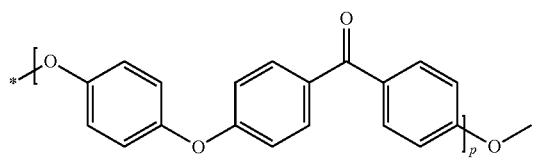

(XVI)

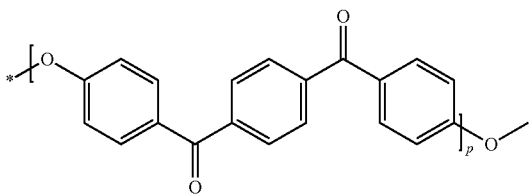
(XVII)
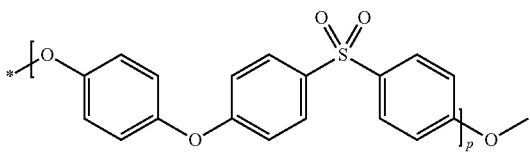
(XVIII)
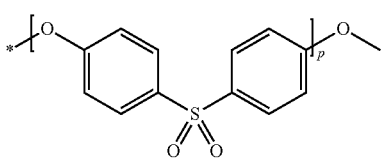
(XIX)
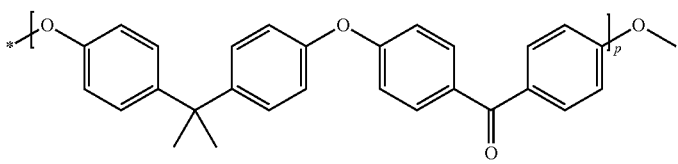
(XX)
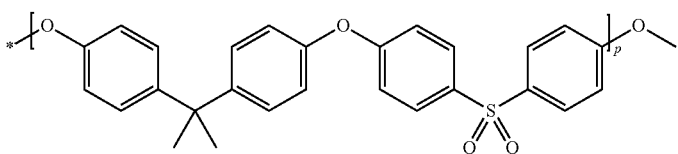
(XXI)
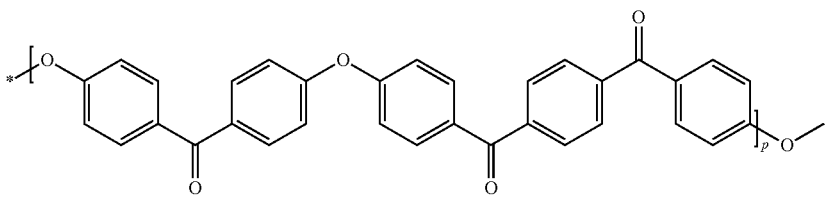
(XXII)
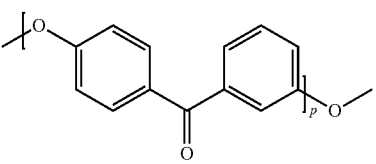
(XXIII)
wherein:
p represents the number of polymer units of the polymer, p varying from 40 to 300,
in order to obtain the chlorosulfonated polymer selected from the group consisting of polymers of formulas XXIV, XXV, XXVI, XVII, XXVIII, XIX, XXX, XXXI, XXXII, XXXIII, XXXIV, XXXV, XXXVI, XXXVII and XXXVIII,

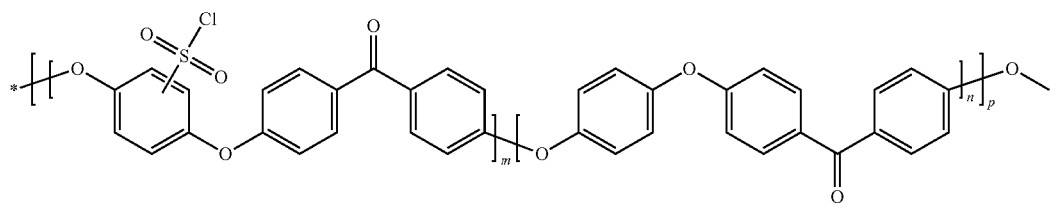
(XXIV)
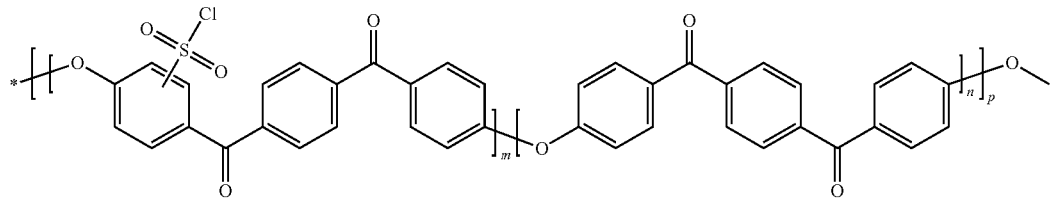
(XXV)
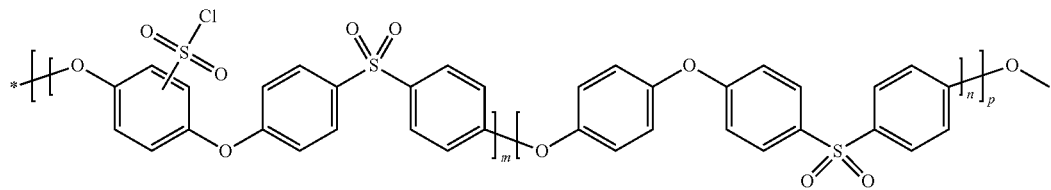
(XXVI)
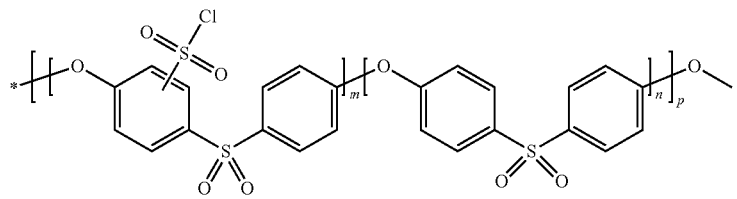
(XXVII)
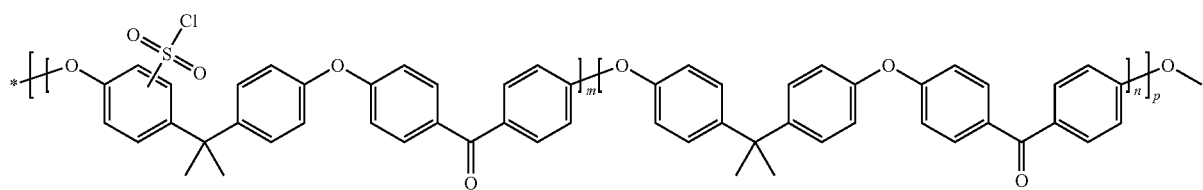
(XXVIII)
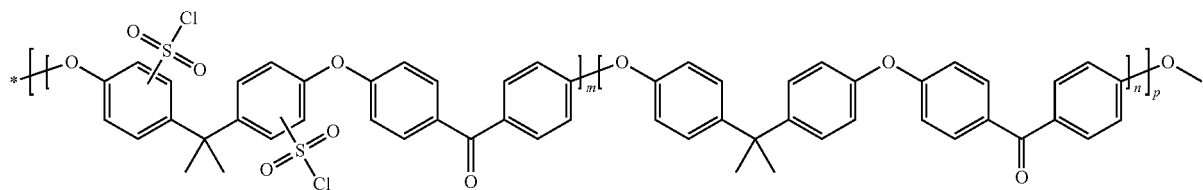
(XXIX)
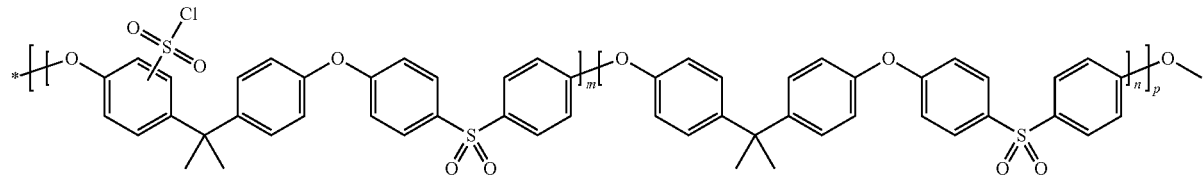
(XXX)

-continued
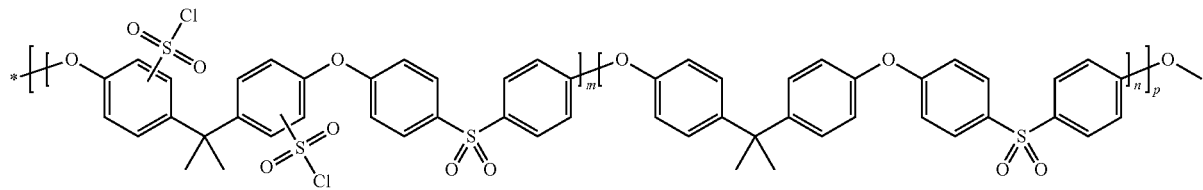
(XXXI)
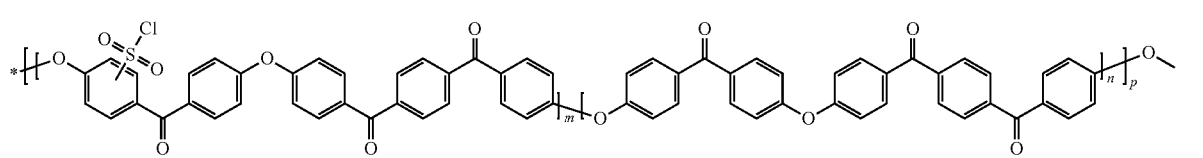
(XXXII)
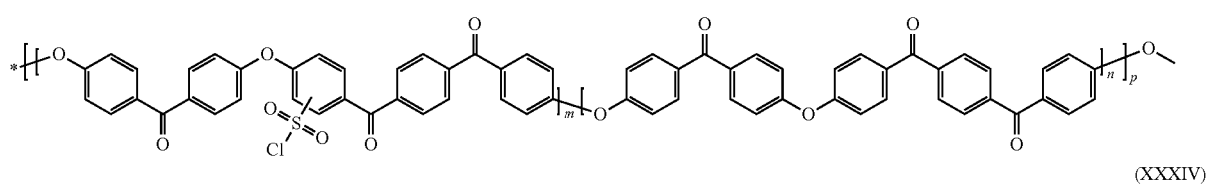
(XXXIII)
(XXXIV)
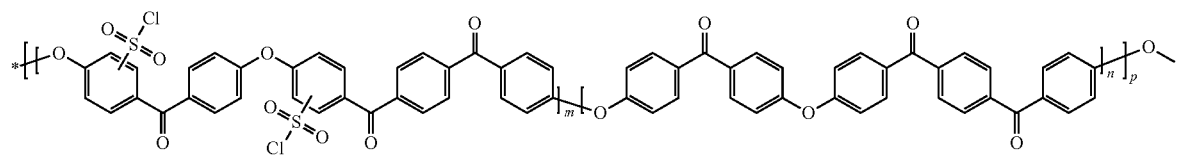
(XXXV)
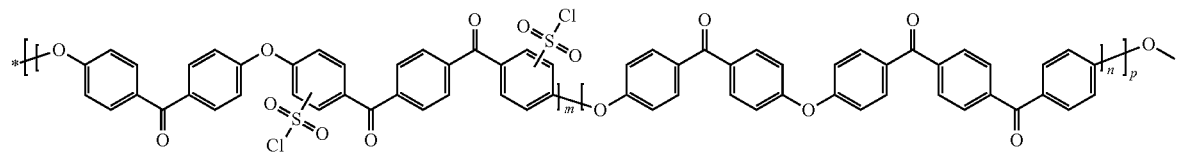
(XXXVI)
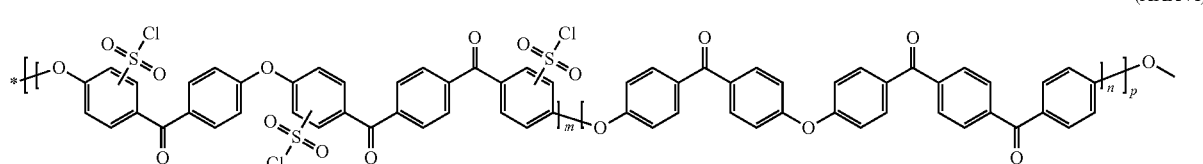
(XXXVII)
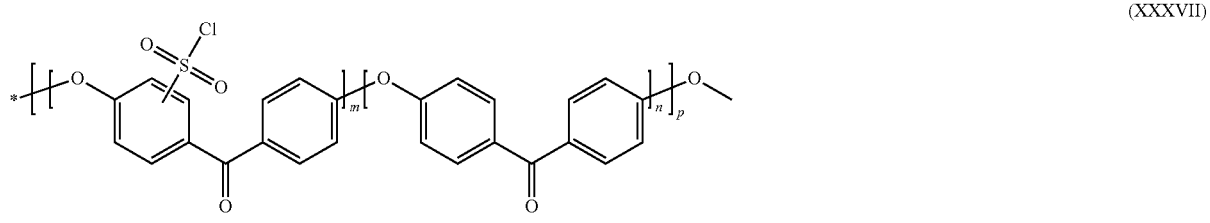
(XXXVIII)
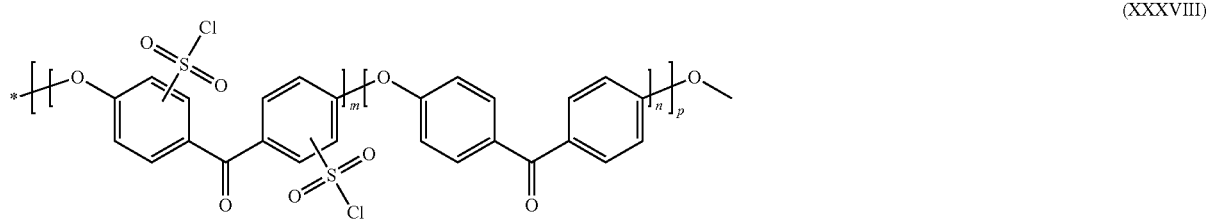

wherein:
  m represents the percentage of polymer units having an oxoaryl or dioxoaryl motif functionalized by a chlorosulfonated group, this percentage varying between 50 and 100%,
  n represents the percentage of polymer units having a dioxoaryl motif non-functionalized by a chlorosulfonated group, this percentage varying between 0 and 50%,
  p represents the number of polymer units of the polymer, p varying from 40 to 300, in a second step, producing a reaction on the polymer selected from polymers of formulas XXIV, XXV, XXVI, XVII, XXVIII, XIX, XXX, XXXI, XXXII, XXXIII, XXXIV, XXXV, XXXVI, XXXVII and XXXVIII in solution with ammonia gas or in an ammonia solution in order to obtain the polymer selected from polymers of formulas XL, XLI, XLII, XLIII, XLIV, XLV, XLVI, XLVII, XLVIII, XLIX, L, LI, LII, LIII and LIV,

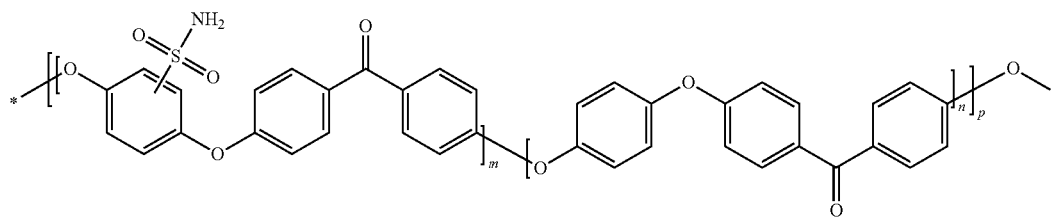
(XL)

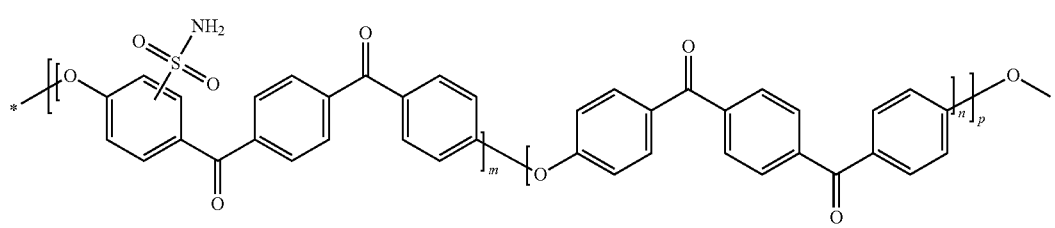
(XLI)

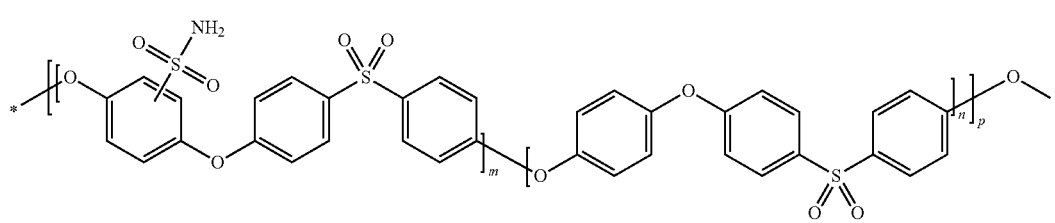
(XLII)

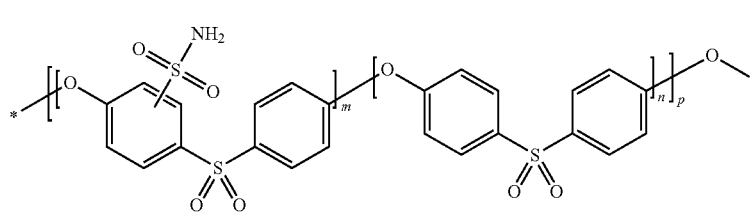
(XLIII)

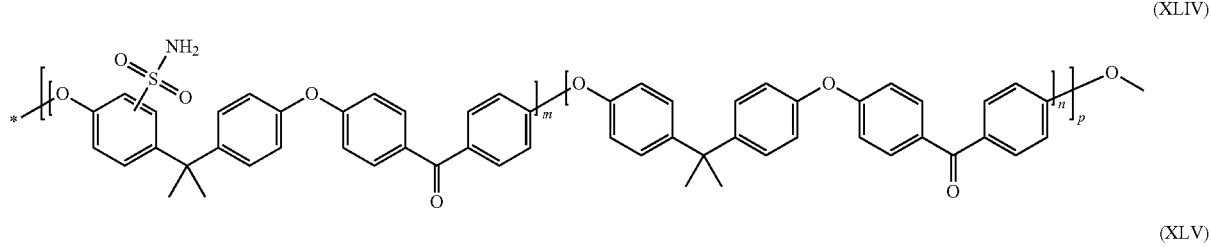
(XLIV)

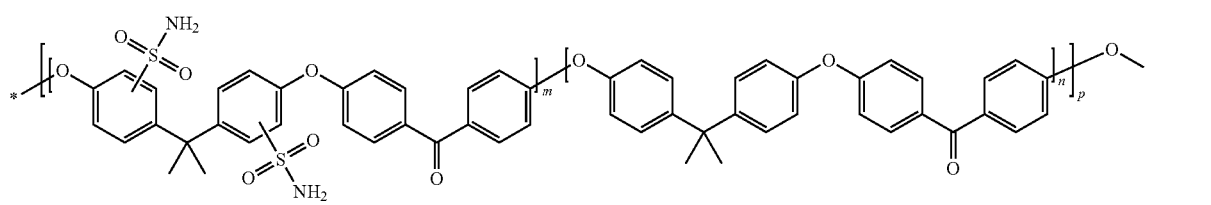
(XLV)

-continued
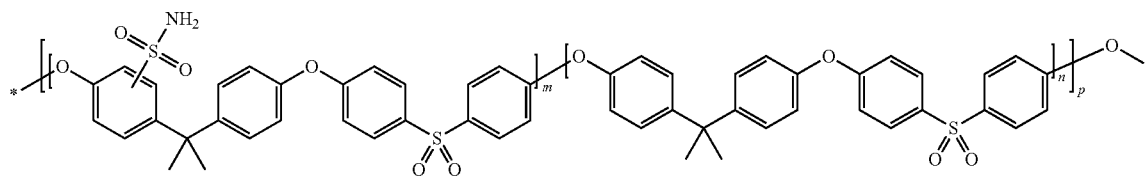
(XLVI)
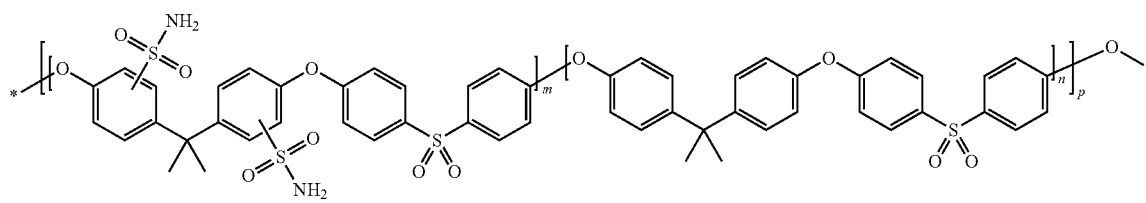
(XLVII)
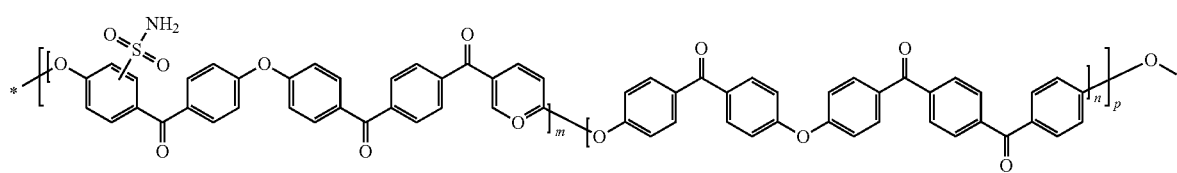
(XLVIII)
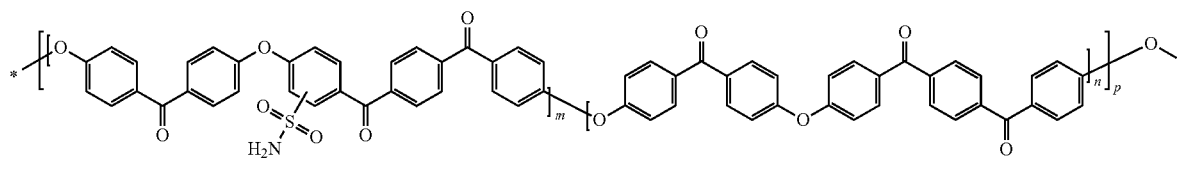
(XLIX)
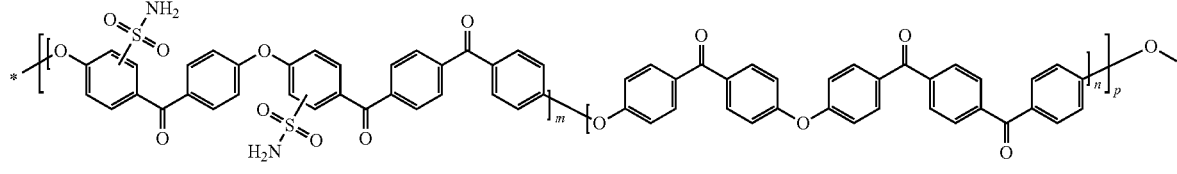
(L)
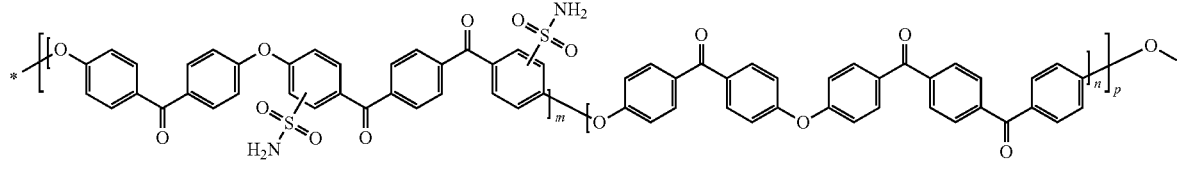
(LI)
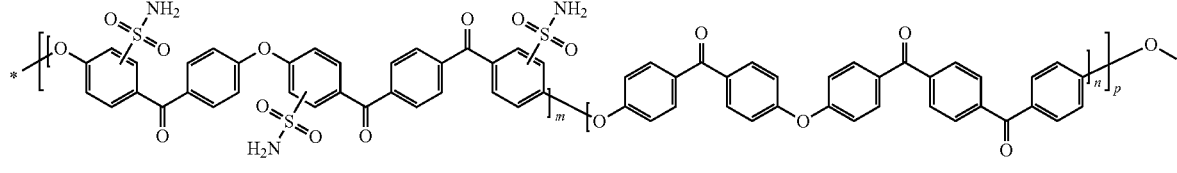
(LII)
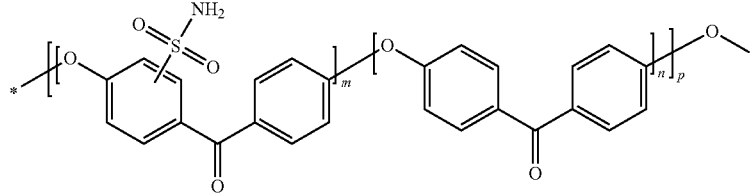
(LIII)

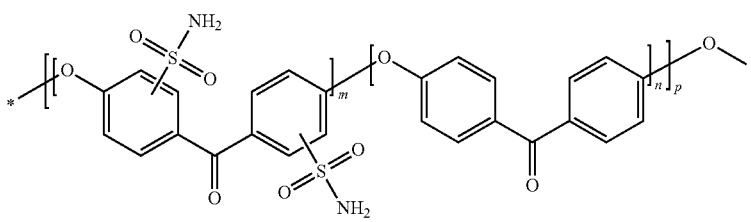

(LIV)

wherein:
  m represents the percentage of polymer units having a functionalized oxoaryl or dioxoaryl motif having a sulfonamide function, this percentage varying between 50 and 100%,
  n represents the percentage of polymer units having an oxoaryl or dioxoaryl motif non-functionalized by a sulfonamide function, this percentage varying between 0 and 50%,
  p represents the number of polymer units of the polymer, p varying from 40 to 300,
in a third step, producing a reaction on the polymer selected from polymers of formula XL, XLI, XLII, XLIII, XLIV, XLV, XLVI, XLVII, XLVIII, XLIX, L, LI, LII, LIII and LIV with a sulfonyl halogenide of formula LV

(LV)

wherein
  X represents a fluorine or chlorine or bromine atom or a trifluoromethanesulfonyl or alkylsulfonyl or arylsulfonyl group;
  R represents a group or different groups chosen from:
    an alkyl or cycloalkyl group having 1 to 30 linear or branched carbon atoms, optionally substituted by a cycloalkyl, aryl, perfluoroalkyl, polyfluoroalkyl, mono or polyethoxyl motif, a cycloalkyl group having 1 to 30 linear or branched carbon atoms, optionally substituted by a cycloalkyl, aryl, perfluoroalkyl, polyfluoroalkyl, mono or polyethoxyl motif;
    a perfluoro- or polyfluoroalkyl group optionally substituted by aromatic groups;
    an aryl or polyaryl group optionally substituted by alkyl, cycloalkyl, polyfluoro- or perfluoroalkyl, motifs, by nitrile functions, by alkyl- or alkylsulfonyl functions, by fluorine atoms;
  in the presence of a lithium or sodium base at a temperature of between 0 and 80° C. in a solvent medium.

13. The method according to claim 12, wherein the R group of the sulfonyl halide is a methyl, ethyl, propyl, cyclopropyl, butyl, 1-decyl, 1-dodecyl, 1-hexanedecyl, 1-octyldecyl, (7,7-dimethyl-2-oxobicyclo[2.2.1]heptan-1-yl)methyl, ((1R)-7,7-dimethyl-2-oxobicyclo[2.2.1]heptan-1-yl)methyl, (1S)-(7,7-dimethyl-2-oxobicyclo[2.2.1]heptan-1-yl)methyl, cyclohexylmethyl, trifluoromethyl, phenyl, tolyl, naphthyl, trifluorophenyl, 4-trifluoromethylphenyl, 3,5-bis (trifluoromethyl)phenyl, 4-cyanophenyl, 1,1,2,2,2-pentafluoroethanyl, nonafluorobutyl, pentafluorophenyl, 2,3,5,6-tetrafluorophenyl, 4-fluorophenyl, 2,4-difluorophenyl, 3,5-difluorophenyl, 2,3,4,5,6-pentafluorophenyl, (trifluoromethyl)phenyl, 3 (trifluoromethyl)phenyl, 2 (trifluoromethyl)phenyl, 4-methylphenyl, 1-naphthyl, 2-naphthyl, 3,5-difluorobenzyl, 4-fluorobenzyl, 3-trifluoromethylbenzyl, 4-trifluoromethylbenzyl, 2,5-dimethylbenzyl, 2-phenylethyl, 4-methoxyphenyl, 4-n-butylphenyl, 4-t-butylphenyl, 4-butoxyphenyl, 2 fluoro-5-(trifluoromethyl)phenyl, or 4-ethylphenyl group.

14. The method according to claim 12, wherein the amination reaction of the chlorosulfonated polymer selected from the group consisting of polymers of formulas XXIV, XXV, XXVI, XVII, XXVIII, XIX, XXX, XXXI, XXXII, XXXIII, XXXIV, XXXV, XXXVI, XXXVII and XXXVIII, in order to form the sulfonamide polymer selected from the group consisting of polymers of formulas XL, XLI, XLII, XLIII, XLIV, XLV, XLVI, XLVII, XLVIII, XLIX, L, LI, LII, LIII and LIV is performed in a solvent medium with ammonia gas or an ammonia solution in a solvent.

15. A method of preparing a film, comprising using polymers according to claim 1 to form a film having a thickness of between 10 μm and 200 μm.

16. A method for preparing films serving as electrolytes for batteries, comprising, in a medium in the absence of traces of water and moisture, solubilizing a polymer according to claim 1 in an anhydrous solvent, depositing the polymer solution on a solid support and then evaporating the solvent by heating, inert gas sweeping or by applying reduced pressure.

17. The method according to claim 16, wherein the solvent is DMSO.

18. An electrolyte for batteries, comprising films made from polymers according to claim 1, wherein the electrolyte has a conductivity on the order of $10^{-8}$ and $2 \times 10^{-3}$ S/cm in a solvent medium and without solvent.

19. An electrolyte for batteries, comprising films made from polymers according to claim 1, wherein the electrolyte is used in a temperature range of between 20 and 100° C.

* * * * *